US012152435B1

(12) United States Patent
Flannery et al.

(10) Patent No.: US 12,152,435 B1
(45) **Date of Patent: *Nov. 26, 2024**

(54) APPARATUS HAVING FRAME SEPARATE FROM GATE

(71) Applicant: Regalo International, LLC, Burnsville, MN (US)

(72) Inventors: Mark A. Flannery, Longboat Key, FL (US); Brian M. McMahon, Palatine, IL (US); Caleb Summers, Minneapolis, MN (US)

(73) Assignee: Regalo International, LLC, Longboat Key, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/229,654

(22) Filed: Aug. 2, 2023

Related U.S. Application Data

(63) Continuation of application No. 17/467,138, filed on Sep. 3, 2021, now Pat. No. 11,746,589, which is a (Continued)

(51) Int. Cl.

*E06B 7/32* (2006.01)
*E06B 3/26* (2006.01)

(Continued)

(52) U.S. Cl.

CPC .................. *E06B 7/32* (2013.01); *E06B 3/26* (2013.01); *E06B 9/04* (2013.01); *E06B 11/02* (2013.01);

(Continued)

(58) Field of Classification Search

CPC ..... E06B 7/32; E06B 3/26; E06B 9/04; E06B 11/02; E06B 11/022; E06B 2009/002

See application file for complete search history.

(56) References Cited

U.S. PATENT DOCUMENTS

| | | | |
|---|---|---|---|
| 270,309 | A | 1/1883 | Harrison et al. |
| 1,189,410 | A | 7/1916 | Van Every |

(Continued)

FOREIGN PATENT DOCUMENTS

| | | |
|---|---|---|
| GB | 671856 | 5/1952 |
| GB | 787142 | 12/1957 |

(Continued)

OTHER PUBLICATIONS

Summer Infant—Multi-Use Decorative Extra Tall Walk-Thru Gate, archived on Jun. 11, 2014 [Retrieved Apr. 23, 2018] https://web.archive.org/web/20140611033222/http://www.summerinfant.com:80/multiusedecorativeextratallwalkthrugate (bronze).

(Continued)

*Primary Examiner* — Justin B Rephann

(57) ABSTRACT

A two unit barrier or three unit barrier. The two unit barrier includes a first end frame portion and a second end frame portion as a first unit and a gate as a second unit. The three unit barrier includes a first end frame as a first unit, a second end frame as a second unit, and a gate as a third unit. In each of the barriers, the gate is swingably engaged and swingable over a lower connection arrangement. The lower connection arrangement may include one or more of a mortise and tenon connection, clamp connection, swinging connection, flush and hidden connection, and telescoping connection.

11 Claims, 29 Drawing Sheets

Related U.S. Application Data continuation of application No. 16/734,370, filed on Jan. 5, 2020, now Pat. No. 11,111,719, which is a continuation of application No. 15/876,087, filed on Jan. 19, 2018, now Pat. No. 10,533,370, which is a continuation of application No. 15/236,429, filed on Aug. 13, 2016, now Pat. No. 9,874,055.

(60) Provisional application No. 62/293,325, filed on Feb. 9, 2016, provisional application No. 62/206,833, filed on Aug. 18, 2015.

(51) Int. Cl.

| | |
|---|---|
| ***E06B 9/04*** | (2006.01) |
| ***E06B 11/02*** | (2006.01) |
| *E06B 9/00* | (2006.01) |

(52) U.S. Cl.

CPC ....... *E06B 11/022* (2013.01); *E06B 2009/002* (2013.01)

(56) References Cited

U.S. PATENT DOCUMENTS

| | | | |
|---|---|---|---|
| 1,242,757 | A | 10/1917 | Anway |
| 1,511,455 | A | 10/1924 | Freyberg et al. |
| 1,542,151 | A | 6/1925 | Lehtonen |
| 2,275,914 | A | 3/1942 | Lorenz |
| 2,851,746 | A | 9/1958 | McPhaden |
| 3,589,576 | A | 6/1971 | Rinkle |
| 4,334,573 | A | 6/1982 | Hackman et al. |
| 4,583,715 | A | 4/1986 | Wright |
| 4,611,431 | A | 9/1986 | Lauro |
| 4,628,635 | A | 12/1986 | Maillard |
| 4,685,247 | A | 8/1987 | Alam |
| 4,702,036 | A | 10/1987 | Johnson |
| 5,060,421 | A | 10/1991 | Castelli |
| 5,117,585 | A | 6/1992 | Andrisin, III |
| 5,272,840 | A | 12/1993 | Knoedler |
| 5,535,550 | A | 7/1996 | Yang |
| 5,797,218 | A | 8/1998 | Holland |
| 5,809,694 | A | 9/1998 | Postans |
| 6,056,038 | A | 5/2000 | Foster et al. |
| 6,176,042 | B1 | 1/2001 | Rossman et al. |
| 6,253,490 | B1 | 7/2001 | Postans |
| 6,446,395 | B2 | 9/2002 | Rogers |
| 6,499,254 | B2 | 12/2002 | Rossman et al. |
| 6,655,087 | B2 | 12/2003 | Andersen |
| 6,681,720 | B1 | 1/2004 | Skurdalsvold et al. |
| 6,877,721 | B2 | 4/2005 | Calverley |
| 7,152,372 | B2 | 12/2006 | Cheng |
| 7,293,530 | B2 | 11/2007 | Italiano |
| 7,334,624 | B2 | 2/2008 | Waldman et al. |
| 7,373,755 | B2 | 5/2008 | Jefferys et al. |
| 7,540,046 | B1 | 6/2009 | Lai |
| 7,950,184 | B2 | 5/2011 | Flannery |
| 7,963,575 | B2 | 6/2011 | Mayo |
| 7,975,431 | B2 | 7/2011 | Flannery |
| 8,196,348 | B2 | 6/2012 | Flannery |
| 8,448,381 | B2 | 5/2013 | Flannery |
| 8,745,922 | B1 | 6/2014 | Matsuda |
| 9,382,750 | B1 | 7/2016 | Flannery |
| 9,458,668 | B1 | 10/2016 | Flannery |
| 10,450,795 | B2 | 10/2019 | Raffi |
| 10,458,152 | B2 | 10/2019 | Schort |
| 10,907,404 | B1 | 2/2021 | Flannery |
| 10,934,769 | B2 | 3/2021 | Flannery |
| 2001/0000556 | A1 | 5/2001 | Rossman et al. |
| 2002/0157316 | A1 | 10/2002 | Andersen |
| 2003/0009945 | A1 | 1/2003 | Cheng |
| 2003/0110704 | A1 | 6/2003 | Cheng |
| 2004/0045222 | A1 | 3/2004 | Hicks |
| 2005/0028947 | A1 | 2/2005 | Waldman et al. |
| 2006/0169217 | A1 | 8/2006 | Glassford |
| 2006/0207180 | A1 | 9/2006 | Cheng |
| 2006/0260195 | A1 | 11/2006 | Witman |
| 2007/0074453 | A1 | 4/2007 | Flannery |
| 2008/0265233 | A1 | 10/2008 | Flannery |
| 2009/0293363 | A1 | 12/2009 | Flannery |
| 2012/0055092 | A1 | 3/2012 | Boucquey |
| 2013/0212950 | A1 | 8/2013 | Bertsch et al. |
| 2014/0373448 | A1 | 12/2014 | Henderson |
| 2015/0027060 | A1 | 1/2015 | Sousa |
| 2015/0101250 | A1 | 4/2015 | Marsden |
| 2015/0259964 | A1 | 9/2015 | Linehan |
| 2017/0211314 | A1 | 7/2017 | Raffi |
| 2018/0112457 | A1 | 4/2018 | Raffi |

FOREIGN PATENT DOCUMENTS

| | | | |
|---|---|---|---|
| GB | 1571070 | | 4/1980 |
| GB | 2193992 | A | 2/1988 |
| GB | 2234281 | A | 1/1991 |
| WO | 02/099238 | | 12/2002 |
| WO | 03/052231 | | 6/2003 |

OTHER PUBLICATIONS

"Plaintiff's Second Supplemental Identification of Asserted Patents and Accused Products," served May 24, 2019, *Regalo International, LLC* vs. *Summer Infant, Inc.*, United States District Court of Delaware, Civil Action No. 1:17-cv-01074-MN.

USPTO Office Action dated Feb. 23, 2018 ordering reexamination of U.S. Pat. No. 7,975,431.

Request for Ex Parte Reexamination of U.S. Pat. No. 7,975,431, filed Jan. 18, 2018.

Detailed Request For Ex-Parte Patent Reexamination (U.S. Pat. No. 8,448,381); Filed Jan. 18, 2018.

Detailed Request For Ex-Parte Patent Reexamination (U.S. Pat. No. 9,458,668); Filed Jan. 18, 2018.

Response to May 10, 2018 Office Action including Declarations and Exhibits, filed Jul. 10, 2018, in Reexamination U.S. Appl. No. 90/014,068 (U.S. Pat. No. 8,448,381—Small Gate Within Big Gate Within Barrier) (Part 1 of 3).

Response to May 10, 2018 Office Action including Declarations and Exhibits, filed Jul. 10, 2018, in Reexamination U.S. Appl. No. 90/014,068 (U.S. Pat. No. 8,448,381—Small Gate Within Big Gate Within Barrier) (Part 2 of 3).

Response to May 10, 2018 Office Action including Declarations and Exhibits, filed Jul. 10, 2018, in Reexamination U.S. Appl. No. 90/014,068 (U.S. Pat. No. 8,448,381—Small Gate Within Big Gate Within Barrier) (Part 3 of 3).

Response to May 10, 2018 Office Action including Declarations and Exhibits, filed Jul. 10, 2018, in Reexamination U.S. Appl. No. 90/014,069 (U.S. Pat. No. 9,458,668—Small Gate Within Big Gate Within Barrier) (Part 1 of 3).

Response to May 10, 2018 Office Action including Declarations and Exhibits, filed Jul. 10, 2018, in Reexamination U.S. Appl. No. 90/014,069 (U.S. Pat. No. 9,458,668—Small Gate Within Big Gate Within Barrier) (Part 2 of 3).

Response to May 10, 2018 Office Action including Declarations and Exhibits, filed Jul. 10, 2018, in Reexamination U.S. Appl. No. 90/014,069 (U.S. Pat. No. 9,458,668—Small Gate Within Big Gate Within Barrier) (Part 3 of 3).

Defendant Summer Infant Inc.'s Initial Invalidity Contentions, served Mar. 14, 2018, *Regalo Int'l, LLC* v. *Summer Infant, Inc.*, No. 1:17-cv-1074-GMS.

"Standard Consumer Safety Specification for Expansion Gates and Expandable Enclosures," ASTM International, Designation F 1004-07 (2007).

"Child care articles—Safety Barriers—Safety requirements.," European Committee for Standardization, EN 1930:2000 + A1:2005 (2006).

Joint Claim Construction Chart with Exhibits, *Regalo Int'l, LLC* v. *Summer Infant, Inc.*, No. 1:17-cv-01074-GMS, filed Apr. 6, 2018.

Defendant Summer Infant, Inc. Opening Claim Construction Brief, *Regalo Int'l, LLC* v. *Summer Infant, Inc.* No. 1:17-cv-01074-GMS, filed Apr. 26, 2018.

(56) References Cited

OTHER PUBLICATIONS

Plaintiff Regalo International, LLC Opening Claim Construction Brief, *Regalo Int'l, LLC* v. *Summer Infant, Inc.*, No. 1:17-cv-01074-GMS, filed Apr. 26, 2018.

Joint Appendix for Claim Construction Briefing, pp. A000001-A000254, Exhibits A-H, *Regalo Int'l, LLC* v. *Summer Infant, Inc.*, No. 1:17-cv-01074-GMS.

Joint Appendix for Claim Construction Briefing, pp. A001001-A001040, Exhibits AA-CC, *Regalo Int'l, LLC* v. *Summer Infant, Inc.*, No. 1:17-cv-01074-GMS.

gate.Dictionary.com. The American Heritage Dictionary of Idioms by Christine Ammer. Houghton Mifflin Company. http://dictionary.reference.com/browe/gate (accessed: Mar. 13, 2009).

Plaintiff Regalo International, LLC Opening Claim Construction Brief, *Regalo Int'l, LLC* v. *Summer Infant, Inc.*, No. 1:17-cv-01074-MN, filed Jul. 8, 2019.

Declaration of Lance Rake, *Regalo Int'l, LLC* v. *Summer Infant, Inc.*, No. 1:17-cv-01074-MN, dated Jul. 7, 2019.

www.merriam-webster.com/dictionary/in, definition of the preposition "in" as captured on the Merriam-Webster website on Jul. 5, 2019.

Defendant Summer Infant's Supplemental Invalidity Contentions dated Apr. 8, 2019, *Regalo Int'l, LLC* v. *Summer Infant, Inc.*, No. 1:17-cv-01074-MN.

Defendant Summer Infant's Answering Claim Construction Brief dated Aug. 7, 2019, *Regalo Int'l, LLC* v. *Summer Infant, Inc.*, No. 1:17-cv-01074-MN.

Exhibit R, Summer Infant's Answering Claim Construction Brief dated Aug. 7, 2019, *Regalo Int'l, LLC* v. *Summer Infant, Inc.*, No. 1:17-cv-01074-MN.

Exhibit S: Regalo's Second Supplemental Claim Chart, Summer Infant's Answering Claim Construction Brief dated Aug. 7, 2019, *Regalo Int'l, LLC* v. *Summer Infant, Inc.*, No. 1:17-cv-01074-MN.

Exhibit T: Declaration of David E. Campbell, Summer Infant's Answering Claim Construction Brief dated Aug. 7, 2019, *Regalo Int'l, LLC* v. *Summer Infant, Inc.*, No. 1:17-cv-01074-MN.

Exhibit U: ASTM F1004-13, Summer Infant's Answering Claim Construction Brief dated Aug. 7, 2019, *Regalo Int'l, LLC* v. *Summer Infant, Inc.*, No. 1:17-cv-01074-MN.

Summer Infant's Answer to First Amended Complaint, Affirmative Defenses, and Counterclaims, dated Feb. 25, 2019, *Regalo Int'l, LLC* v. *Summer Infant, Inc.*, No. 1:17-cv-01074-MN.

Request for Ex Parte Reexamination of U.S. Pat. No. 10,006,243 filed Jul. 17, 2019.

USPTO Office communication dated Sep. 23, 2019 ordering reexamination of U.S. Pat. No. 10,006,243.

Complaint, *Regalo Int'l, LLC* v. *Summer Infant, Inc*., No. 1:17-cv-01074-GMS, filed Aug. 2, 2017.

Answer to Complaint, Affirmative Defenses, and Counterclaims, No. 1:17-cv-01074-GMS, filed Sep. 27, 2017.

14
18
350
348
352
12
350
18
354
360
348
352
364
358
346
348
356
360
18
362
14

354
360
358
364
356
18
14
22

FIG. 14A
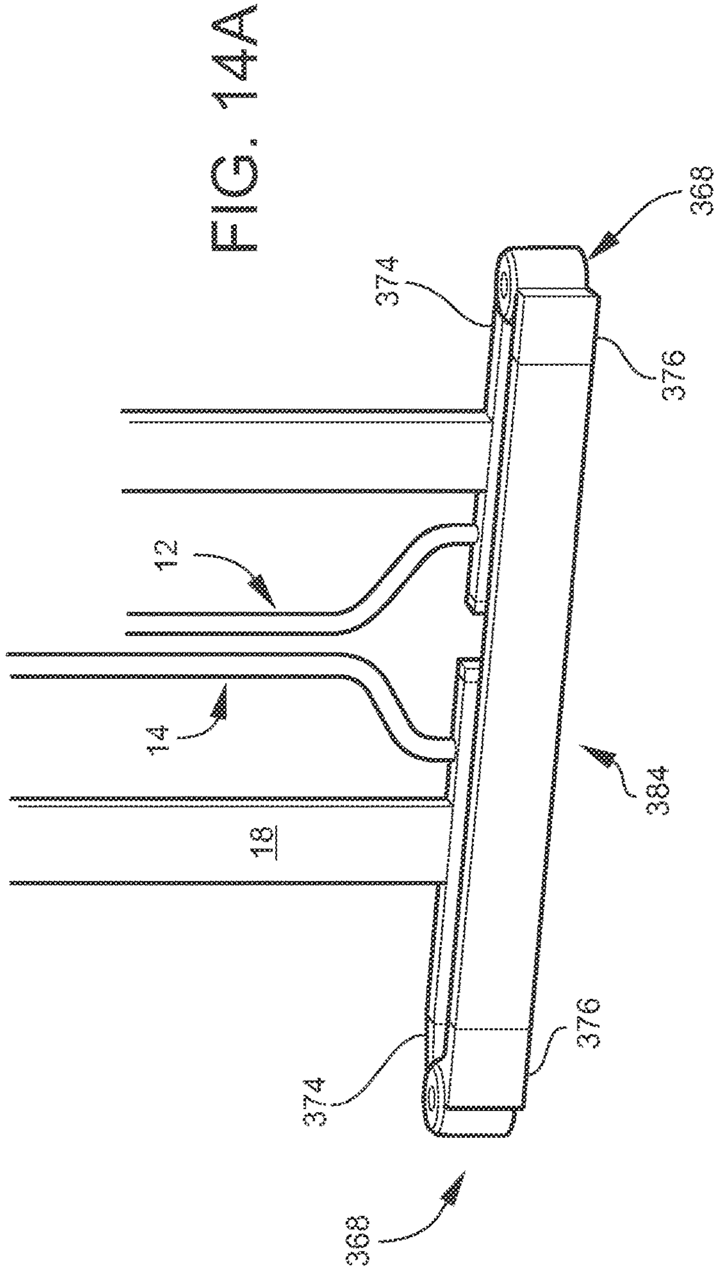
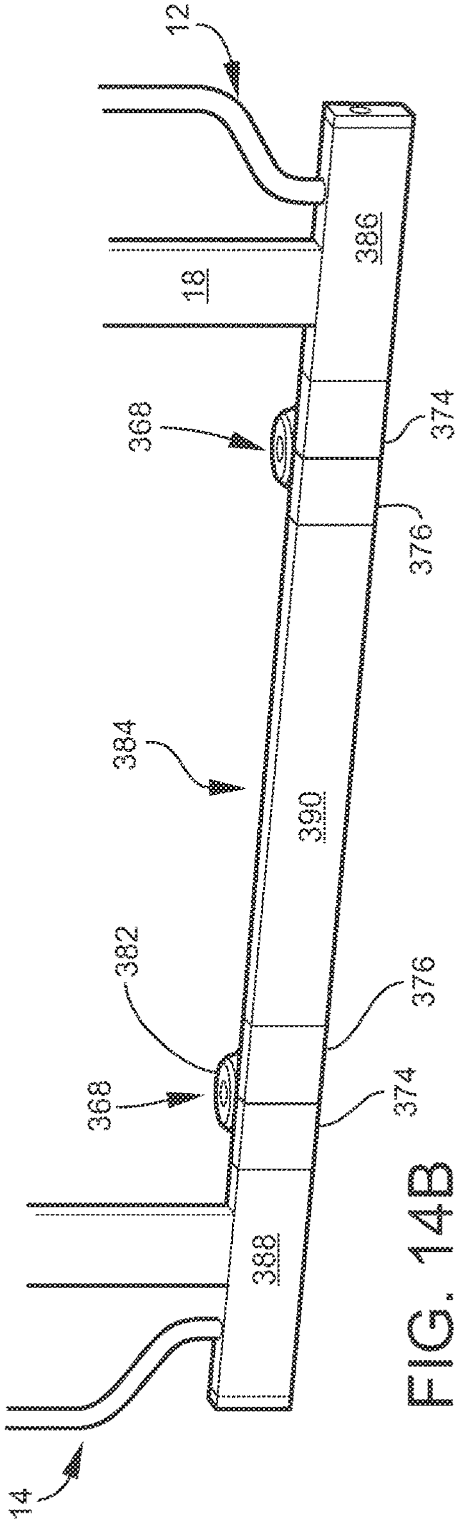
FIG. 14B

APPARATUS HAVING FRAME SEPARATE FROM GATE

This application is a continuation, and claims the benefit under 35 U.S.C. § 120, of U.S. Nonprovisional patent application Ser. No. 17/467,138 filed Sep. 3, 2021, which application is a continuation, and claims the benefit under 35 U.S.C. § 120, of U.S. Nonprovisional patent application Ser. No. 16/734,370 filed Jan. 5, 2020 (now U.S. Pat. No. 11,111,719 issued Sep. 7, 2021), which application is a continuation, and claims the benefit under 35 U.S.C. § 120, of U.S. Nonprovisional patent application Ser. No. 15/876,087 filed Jan. 19, 2018 (now U.S. Pat. No. 10,533,370 issued Jan. 14, 2020), which is a continuation, and claims the benefit under 35 U.S.C. § 120, of U.S. Nonprovisional patent application Ser. No. 15/236,429 filed Aug. 13, 2016 (now U.S. Pat. No. 9,874,055 issued Jan. 23, 2018), which claims the benefit under 35 U.S.C. 119 (e) of U.S. Provisional Patent Application No. 62/206,833 filed Aug. 18, 2015 and U.S. Provisional Patent Application No. 62/293,325 filed Feb. 9, 2016, all of which applications are hereby incorporated by reference in their entireties into this application.

FIELD OF THE INVENTION

The present invention relates generally to assembly gates or barriers and more specifically to gates or barriers that are shipped or stored in one form and used in another form.

BACKGROUND OF THE INVENTION

An assembly gate may be referred to a gate that includes two states. A first state may be a state in which the gate is disassembled and shipped and/or stored in the disassembled state. A second state may be a state in which the gate is assembled and in use. Preferably, the first state takes a form that occupies a minimum amount of space. Preferably, a conversion from the first state to the second state or a conversion from the second state to the first state is easy, user friendly and takes a minimal amount of time. Preferably, after conversion from the first state to second state, the form of the second state is as normal as a nonassembly gate and is as structurally sound as a nonassembly gate.

SUMMARY OF THE INVENTION

A feature of the present invention is a three unit barrier having a first end frame as a first unit, a second end frame as a second unit, and a gate as a third unit.

Another feature of the present invention is the provision in a three unit barrier having a first end frame as a first unit, a second end frame as a second unit, and a gate as a third unit, of the gate being swingably engaged to one of the first and second end units.

Another feature of the present invention is the provision in a three unit barrier having a first end frame as a first unit, a second end frame as a second unit, and a gate as a third unit, of the gate having a latch that is latchable to the other of the first and second units.

Another feature of the present invention is the provision in a three unit barrier having a first end frame as a first unit, a second end frame as a second unit, and a gate as a third unit, of the gate confronting the first and second end frames.

Another feature of the present invention is the provision in a three unit barrier having a first end frame as a first unit, a second end frame as a second unit, and a gate as a third unit, of the gate further confronting a first lower member portion of the first end frame and a second lower member portion of the second end frame.

Another feature of the present invention is the provision in a three unit barrier having a first end frame as a first unit, a second end frame as a second unit, and a gate as a third unit, of a first lower member portion of the first end frame and a second lower member portion of the second end frame being one of a) directly engagable to each other and b) indirectly engagable to each other.

Another feature of the present invention is the provision in a three unit barrier having a first end frame as a first unit, a second end frame as a second unit, and a gate as a third unit, of a first lower member portion of the first end frame having one of a first mortise joint end and first tenon joint end, and a second lower member portion of the second end frame having one of a second mortise joint end and second tenon joint end.

Another feature of the present invention is the provision in a three unit barrier having a first end frame as a first unit, a second end frame as a second unit, and a gate as a third unit, of a lower member extension engaged between the first lower member portion of the first end frame and the second lower member portion of the second end frame, where the lower member extension includes at least one of a third mortise joint end and third tenon joint end.

Another feature of the present invention is the provision in a three unit barrier having a first end frame as a first unit, a second end frame as a second unit, and a gate as a third unit, where a tenon joint end includes a neck and a head, and where the head has a greater width than the neck.

Another feature of the present invention is the provision in a three unit barrier having a first end frame as a first unit, a second end frame as a second unit, and a gate as a third unit, of one of first and second mortise joint ends being slideably engaged with one of the first and second tenon joint ends along an axis parallel to an axis on which the gate swings.

Another feature of the present invention is the provision in a three unit barrier having a first end frame as a first unit, a second end frame as a second unit, and a gate as a third unit, of one of the first and second mortise joint ends being slideably engaged with one of the first and second tenon joint ends along an axis disposed generally parallel to a plane defined by the gate when the gate is closed.

Another feature of the present invention is the provision in a three unit barrier having a first end frame as a first unit, a second end frame as a second unit, and a gate as a third unit, of a first lower member portion of the first end frame having one of a first clamp joint end and first clamped joint end, and of the second lower member portion of the second end frame having one of a second clamp joint end and second clamped joint end.

Another feature of the present invention is the provision in a three unit barrier having a first end frame as a first unit, a second end frame as a second unit, and a gate as a third unit, of a lower member extension engaged between a first lower member portion of the first end frame and a second lower member portion of the second end frame, where the lower member extension includes at least one of a third clamp joint end and third clamped joint end.

Another feature of the present invention is the provision in a three unit barrier having a first end frame as a first unit, a second end frame as a second unit, and a gate as a third unit, of a first lower member portion of the first end frame having one of a first sleeve joint end and first male joint end, and of a second lower member portion of the second end frame having one of a second sleeve joint end and second male joint end.

Another feature of the present invention is the provision in a three unit barrier having a first end frame as a first unit, a second end frame as a second unit, and a gate as a third unit, of a lower member extension engaged between the first lower member portion of the first end frame and the second lower member portion of the second end frame, where the lower member extension includes at least one of a third sleeve joint end and third male joint end.

Another feature of the present invention is the provision in a three unit barrier having a first end frame as a first unit, a second end frame as a second unit, and a gate as a third unit, of a first sleeve joint end extending for 360 degrees about a respective male joint end.

Another feature of the present invention is the provision in a three unit barrier having a first end frame as a first unit, a second end frame as a second unit, and a gate as a third unit, of a first lower member portion of the first end frame having one of a first flush and hidden female joint end and first flush and hidden male joint end, of a second lower member portion of the second end frame having one of a second flush and hidden female joint end and second flush and hidden male joint end, where one of the first and second flush and hidden female joint end engages one of the first and second flush and hidden male joint ends to form a flush and hidden joint that draws top, bottom and side surfaces of the first and second lower members into a flush abutment with each other and that hides an inner joint mechanism from sight.

Another feature of the present invention is the provision in a three unit barrier having a first end frame as a first unit, a second end frame as a second unit, and a gate as a third unit, of a lower member extension engaged between a first lower member portion of the first end frame and a second lower member portion of the second end frame, where the lower member extension includes at least one of a flush and hidden female joint end and third flush and hidden male joint end.

Another feature of the present invention is the provision in a three unit barrier having a first end frame as a first unit, a second end frame as a second unit, and a gate as a third unit, of a first lower member portion of the first end frame having one of a first opposing cavity joint end and first opposing plates joint end, and a second lower member portion of the second end frame having one of a second opposing cavity joint end and second opposing plates joint end.

Another feature of the present invention is the provision in a three unit barrier having a first end frame as a first unit, a second end frame as a second unit, and a gate as a third unit, of a first lower member portion of the first end frame having one of a first box shaped slot joint end and first box shaped insert joint end, and a second lower member portion of the second end frame having one of a second box shaped slot joint end and second box shaped insert joint end.

Another feature of the present invention is a two unit barrier having first and second end frame portions as a first unit and a gate as a second unit.

Another feature of the present invention is the provision in a two unit barrier having first and second end frame portions as a first unit and a gate as a second unit, of the first and second end frame portions having first and second positions relative to each other, where in the first position the first and second end frame portions are spaced apart from each other by a first distance less than a width of said gate such that the gate is not engagable between the first and second end frame portions, and where in the second position the first and second end frame portions are spaced apart from each other by a second distance that is about equal to the width of the gate such that the gate is engagable between the first and second end frame portions.

Another feature of the present invention is the provision in a two unit barrier having first and second end frame portions as a first unit and a gate as a second unit, of a first lower member portion of the first end frame portion being swingably engagable to a second lower member portion of the second end frame portion such that the first end frame portion may be swung to confront the second end frame portion.

Another feature of the present invention is the provision in a two unit barrier having first and second end frame portions as a first unit and a gate as a second unit, of a first lower member portion of the first end frame portion being swingably engagable to a second lower member portion of the second end frame portion such that the first end frame portion may be swung to confront the second end frame portion in a face to face position.

Another feature of the present invention is the provision in a two unit barrier having first and second end frame portions as a first unit and a gate as a second unit, of a first lower member portion of the first end frame portion being swingably engagable to a second lower member portion of the second end frame portion such that the first end frame portion may be swung to confront the second end frame portion in an end to end position.

Another feature of the present invention is the provision in a two unit barrier having first and second end frame portions as a first unit and a gate as a second unit, of an intermediate lower member portion between a first lower member portion of the first end frame portion and a second lower member portion of the second end frame portion, where the first lower member portion of the first end frame portion is swingably engagable to the second lower member portion of the second end frame portion such that the first end frame portion may be swung such that a bottom of the first lower member portion of the first end frame portion confronts a bottom of the intermediate lower member portion and such that a bottom of the second lower member portion of the second end frame portion confronts a bottom of the intermediate lower member portion.

Another feature of the present invention is the provision in a two unit barrier having first and second end frame portions as a first unit and a gate as a second unit, of a first lower member portion of the first end frame portion being swingably engagable to a second lower member of the second end frame portion through a swinging joint having an axis that is generally parallel to an axis on which the gate swings.

Another feature of the present invention is the provision in a two unit barrier having first and second end frame portions as a first unit and a gate as a second unit, of a first lower member portion of the first end frame portion being swingably engagable to a second lower member portion of the second end frame portion through a swinging joint having an axis that is generally disposed at a right angle to a plane defined by the gate when the gate is closed.

Another feature of the present invention is the provision in a two unit barrier having first and second end frame portions as a first unit and a gate as a second unit, of a first engagement providing for first and second positions of the first and second end frame portions relative to each other, wherein in the first position the first and second end frame portions are spaced apart from each other by a first distance less than a width of the gate such that the gate is not engagable between the first and second end frame portions, wherein in the second position the first and second end frame portions are spaced apart from each other by a second distance that is about equal to the width of the gate such that the gate is engagable between the first and second end frame portions.

Another feature of the present invention is the provision in a two unit barrier having first and second end frame portions as a first unit and a gate as a second unit, of the first and second end frame portions being expandable and retractable relative to each other, the first and second end frame portions being retractable toward each other such that said first and second end frame portions confront each other in a retracted position such that the gate unit is not engagable between the first and second end frame portions, the first and second end frame portions being fixable at an expanded position such that the gate unit is engagable to and between the first and second end frame portions such that said two unit barrier is assembled.

Another feature of the present invention is the provision in a two unit barrier having first and second end frame portions as a first unit and a gate as a second unit, of, when the two unit barrier is assembled, the gate unit confronting the first and second end frame portions, the first lower member portion of the first end frame portion and the second lower member portion of the second end frame portion.

Another feature of the present invention is the provision in a two unit barrier having first and second end frame portions as a first unit and a gate as a second unit, of, when the two unit barrier is assembled, the gate unit confronting the first lower member portion of the first end frame portion and the second lower member portion of the second end frame portion.

Another feature of the present invention is the provision in a two unit barrier having first and second end frame portions as a first unit and a gate as a second unit, of lower member portions of the first and second end frame portions being engaged to each other such that disengagement of the first and second end frame portions from each other destroys an integrity of an engagement between the first and second end frame portions.

Another feature of the present invention is the provision in a two unit barrier having first and second end frame portions as a first unit and a gate as a second unit, of the lower member portions of the first and second end frame portions being engaged to each other with a telescoping arrangement.

Another feature of the present invention is the provision in a two unit barrier having first and second end frame portions as a first unit and a gate as a second unit, of the first lower member portion including a first dimension and of the second lower member portion including a second dimension, where the first dimension is slightly less than or equal to the second dimension, where the first and second dimensions are selected from one of a diameter, width, and height, such that the first lower member portion fits inside of the second lower member portion.

Another feature of the present invention is the provision in a two unit barrier having first and second end frame portions as a first unit and a gate as a second unit, of the first lower member portion including a first width and of the second lower member portion including a second width, where the first width is less than the second width such that the first lower member portion slides inside of the second lower member portion.

Another feature of the present invention is the provision in a two unit barrier having first and second end frame portions as a first unit and a gate as a second unit, of the first lower member portion being a male member and of the second lower member portion being a female member.

BRIEF DESCRIPTION OF THE DRAWINGS

FIG. 14A is a perspective view of a lower connection for any one of the base structures of FIG. 1A and FIG. 19 where such lower connection includes a pair of joints, where each of the joints is a hinged joint with a vertical axis, and where each of the hinged joints is in a folded position.

FIG. 14B is a perspective view showing each of the hinged joints of FIG. 14A in an expanded and operating position.

DETAILED DESCRIPTION

Figure 1A:
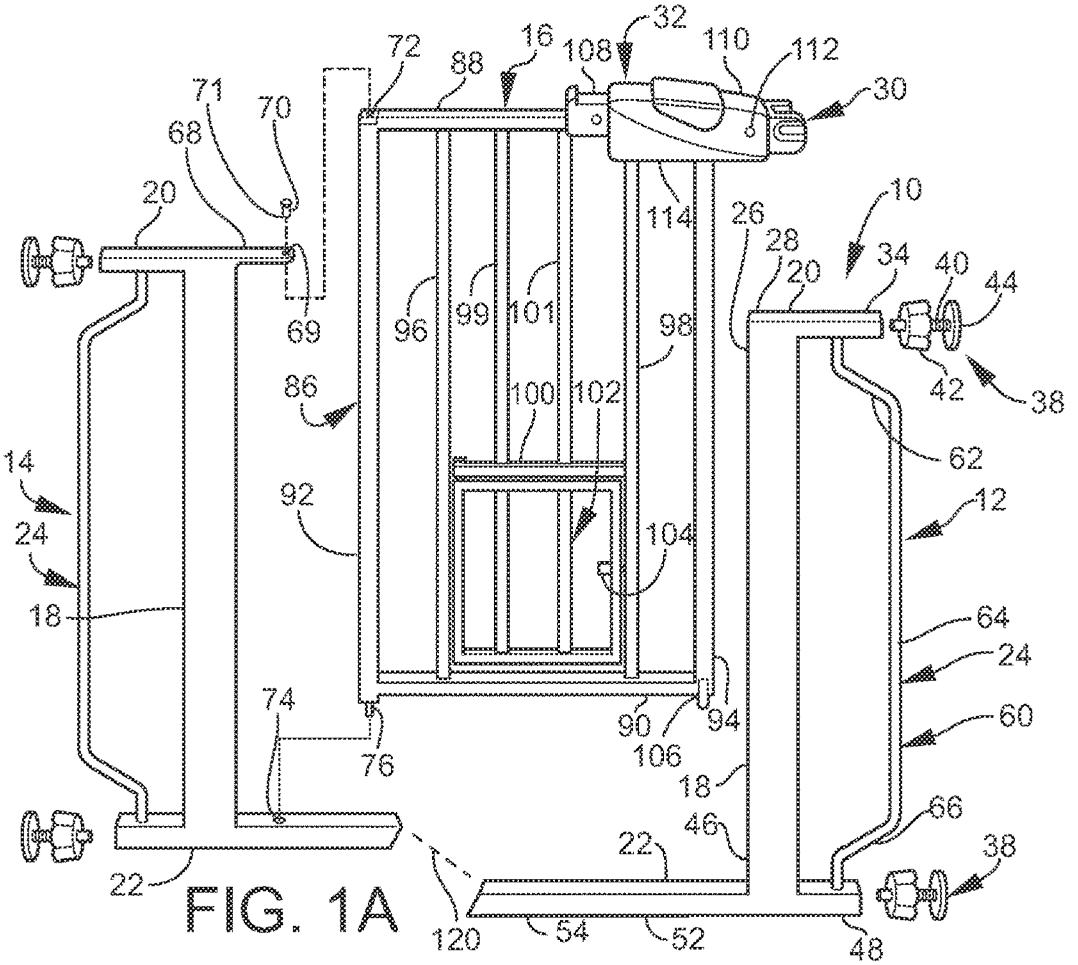
FIG. 1A is an exploded front slightly perspective view of a base structure of the assembly gate where a lower connection between right and left end frames has been omitted but may be furnished by any one of the lower connections shown in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B, 20A, 20C, 21A, 21C, 22, 24, 25, 27, 28A, 28B, 29A, and 29B, and where, after the right and left end frames are slightly modified, the omitted lower connection may be furnished with any one of the lower connections shown in FIGS. 12A, 12B, 12C, 16A, 16B, 17A and 17B.
Figure 1B:
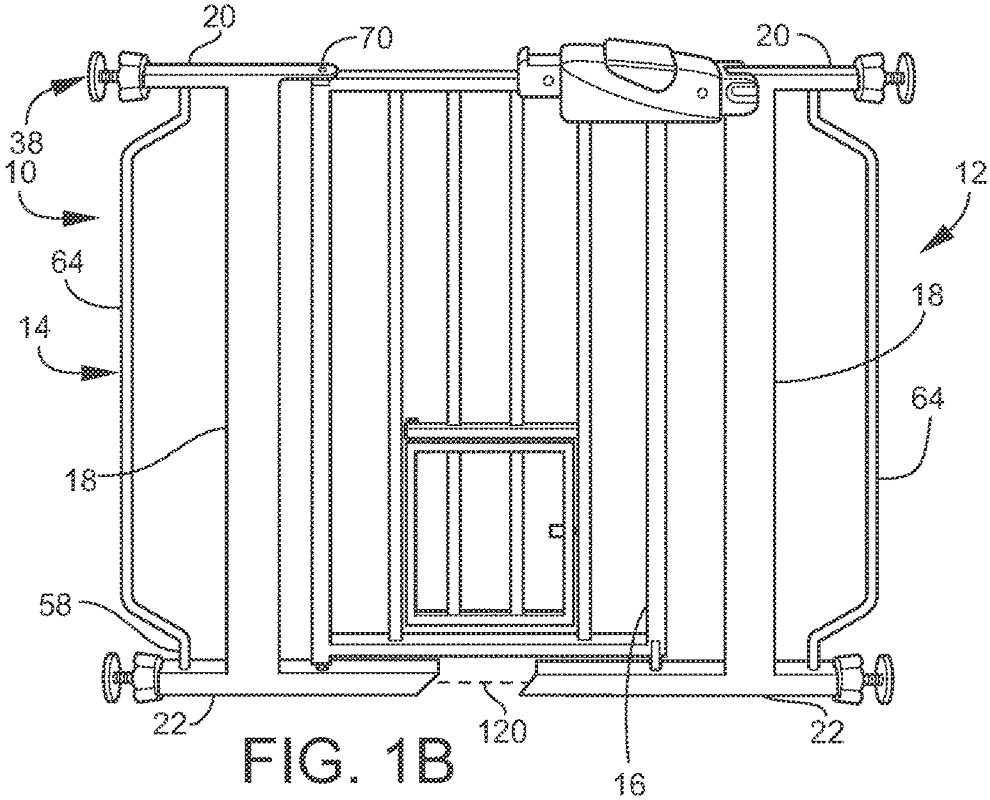
FIG. 1B is a front slightly perspective view of the base structure of FIG. 1A where the right end frame, left end frame, and gate have been assembled, where a lower connection between right and left end frames has been omitted but may be furnished by any one of the lower connections shown in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B, 20A, 20C, 21A, 21C, 22, 24, 25, 27, 28A, 28B, 29A, and 29B, and where, after the right and left end frames are slightly modified, the omitted lower connection may be furnished with any one of the lower connections shown in FIGS. 12A, 12B, 12C, 16A, 16B, 17A and 17B.

As shown in FIGS. 1A and 1B, the base assembly gate or base barrier is indicated in general by the reference numeral 10. Barrier 10 generally includes a first end frame 12, a second end frame 14, and a gate 16 engagable between the end frames 12, 14. Barrier 10 includes a height direction, a length direction defined, for example, by the direction between two door jambs between which the barrier 10 is engaged, and a width or thickness direction. The height, length and width (or thickness) directions extend perpendicular to each other.

First end frame 12 includes a gate confronting standard 18, an upper member 20, a lower member 22, and an end member 24. Standard or upright member 18 confronts the gate 16, is elongate in the height direction, and extends between the upper and lower members 20, 22 with which standard 18 is integral and one-piece. Such an integral and one-piece connection is formed, for example, by welding. Standard 18 is tubular, may be formed of a metal such as steel or aluminum, and is generally rectangular in section. Standard 18 includes an axis extending in the height direction, gate confronting portion 52 of lower member 22 includes an axis extending inwardly from standard 18 in the length direction, and such two axes are oblique relative to each other. In other words, such two axes are slightly greater than ninety degrees, with a range of such two axes being between 90.5 and 100 degrees, more preferably between 90.5 and 95 degrees. An upper end portion 26 and/or an inner end portion 28 of upper member 20 can receive a catch 30 of a latch 32 of the gate 16.

Upper member 20 is elongate in the length direction and extends outwardly from the upper end portion 26 of the standard 18. Upper member 20 is tubular, may be formed of a metal such as steel or aluminum, and is generally square in section. Upper member 20 includes an outer end 34 that includes an opening for slidingly receiving a pressurizing turnable arm 38. Arm 38 includes a threaded shaft 40 that engages such opening in a sliding fashion. Spinnable on the threaded shaft 40 is a hand or finger knob or hand wheel 42 that is threaded and engages the threads of the shaft 40. Fixed to the end of the threaded shaft 40 is a disk 44 for making contact with and bringing pressure to bear upon a location or surface such as a door jamb. In use, the inner end of hand or finger knob 42 makes contact with the end 34 and, as the knob 42 is rotated into the end 34, such rotation draws the threaded shaft 40 in the outward direction and draws the disk 44 outwardly to apply pressure against the door jamb. If desired, disk 44 may be set in a cup or receptacle, having a recess about the size of the disk 44, where such cup or receptacle is screwed to the door jamb. Such cup or receptacle minimizes transverse or up or down movement of the disk 44 relative to the door jamb.

Lower member 22 is elongate in the length direction, runs generally parallel to the upper member 20 when the barrier 10 is assembled, and extends inwardly and outwardly relative to a lower end portion 46 of standard 18. Lower member 22 is tubular, may be formed of a metal such as steel or aluminum, and is generally rectangular in section. The dimensions of the rectangular section of lower member 22 may be identical with the dimensions of the rectangular section of standard 18. In other words, the height and width of the rectangular section of lower member 22 may be identical to the length and width of the rectangular section of standard 18. Lower member 22 includes an outer end portion or end 48 having an opening, where such opening extends inwardly along and spaced from an upper edge of lower member 22 and extends in the length direction. This opening slidingly receives another turnable arm 38. Lower member 22 includes gate confronting inwardly extending portion 52 having an inner end portion 54. Lower member portion 22 and its inner end portion 54 may be or include one of the many connections shown in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B 20A, 20C, 21A, 21C, 22, 24, 25, 27, 28A, 28B, 29A, and 29B, and where, after the right and left end frames are slightly modified, the omitted lower connection may be furnished with any one of the lower connections shown in FIGS. 12A, 12B, 12C, 16A, 16B, 17A and 17B.

End member 24 of first end frame 12 includes a tubular post section or upright member section 58 engaged to each of upper member 20 and the outer end portion 48 of lower member 22. Post section 58 is integral and one-piece with upper member 20 and outer end portion 48. Tubular post section 58 is tubular, may be formed of a metal such as steel or aluminum, and is circular in section. Extending outwardly off the tubular post section 58 is a C-shaped upright member 60 having a downwardly and outwardly oblique member portion 62, a medial upright member portion 64, and an upwardly and outwardly oblique member portion 66. C-shaped member 62 is integral and one-piece with post section 58. Member portions 62 and 66 engage post sections 58 at junctions terminating short of the upper member 20 and lower member 22, respectively. C-shaped upright member 60 is a cylindrical member and is preferably formed of a metal such as aluminum or steel. Each of standard 18, post section 58, and member portion 64 includes an axis, and such axes are equidistant from each other. Standard 18 has a greater length than either the length of post section 58 or the length of post 64 (where the length direction is defined as the direction between the two locations between which the barrier 10 is engaged) because, for example, standard 18 along with lower member 22 provides the pressure for engagement between the two locations. First end frame 12 as a whole, including standard 18, upper member 20, lower member 22, post section 58, and C-shaped section 62, are integral and one-piece with each other and are set in a common plane.

Second end frame 14 is identical to first end frame 12 with the following exceptions:

1) A first exception is that second end frame 14 includes, and first end frame 12 does not include, an inwardly extending elongate relatively narrow plate mount 68 for the gate 16. Mount 68 includes a distal end having an opening 69 for a pivot lock pin 70 that engages an opening 72 in gate 16. Mount 68 is preferably formed of a metal such as steel or aluminum. Mount 68 is rigidly affixed, such as by welding, to the upper member 20 of second end frame 14 and extends in the same common plane as second end frame 14. Pin 70 is engaged between the gate 16 and the end frame 14 to which the gate 16 pivots. Pin 70 is on the axis on which the gate 16 pivots. Pin 70 includes a shaft that has an axis coaxial with the axis on which gate 16 pivots. Pin 70 includes a spring biased button 71 slideable into and out of the shaft on an axis perpendicular to the axis of the shaft. Spring biased button 71 is normally biased outwardly. The gate 16, namely member 92, includes a first opening 72 for the shaft and a second opening for the button 71. The second opening is recessed in member 92 and is spaced from first opening 72. The second opening includes two ends, with one of the ends being open to receive button 71 and with the other of the ends being closed to maximize difficulty in depressing the button 71 and thereby maximize difficulty in removing lock pin 70 and disassembling the gated pressurized barrier 10.

2) A second exception is that second end frame 14 includes, and first end frame 12 does not include, an opening 74 extending downwardly from an upper face of lower member 22 of second end frame 14. Opening 74 receives a pin 76 rigidly affixed to gate 16. Opening 69, pin 70, opening 72, opening 74 and pin 76 are coaxial with each other when the barrier 10 is assembled.

3) A third exception is that there is substantially a right angle between the axis of standard 18 and the axis of gate confronting portion 52 of second end frame 14. While an angle of slightly more than ninety degrees can be provided here, such is not required. The angle of slightly more than ninety degrees, as found between the standard 18 and gate confronting portion 52 of the first end frame 12, contributes to the resilient structure for pressurizing the barrier 10 as a whole.

Gate 16 includes a frame 86. Frame 86 is preferably formed of a metal such as steel or aluminum. Frame 86 includes an upper member 88, lower member 90, end member 92 and end member 94. Upper members 88, 90 are engaged to and between the end members 92, 94. Members 88, 90, 92, 94 are tubular and square in section. End member 92 includes the axis on which gate 16 swings. End member 92 depends slightly below and beyond lower member 90 such that lower member 90 and gate 16 as a whole is spaced slightly above the lower members 22 of end frames 12, 14. Pin 76 depends from the lower end of end member 92. Gate 16 rides on the lower end of end member 92. Frame 86 further includes a pair of tubular cylindrical posts 96, 98 engaged to and between upper and lower members 88, 90. Frame 86 further includes a tubular cylindrical member 100 running in the length direction and engaged between posts 96, 98. Frame 86 further includes upright members or tubular cylindrical posts 99, 101 running to and between member 100 and upper member 88. Frame 86 further includes a hinged pet door 102 hingedly engaged between member 100 and member 90 and extending between posts 96 and 98. Pet door 102 includes four spaced apart upright posts extending between an upper horizontal member and a lower horizontal member. Pet door 102 further includes a horizontally slideable spring biased latch 104 engaging post 98. Pet door 102 can swing out of either of the faces of the gate 16. Frame 86 further includes a stop 106 that prevents the gate 16 from swinging through the barrier 10. Instead, gate 16, because of the stop 106, swings only out of one face of the barrier 10. Stop 106 confronts and makes contact with the outer side of gate confronting portion 52 of end frame 12 when the gate 16 is closed.

Gate 16 further includes latch 32. Latch 32 includes a sliding lock 108 that locks down a pivoting lever handle 110 that swings on a pivot 112 engaged to a latch body 114. When the lock 108 is slid back, the handle 110 may be swung up so as to draw the catch 30 in and disengage the catch 30 relative to the upper end portion 26 or upper member 20 such that the gate 16 may be opened.

FIGS. 1A and 1B include a phantom line indicated by reference number 120. Phantom line 120 indicates a break between inner end portions of lower member 22. Lower member 22 includes outer end portion or end 48, gate confronting inwardly extending portion 52, and inner end portion 54. Phantom line 120 generally represents where a lower connection can be made between portions of lower member 22, and such lower connections are shown in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B 20A, 20C, 21A, 21C, 22, 24, 25, 27, 28A, 28B, 29A, and 29B. Such lower connections are also shown in FIGS. 12A, 12B, 12C, 16A, 16B, 17A and 17B where right and left end frames are slightly modified.

Figures 2A, 2B:
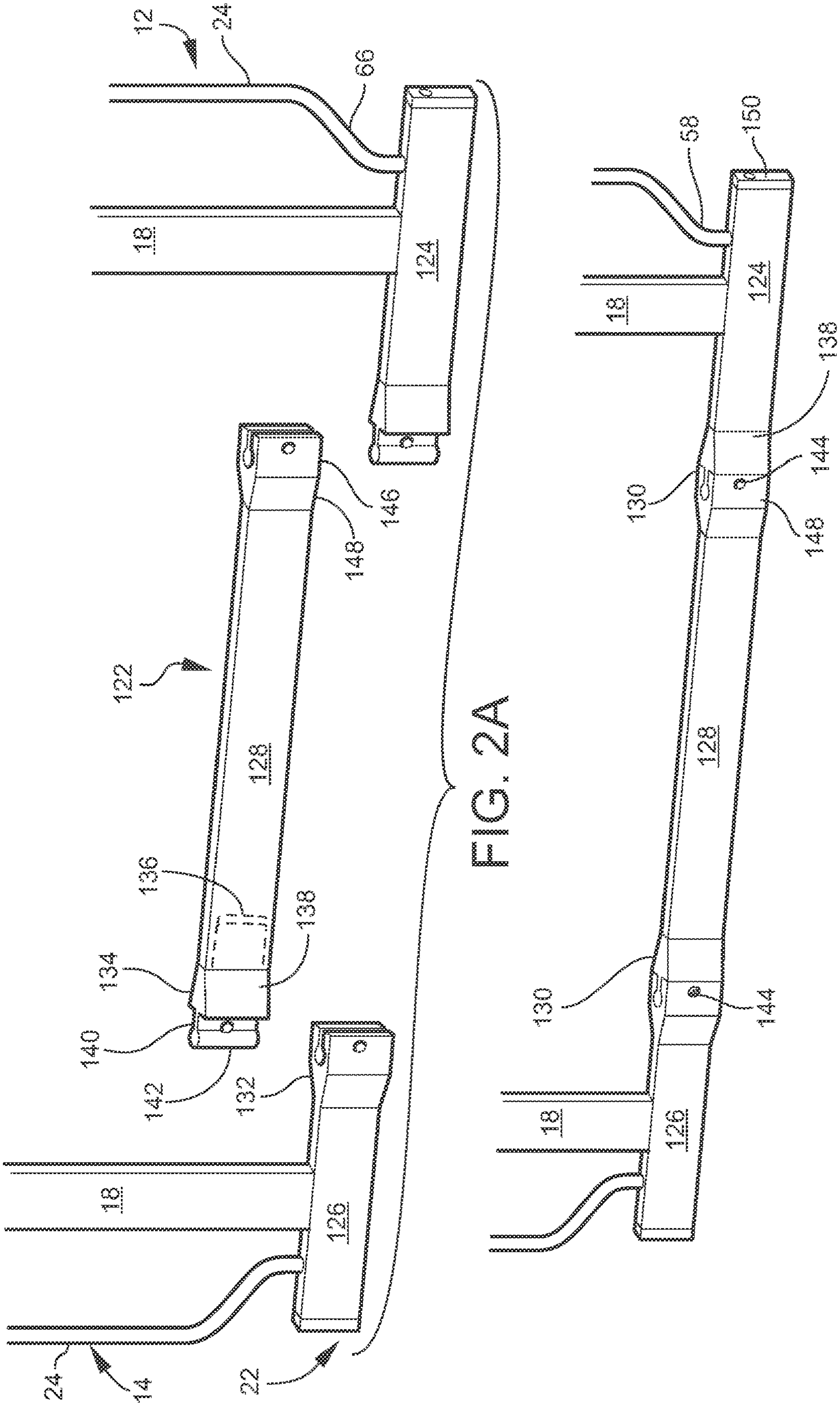
FIG. 2A is a perspective view of a lower connection for any one of the base structures of FIG. 1A and FIG. 19 where such lower connection includes two joints, where each of the joints is a vertically sliding mortise and tenon joint that may be fixed with a pin.
FIG. 2B is a perspective view showing the joint ends of each of the joints of FIG. 2A engaged.

FIGS. 2A and 2B show a lower connection 122 for the base structure of FIG. 1A. Lower connection 122 includes lower member 22, which in turn includes a first end portion 124 on the first end frame 12 and a second end portion 126 on the second end frame 14. Lower member 22 further includes an intermediate portion 128 that is engaged to the first and second end portions 124, 126 by a pair of mortise and tenon joints 130. Each of the mortise and tenon joints 130 includes a mortise joint end 132 and a tenon joint end 134. Each of the joint ends 132, 134 is engaged to its respective member portion of member 22 by a male member or tongue 136 that is inserted into its respective member portion 124, 126 or 128. Tenon joint end 134 includes a pair of opposing sidewalls 138 tapering distally and outwardly, a pair of opposing sidewalls 140 tapering distally and inwardly, and a cylindrical portion 142. Mortise joint end 132 includes a pair of tapering sidewalls for confronting sidewalls 140 and a cylindrical hole for confronting cylindrical portion 142. Joint ends 132, 134 are engagable and disengagable to and from each other by sliding the ends 132, 134 vertically relative to each other. Joint ends 132, 134 may be fixed from sliding vertically by a lateral pin 144, shown in FIG. 2B, engaging a lateral hole in each of the joint ends 132, 134. Each of the outer surfaces of the mortise joint end 132 includes a pair of opposing sidewalls 146 and a pair of opposing sidewalls 148 tapering distally and outwardly. When connected, joint ends 132, 134 define an aesthetic joint 130 having opposing intermediate parallel sidewalls 146 between tapering sidewalls 138 and 148 that taper outwardly to the width of intermediate parallel sidewalls 146. The height of joint 130 is the same as the height of member 22 and the height of member portions 124, 126, and 128. Member portions 124, 126, 128 are tubular. Each of end member portions 124, 126 is sealed by an end cap 150. Each of member portions 124, 126 and 128 with their respective joint ends 132, 134 has a length substantially equal to or less than a length of gate 16 so as to minimize the size of the carton or storage box for barrier 10.

Figures 3A, 3B:
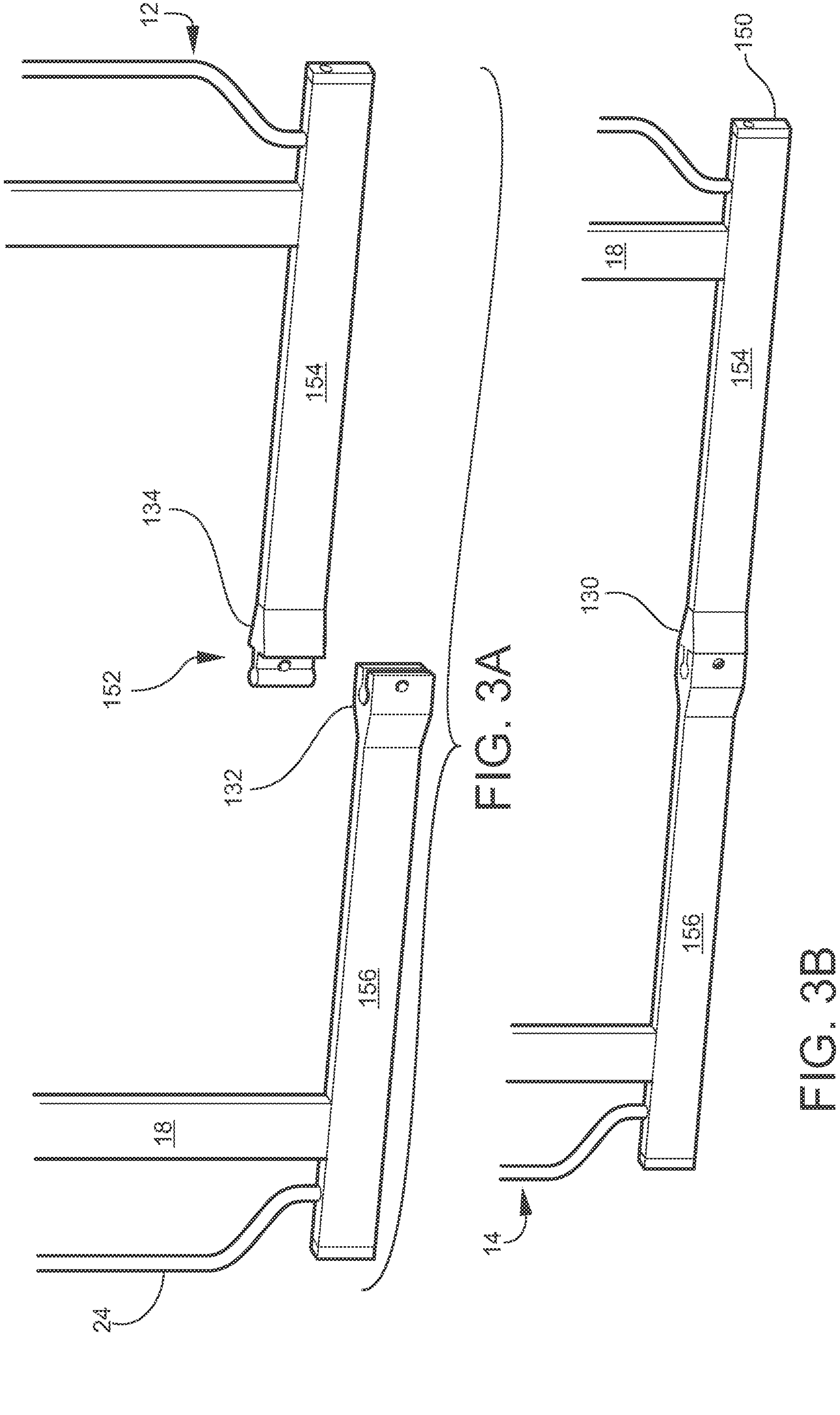
FIG. 3A is a perspective view of a lower connection for any one of the base structures of FIG. 1A and FIG. 19 where such lower connection includes a single joint, where the single joint is a vertically sliding mortise and tenon joint that may be fixed with a pin.
FIG. 3B is a perspective view showing the joint ends of the joint of FIG. 3A engaged.

FIGS. 3A and 3B show a lower connection 152. Lower connection 152 includes a single joint, with such single joint being joint 130 having mortise joint end 132 and tenon joint end 134, which are also shown in FIGS. 2A and 2B. In FIGS. 3A and 3B there is no intermediate joint 128. Instead lower member 22 includes first end member 154 (that has a greater length than first end member 124 of lower connection 122 of FIGS. 2A and 2B) and second end member 156 (that has a greater length than second end member 126 of lower connection 122 of FIGS. 2A and 2B). Each of member portions 154, 156 with their respective joint end 132, 134 has a length substantially equal to or less than a length of gate 16 so as to minimize the size of the carton or storage box for barrier 10. Each of member portions 154, 156 is tubular and includes end cap 150.

Figures 4A, 4B:
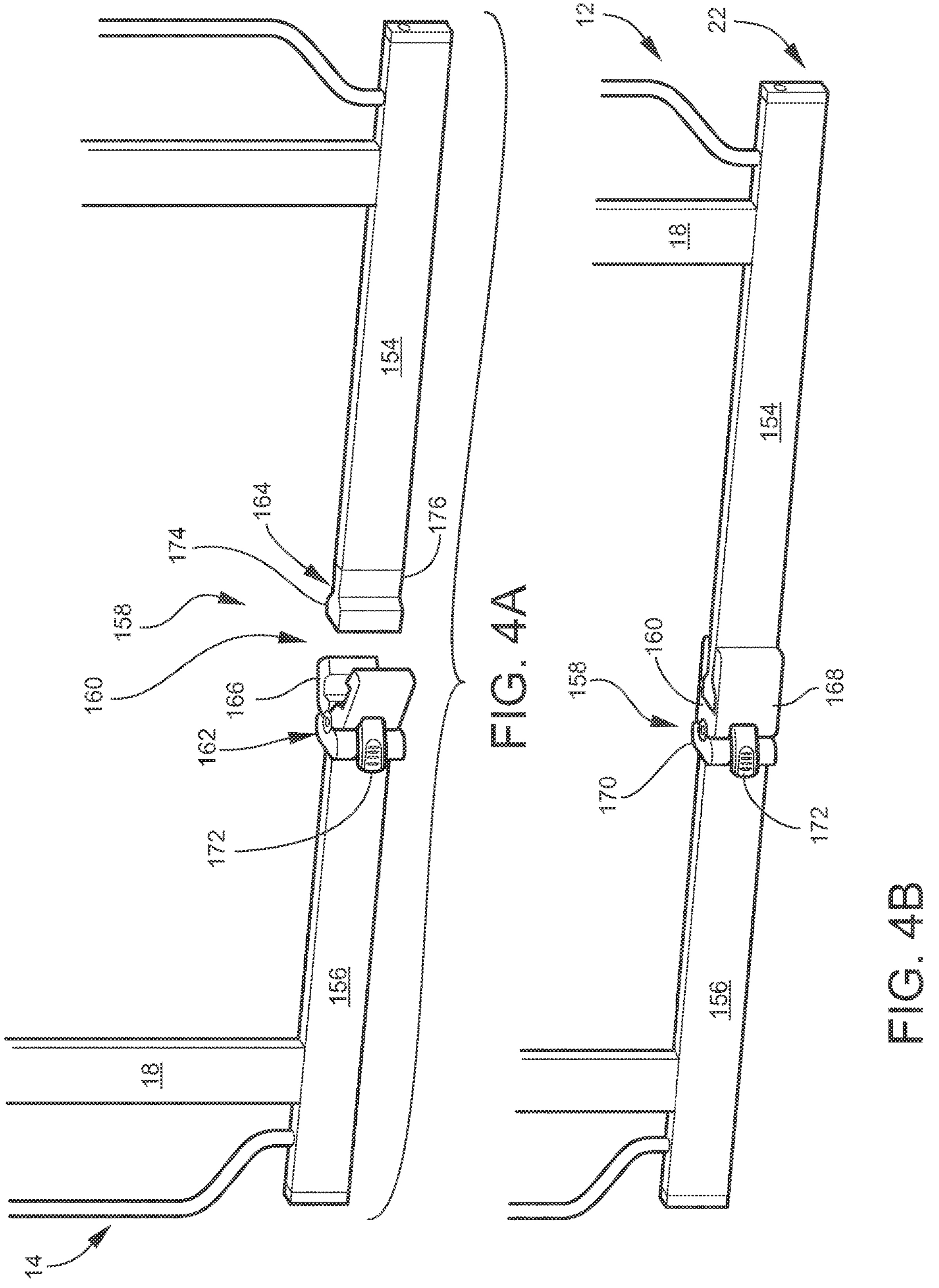
FIG. 4A is a perspective view of a lower connection for any one of the base structures of FIG. 1A and FIG. 19 where such lower connection includes a single joint, where the single joint includes an over-center clamping mortise and tenon joint.
FIG. 4B is a perspective view showing the joint ends of the joint of FIG. 4A engaged.

FIGS. 4A and 4B show a lower connection 158. Lower connection 158 includes a single joint, with such single joint being joint 160 having a clamping joint end 162 and clamped joint end 164. Joint end 162 may also be referred to as a mortise joint end 162 when the joint end 162 is closed. Joint end 164 may also be referred to as a tenon joint end 164 when the mortise joint end 162 is closed. Joint ends 162 are engaged to the inner ends of end members 154, 156 using tongue 136 shown in FIG. 2A.

Clamping joint end 162 includes a pair of jaws 166, 168 that pivot relative to each other. Jaws 166, 168 are hingedly secured to a laterally extending base 170 that in turn is secured to an inner end of member 156 by tongue 136. A lever 172 pivotally engaged on one or both sides of base 170 and further pivotally engaged between one or more of jaws 166, 168 may be pivotally actuated to swing the jaws 166, 168 open and closed. Lever 172 and/or jaws 166, 168 and/or the hinged connection to base 170 may utilize an over-center mechanism to swing the jaws 166, 168 open and closed. When the jaws 166, 168 are closed, inner surfaces of the jaws 166, 168 form a keyhole slot for receiving the clamped or tenon joint end 164.

Clamped joint end 164 or tenon joint end 164 forms the shape of a keyhole for mating with clamping joint end 162 when clamping joint end 162 is closed. Clamped or tenon joint end 164 includes a relatively wide block distal head end 174 and a relatively narrow neck end 176. Narrow neck end 176 has the same width as member 22, including member portion 154. Neck end 176 includes tongue 136 for engagement to member portion 154.

If desired, the clamping pressure of jaws 166, 168 can be relatively great, when jaws 166, 168 are closed, so as to prevent vertically sliding of joint ends 162, 164 relative to each other.

If desired, the clamping pressure of jaws 166, 168 can be relatively light, when jaws 166, 168 are closed, so as to permit vertically sliding of joint ends 162, 164 relative to each other. Where the clamping pressure of jaws 166, 168 is relatively light, joint ends 162 and 164 can be engaged and disengaged to and from each other in a vertically sliding manner.

When jaws 166, 168 are open, jaws 166, 168 may be actuated to close by tenon end 164 being pushed into the clamping end 162. The distal face of tenon end 164 pushes against proximal end faces of jaws 166, 168 so as to pivot the distal portions of the jaws 166, 168 closed and, optionally, to pivot the levers 172 to a locked position. In such case where the levers 102 lock, the reverse action of pulling the tenon end 164 in the opposite direction does not draw the jaws 166, 168 open, however, until the levers 172 are pivoted to release the over-center mechanism or draw the over-center mechanism over center. Member portions 284, 286 are tubular.

Figures 5A, 5B:
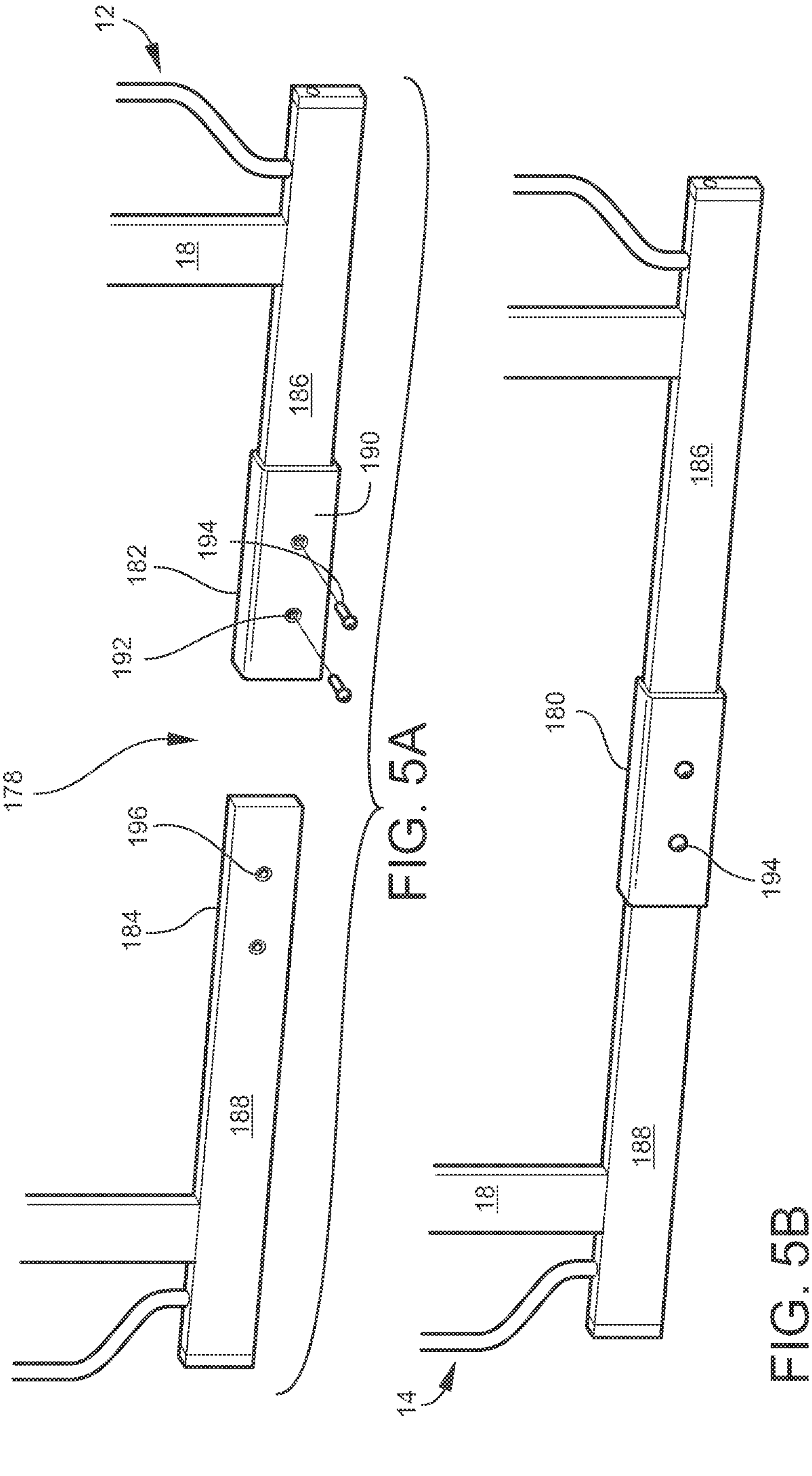
FIG. 5A is a perspective view of a lower connection for any one of the base structures of FIG. 1A and FIG. 19 where such lower connection includes a single joint, where the single joint includes a pinnable male/female joint, where the female joint is a rectangular sleeve.
FIG. 5B is a perspective view showing the joint ends of the joint of FIG. 5A engaged.

FIGS. 5A and 5B show a lower connection 178. Lower connection 178 includes a single joint, with such single joint being joint 180 having a female joint end 182 and male joint end 184. Lower connection 178 further includes lower member 22 that includes end member portion 186 and end member portion 188.

End member portion 186 may have a lesser length than end member portion 188 because of the extending female joint end 182 that extends beyond the distal end of end member portion 186. Each of end member portions 186, 188 with their respective joint ends 182, 184 has a length substantially equal to or less than a length of gate 16 so as to minimize the size of the carton or storage box for barrier 10.

Female joint end 182 is a sleeve and is engaged to the distal end of member portion 186 by receiving such distal end into such sleeve. This distal end may be frictionally fit into such sleeve or this distal end may be adhesively secured to inner face portions of this sleeve. Female joint end or sleeve 182 extends for 360 degrees. Each of the opposing upright side walls 190 of sleeve 182 includes a pair of horizontally aligned apertures 192 that receive pins 194.

Male joint end 184 is integral and one-piece with member portion 188. Male joint end 184 includes the same width and height of member portion 188. Male joint end 184 includes a pair of horizontally aligned apertures 196 that are alignable with the four apertures in sleeve 182. Apertures 196 may be lined with a cylinder. Pins 194 engage the joint ends 182, 184 to each other to form joint 180 after male joint end 184 is axially slid into female joint end 182. The distal end faces of member portions 186, 188 may confront each other when the joint ends 182, 184 are connected by the pin and sleeve combination. The distal end faces of member portions 186, 188 may make face to face contact with each other when the joint ends 182, 184 are connected by the pin and sleeve combination. Pins 194 may be readily removable when in the form of screws. Pins 194 may be permanently engaged to sleeve 182 when in the form of rivets. Member portions 186, 188 are tubular.

Figure 6A:
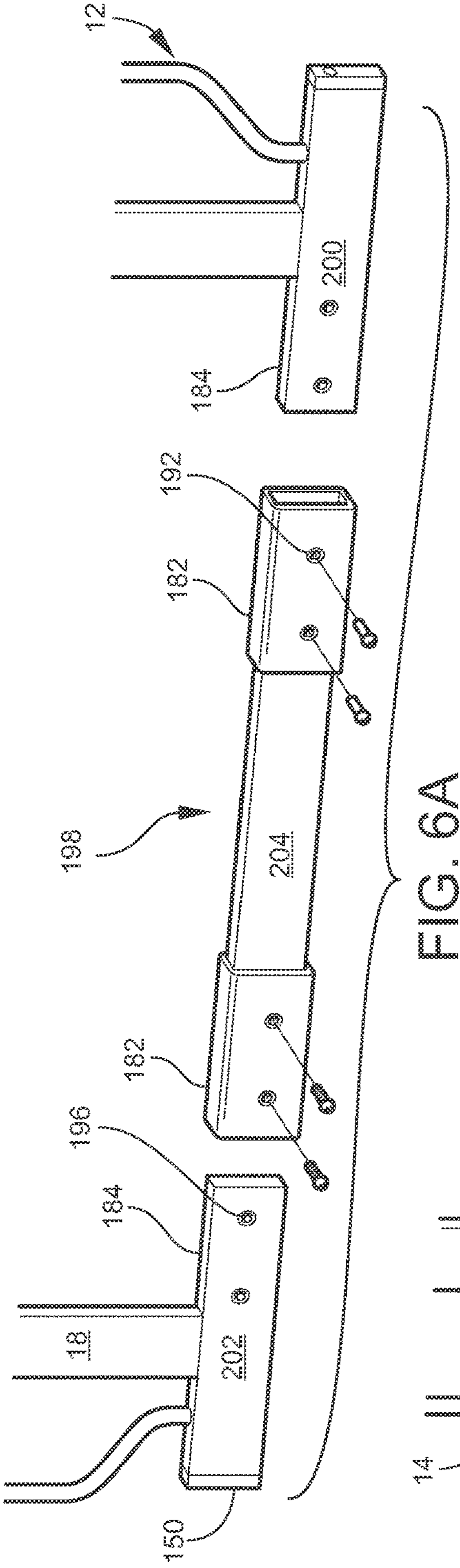
FIG. 6A is a perspective view of a lower connection for any one of the base structures of FIG. 1A and FIG. 19 where such lower connection includes a pair of joints, where each of the joints includes a pinnable male/female joint, where the female joint is a rectangular sleeve.
Figure 6B:
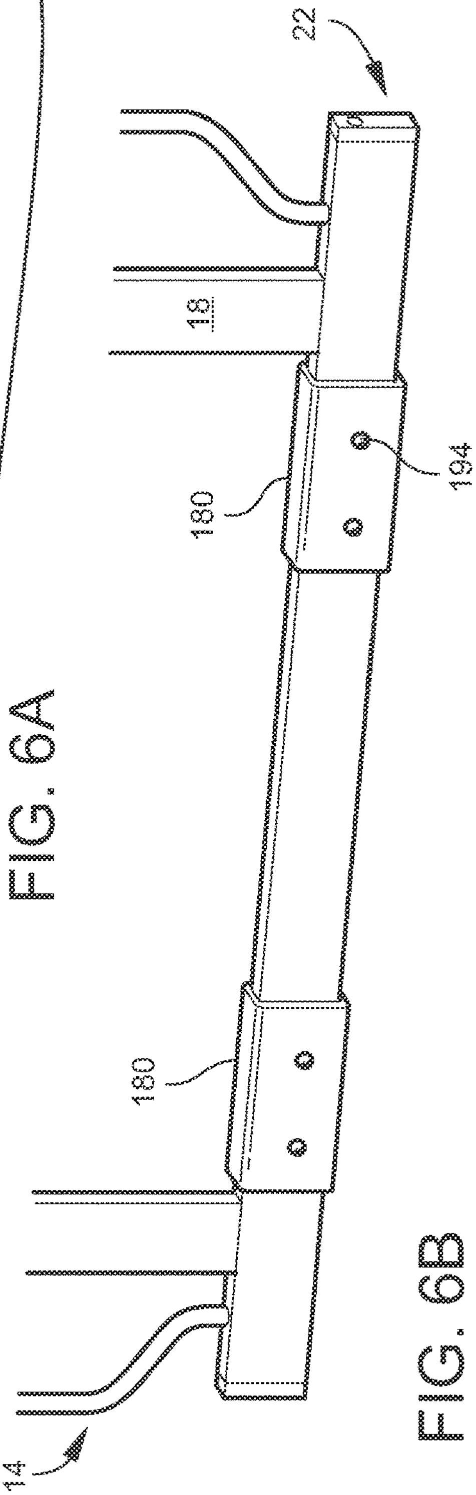
FIG. 6B is a perspective view showing the joint ends of each of the joints of FIG. 6A engaged.

FIGS. 6A and 6B show a lower connection 198. Lower connection 198 includes a pair of joints, with each of the joints being joint 180 shown in FIG. 5B with female joint end 182 and male joint end 184. Lower connection 198 further includes member 22 that includes end member portion 200 engaged to first end frame portion 12, end member portion 202 engaged to second end frame portion 14, and intermediate member portion 204 engaged to and between end member portions 200, 202. Each of member portions 200, 202, 204 with their respective joint ends 182, 184 has a length substantially equal to or less than a length of gate 16 so as to minimize the size of the carton or storage box for barrier 10. Member portions 200, 202, and 204 are tubular.

Female joint ends 182 are engaged to the distal ends of intermediate end portion 204 such as with a friction fit and/or with an adhesive. Male joint end 184 is an integral and one-piece extension of its respective end member portion 200, 202 and includes the same width and height thereof. When female joint end 182 is engaged on its respective end member portion 200, 202, female joint end 182 confronts its respective standard or upright support member 18.

Figures 7A, 7B, 7C:
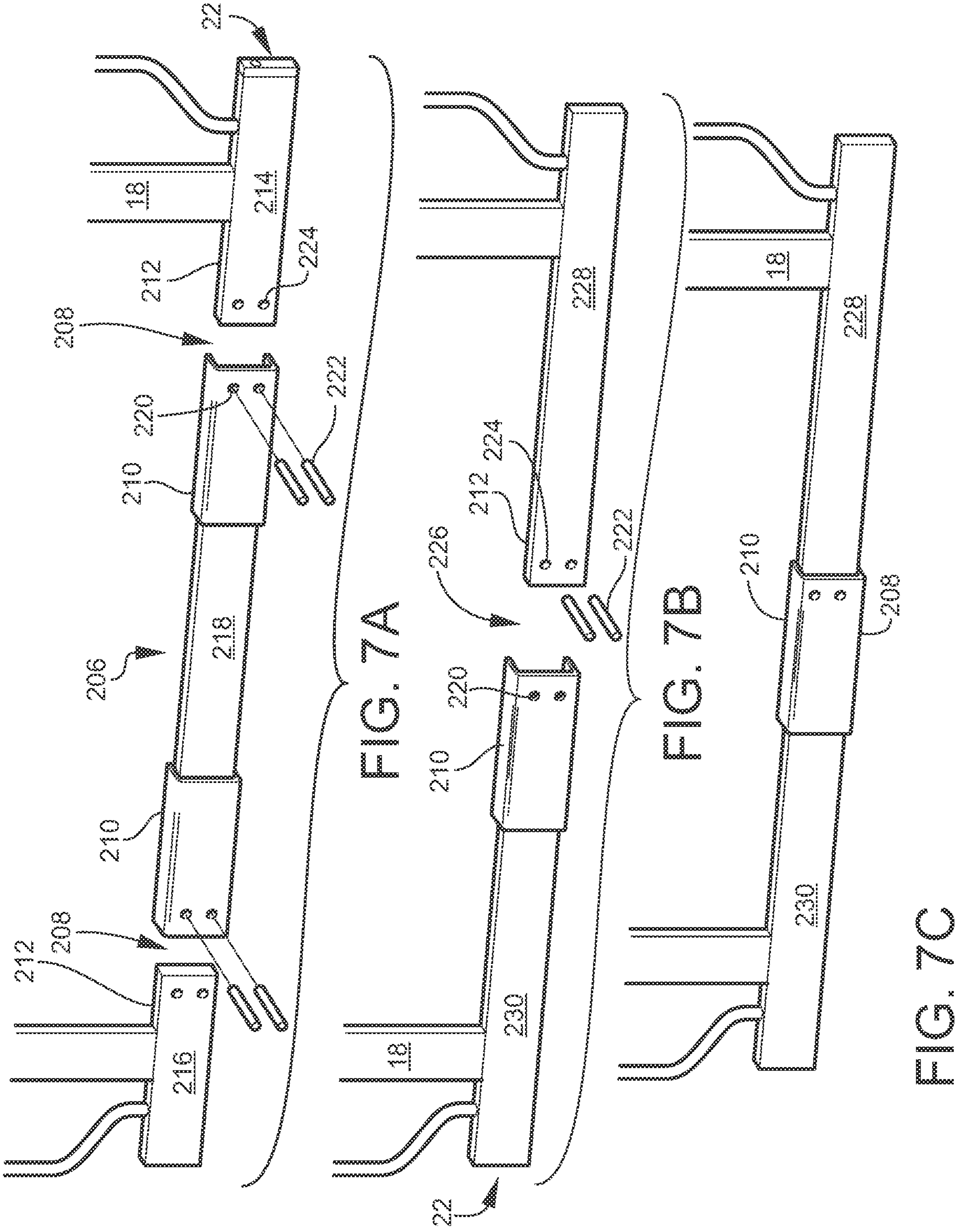
FIG. 7A is a perspective view of a lower connection for any one of the base structures of FIG. 1A and FIG. 19 where such lower connection includes a pair of joints, where each of the joints includes a U-shaped joint end pinnable to a rectangular free joint end.
FIG. 7B is a perspective view of a lower connection for any one of the base structures of FIG. 1A and FIG. 19 where such lower connection includes a single joint, where the single joint includes a U-shaped joint end pinnable to a rectangular free joint end.
FIG. 7C is a perspective view showing the joint ends of FIG. 7B engaged.

FIG. 7A shows a lower connection 206. Lower connection 206 includes a pair of joints, with each of the joints being a joint 208 formed by an open channel joint end 210 and a male joint end 212. Lower connection 206 further includes member 22 that includes end member portion 214 engaged to first end frame portion 12, end member portion 216 engaged to second end frame portion 14, and intermediate member portion 218 engaged to and between end member portions 214, 216. Each of member portions 214, 216, 218 with their respective joint ends 210, 212 has a length substantially equal to or less than a length of gate 16 so as to minimize the size of the carton or storage box for barrier 10. Member portions 214, 216, and 218 are tubular.

Channel joint end 210 is an elongate open channeled or C-shaped or U-shaped piece and is engaged to a respective distal end of intermediate member portion 218 by receiving such distal end into such channel. Such distal end may be frictionally fit into such channel and/or such distal end may be adhesively secured to the three inner face portions of such channel. Channel joint end 210 includes three sides, which three sides include opposing top and bottom sides and a sidewall. The sidewall of channel joint end 210 includes a pair of vertically aligned apertures 220 that receive pins 222.

Male joint end 212 is integral and one-piece with its respective member portion 214, 216. Male joint end 212 includes the same width and height of member 22, including member portions 214, 216, 218. Male joint end 212 includes a pair of vertically aligned apertures 224 that are alignable with the two apertures in its respective channel joint end 210. Apertures 224 may be lined with a cylinder.

Pins 222 engage the joint ends 210, 212 to each other to form joint 208 after male joint end 212 is axially slid into channel joint end 210. Instead of or in combination with such an axial or longitudinal sliding, male joint end 212 and channel joint end 210 may be brought together from respective non-axial or nonlongitudinal positions, such as from lateral positions relative to each other, utilizing the open face of the open channel.

The distal end faces of respective member portions 214 and 218 may confront each other when the joint ends 210, 212 are connected by the pin and channel combination. The distal end faces of respective member portions 216 and 218 may confront each other when the joint ends 210, 212 are connected by the pin and channel combination. The distal end faces of respective member portions 214 and 218 may make face to face contact with each other when the joint ends 210, 212 are connected by the pin and channel combination. The distal end faces of respective member portions 216 and 218 may make face to face contact each other when the joint ends 210, 212 are connected by the pin and channel combination. Pins 222 may be readily removable when in the form of screws. Pins 222 may be permanently engaged to joint 208 and member portions 214, 216, 218 when in the form of rivets.

When channel joint end 210 is engaged on its respective end member portion 214, 216, channel joint end 210 confronts its respective standard or upright support member 18.

FIGS. 7B and 7C show a lower connection 226. Lower connection 226 includes a single joint, with such single joint being joint 208 having channel joint end 210 and male joint end 212. Lower connection 226 further includes lower member 22 that includes end member portion 228 and end member portion 230.

End member portion 228 may be about the same length as the combination of end member portion 230 and its channel joint end 210 such that each of member portions 228, 230 with their respective joint ends 210, 212 has a length substantially equal to or less than a length of gate 16 so as to minimize the size of the carton or storage box for barrier 10. Member portions 228, 230 are tubular.

Figures 8A, 8B, 8C:
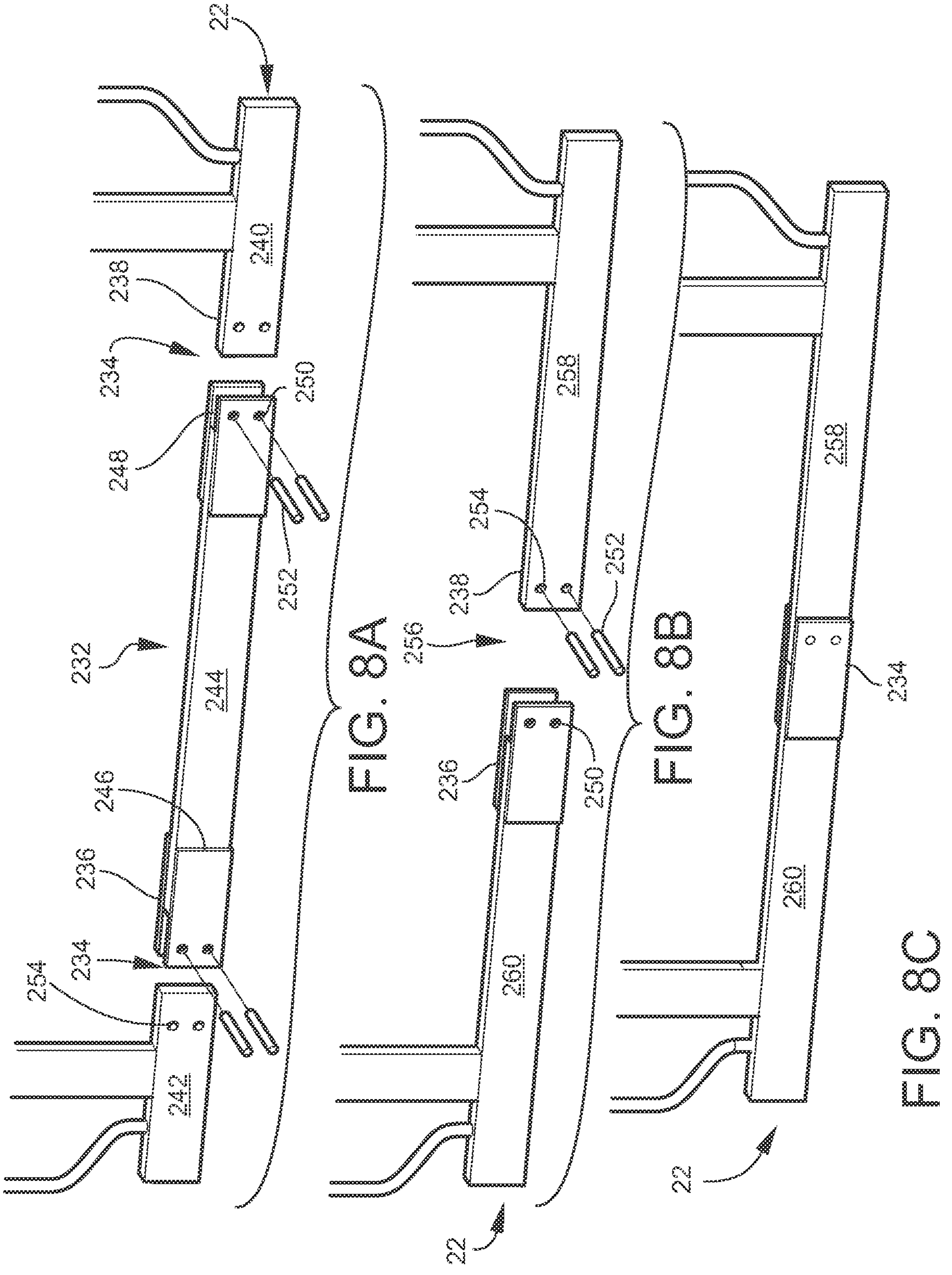
FIG. 8A is a perspective view of a lower connection for any one of the base structures of FIG. 1A and FIG. 19 where such lower connection includes a pair of joints, where each of the joints includes a joint end formed by spaced apart plates that are pinnable to a rectangular free joint end.
FIG. 8B is a perspective view of a lower connection for any one of the base structures of FIG. 1A and FIG. 19 where such lower connection includes a single joint, where the single joint includes a joint end formed by spaced apart plates that are pinnable to a rectangular free joint end.
FIG. 8C is a perspective view showing the joint ends of FIG. 8B engaged.

FIG. 8A shows a lower connection 232. Lower connection 232 includes a pair of joints, with each of the joints being a joint 234 formed by a vertical slot joint end 236 and a male joint end 236. Lower connection 232 further includes member 22 that includes end member portion 240 engaged to first end frame portion 12, end member portion 242 engaged to second end frame portion 14, and intermediate member portion 244 engaged to and between end member portions 240, 242. Each of member portions 240, 242, 244 with their respective joint ends 236, 238 has a length substantially equal to or less than a length of gate 16 so as to minimize the size of the carton or storage box for barrier 10. Member portions 240, 242, and 244 are tubular.

Vertical slot joint end 236 includes a pair of opposing plates 246 that forms a vertical slot 248 having an open top end, an open bottom end, and an open distal end. Each of the opposing plates 246 is engaged to a respective distal end of intermediate member portion 244 by receiving such distal end between the opposing plates 246. Such distal end may be adhesively secured or pinned or otherwise engaged to the inner faces of the opposing plates 246. The portions of the plates 246 that extend beyond the distal ends of intermediate member portion 244 each include a pair of vertically aligned apertures 250 that receive pins 252.

Male joint end 238 is integral and one-piece with its respective member portion 240, 242. Male joint end 238 includes the same width and height of member 22, including member portions 240, 242, 244. Male joint end 238 includes a pair of vertically aligned apertures 254 that are alignable with the four apertures in its respective vertical slot joint end 236. Apertures 254 may be lined with a cylinder.

Pins 252 engage the joint ends 236, 238 to each other to form joint 234 after the joint ends 236, 238 are brought together. Joint ends 236, 238 may be brought together axially or longitudinally utilizing the distal open end of slot 248, or vertically relative to each other utilizing one of the open bottom or open top of slot 248, or some combination of the open end, open bottom and open top of slot 248.

The distal end faces of respective member portions 240 and 244 may confront each other when the joint ends 236, 238 are connected by the pin and opposing plates combination. The distal end faces of respective member portions 242 and 244 may confront each other when the joint ends 236, 238 are connected by the pin and opposing plates combination. The distal end faces of respective member portions 240 and 244 may make face to face contact with each other when the joint ends 236, 238 are connected by the pin and opposing plate combination. The distal end faces of respective member portions 242 and 244 may make face to face contact each other when the joint ends 236, 238 are connected by the pin and vertical plate combination. Pins

252 may be readily removable when in the form of screws. Pins 252 may be permanently engaged to joint 234 and member portions 240, 242 and 244 when in the form of rivets.

When opposing plate joint end 236 is engaged on its respective member portion 240, 242, opposing plate joint end 236 confronts its respective standard or upright support member 18.

FIGS. 8B and 8C show a lower connection 256. Lower connection 256 includes a single joint, with such single joint being joint 234 having vertical slot or opposing plates joint end 236 and male joint end 238. Lower connection 256 further includes lower member 22 that includes end member portion 258 and end member portion 260.

End member portion 258 may be about the same length as the combination of end member portion 260 and its opposing plate joint end 236 such that each of member portions 258, 260 with their respective joint ends 238, 236 has a length substantially equal to or less than a length of gate 16 so as to minimize the size of the carton or storage box for barrier 10. Member portions 258, 260 are tubular.

Figures 9A, 9B, 9C:
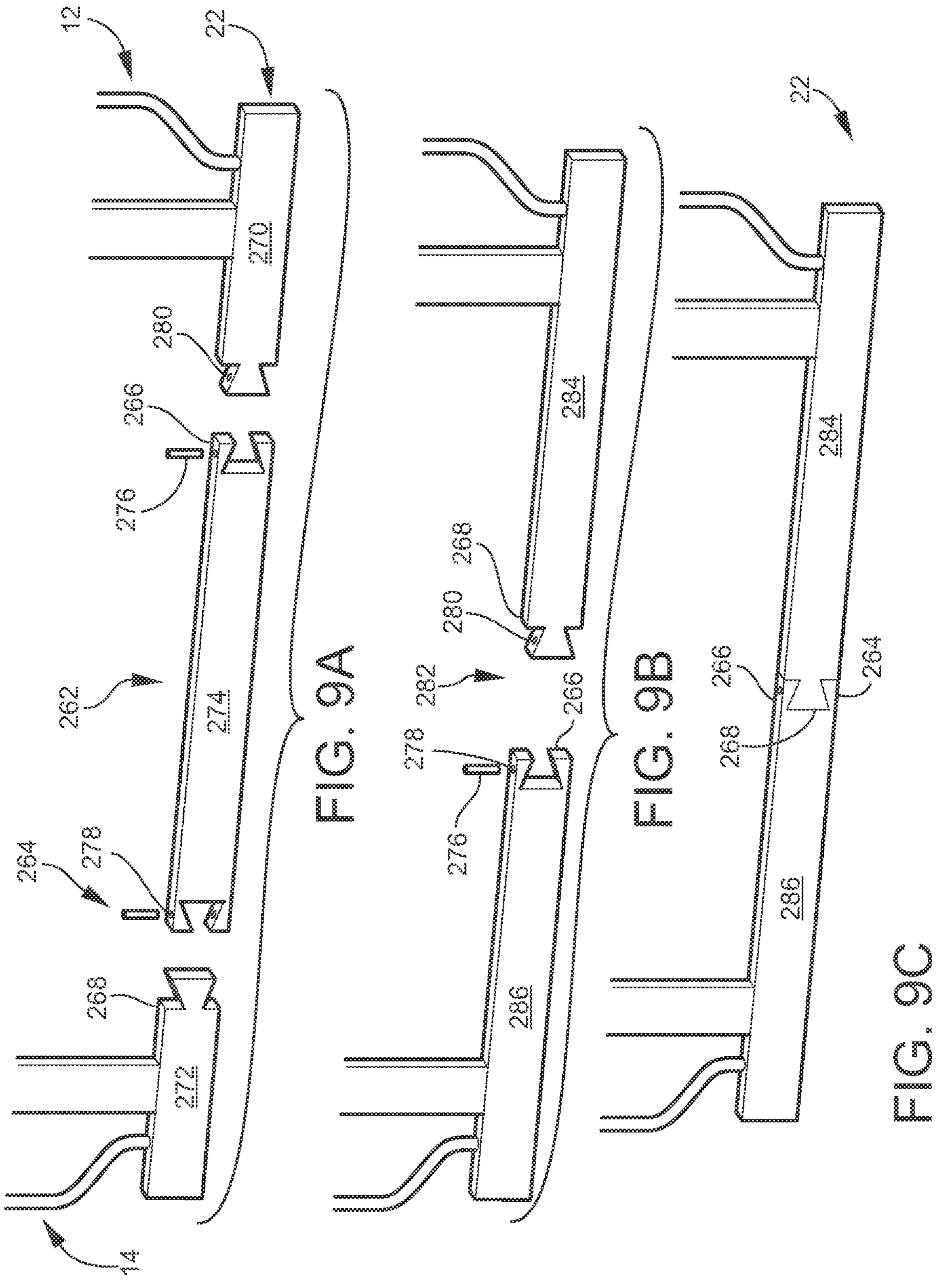
FIG. 9A is a perspective view of a lower connection for any one of the base structures of FIG. 1A and FIG. 19 where such lower connection includes a pair of joints, where each of the joints includes a horizontally slideable and pinnable dovetail mortise and tenon joint.
FIG. 9B is a perspective view of a lower connection for any one of the base structures of FIG. 1A and FIG. 19 where such lower connection includes a single joint, where the single joint includes a horizontally slideable and pinnable dovetail mortise and tenon joint.
FIG. 9C is a perspective view showing the joint ends of FIG. 9B engaged.

FIG. 9A shows a lower connection 262. Lower connection 262 includes a pair of joints, with each of the joints being a joint 264 formed by a mortise joint end 266 and a tenon joint end 268. Lower connection 262 further includes member 22 that includes end member portion 270 engaged to first end frame portion 12, end member portion 272 engaged to second end frame portion 14, and intermediate member portion 274 engaged to and between end member portions 270, 272. Each of member portions 270, 272, 274 with their respective joint ends 266, 268 has a length substantially equal to or less than a length of gate 16 so as to minimize the size of the carton or storage box for barrier 10. Member portions 270, 272, and 274 are tubular.

Mortise joint end 266 is a dovetail mortise joint end 266 that is engaged to a respective distal end of intermediate member portion 274 by tongue 136. Tenon joint end 268 is a dovetail tenon joint end 268 that is engaged to a respective end member portion 270, 272 by tongue 136.

Mortise joint end 266 and tenon joint end 268 are engaged or disengaged by a horizontally sliding action. Mortise joint end 266 and tenon joint end 268 may be further joined to each other, to prevent such horizontal sliding action, by a pin 276 engagable in mortise vertical aperture 278 and tenon vertical aperture 280. Apertures 278, 280 become aligned with each other when side faces of the joint ends 266, 268 are flush with each other. Pins 276 engage the joint ends 266, 268 to each other to form joint 264 after joint ends 266, 268 have been horizontally slid relative to each other.

Pins 276 may be readily removable when in the form of screws. Pins 276 may be permanently engaged to joint 264 and member portions 270, 272, 274 when in the form of rivets.

FIGS. 9B and 9C show a lower connection 282. Lower connection 282 includes a single joint, with such single joint being joint 264 having mortise joint end 266 and tenon joint end 268. Lower connection 282 further includes lower member 22 that includes end member portion 284 and end member portion 286.

End member portion 284 and its tenon joint end 268 may be about the same length as the combination of end member portion 286 and its mortise joint end 266 such that each of member portions 284, 286 with their respective joint ends 268, 266 has a length substantially equal to or less than a length of gate 16 so as to minimize the size of the carton or storage box for barrier 10. Member portions 284, 286 are tubular.

Figures 10A, 10B, 10C:
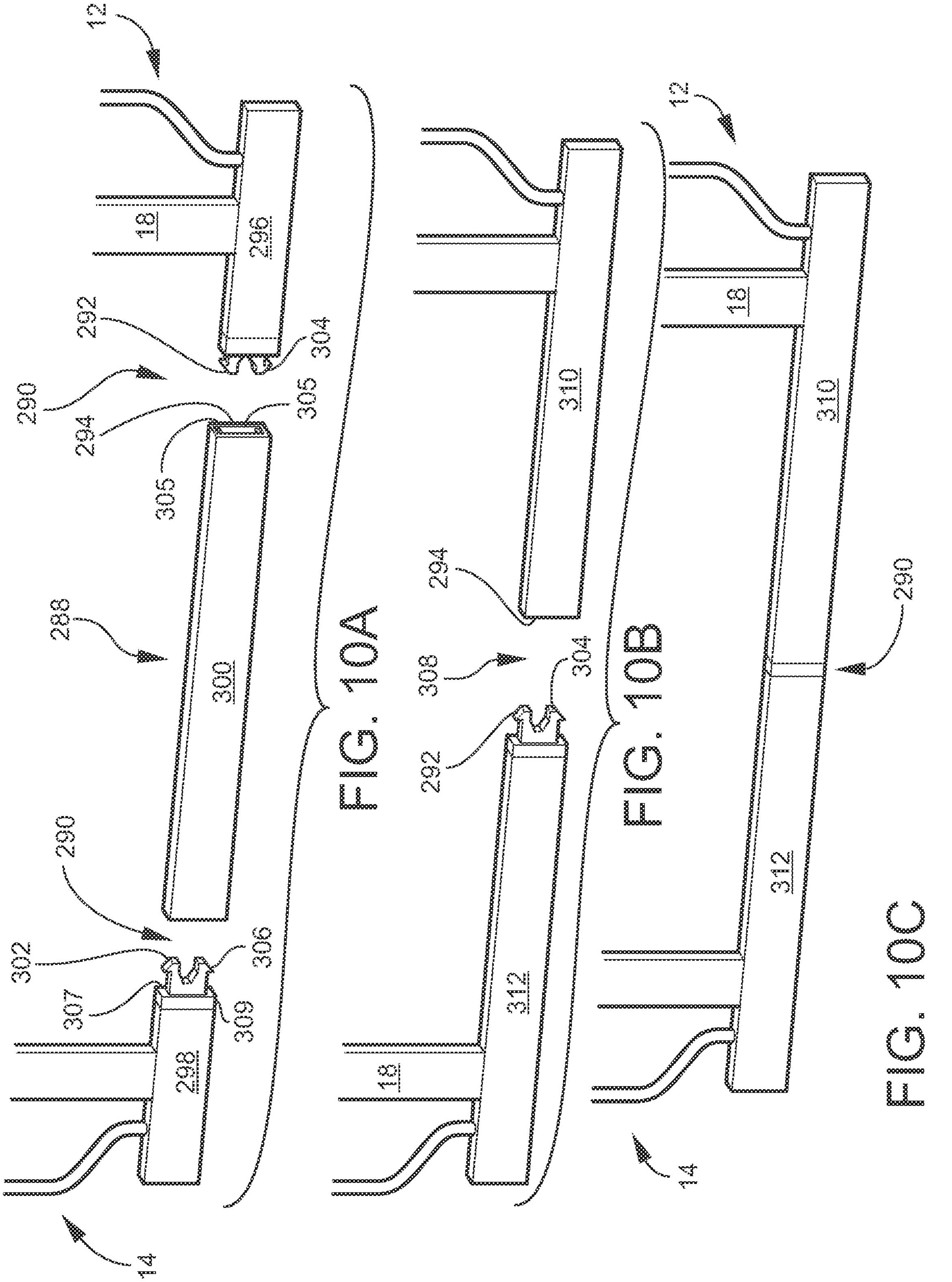
FIG. 10A is a perspective view of a lower connection for any one of the base structures of FIG. 1A and FIG. 19 where such lower connection includes a pair of joints, where each of the joints includes an insertable resiliently expandable and retractable snap joint end and a female joint end.
FIG. 10B is a perspective view of a lower connection for any one of the base structures of FIG. 1A and FIG. 19 where such lower connection includes a single joint, where the single joint includes an insertable resiliently expandable and retractable snap joint end and a female joint end.
FIG. 10C is a perspective view showing the joint ends of FIG. 10B engaged.

FIG. 10A shows a lower connection 288. Lower connection 288 includes a pair of joints, with each of the joints being a joint 290 formed by a snappable joint end 292 and a female joint end 294. Lower connection 288 further includes member 22 that includes end member portion 296 engaged to first end frame portion 12, end member portion 298 engaged to second end frame portion 14, and intermediate member portion 300 engaged to and between end member portions 296, 298. Each of member portions 296, 298, 300 with their respective joint ends 292, 294 has a length substantially equal to or less than a length of gate 16 so as to minimize the size of the carton or storage box for barrier 10. Member portions 296, 298, and 300 are tubular.

Snappable joint end 292 includes on one end two prongs 302 biased apart from each other. Snappable joint end 292 includes on the other end tongue 136 that is engaged to the inner ends of member portions 296, 298. Each of the prongs 302 includes an oblique edge 304 that, when pushed upon by an upper or lower inner edge or inner extension 305 of female joint end 294, causes the prongs 302 to resiliently be drawn together, which prongs 302 have a catch that catches extensions in the female joint end 294 when the prongs 302 have been inserted a predetermined distance into female joint end 294 and whereupon the prongs 302 spring back to their original position, thereby catching catch 306 on an inner edge of extension 305 in the female joint end 294 and preventing the female joint end 294 and snappable joint end 292 from disengagement (without a pinching together again of prongs 302 or a damage or destruction of the structural integrity of joint 290).

Female joint end 294 is a female receiver that includes an inner vertically and axially running extension 305 that permits oblique face 304 to ride over it and that catches on catch 306 to prevent a return of the snappable joint end 292. In other words, extension 305 that is visible in FIG. 10A may have an axial length about equal to or slightly less than the distance from catch 306 to the distal face 307 of an insert 309. Insert 309 includes an exterior parallelepiped portion and inner tongue 136 that engages one of the end member portions 296, 298, 310, 312 and/or an end of the intermediate member portion 300. A pair of upper and lower extensions 305 are engaged immediately inwardly of an open end of a member portion, such as one of the member portions 296, 298, 300, 310, 312, to respective upper and lower portions of such member portion, such as the inner face of the ceiling and upper face of the floor of such member portions.

FIGS. 10B and 10C show a lower connection 308. Lower connection 308 includes a single joint, with such single joint being joint 290 having snappable joint end 292 and female joint end 294. Lower connection 308 further includes lower member 22 that includes end member portion 310 and end member portion 312.

End member portion 310 and its female joint end 294 may be about the same length as the combination of end member portion 312 and its snappable joint end 292 such that each of member portions 310, 312 with their respective joint ends 294, 292 has a length substantially equal to or less than a length of gate 16 so as to minimize the size of the carton or storage box for barrier 10. Member portions 310 and 312 are tubular.

Lower connections 288, 308 include hidden mechanisms that are hidden from view to the naked eye such that member 22 may have one vertical seam (lower connection 308) or two vertical seams (lower connection 288). Prongs 302 are hidden mechanisms and the female joint end 294 includes hidden mechanisms, such as its interior vertical extensions to draw together prong ends and to permit the prong ends to snap back and thereby catch on an interior extension.

Lower connections 288 and 308 utilizing the prongs are permanent snap connections where, to disengage such lower connections 288 and 308, the structural integrity of the lower connections 288 and 308 likely would be damaged or destroyed.

Lower connections 288 and 308 form flush and hidden joints 290 because the top, bottom and side surfaces of the lower member portions of the respective joint ends are drawn into a flush abutment with each other, which flush abutment hides the inner joint mechanism using prongs on one joint end and a female receiver or hidden catch receptors in the other joint end.

Figures 11A, 11B, 11C:
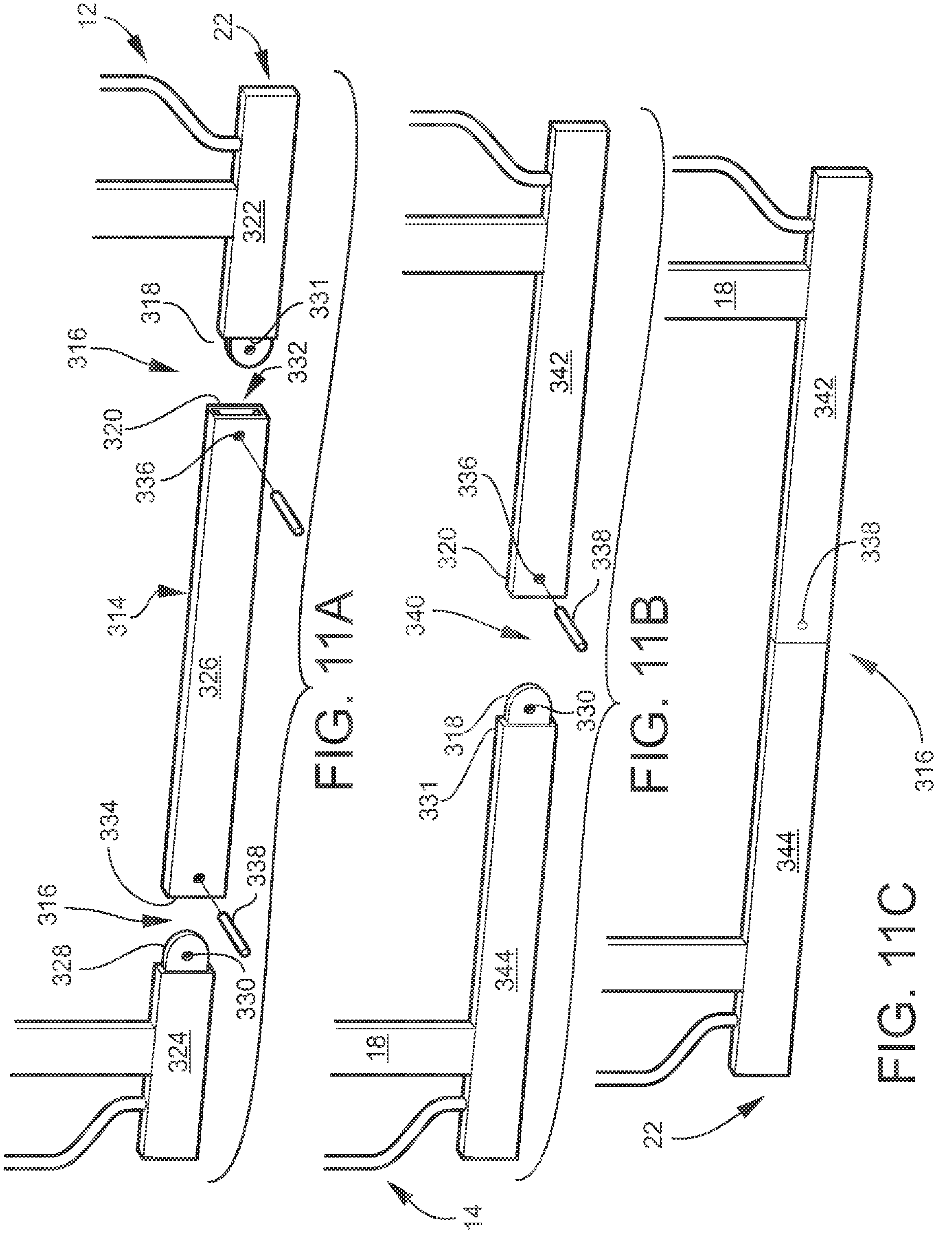
FIG. 11A is a perspective view of a lower connection for any one of the base structures of FIG. 1A and FIG. 19 where such lower connection includes a pair of joints, where each of the joints includes an insertable and pinnable male joint end and a female joint end.
FIG. 11B is a perspective view of a lower connection for any one of the base structures of FIG. 1A and FIG. 19 where such lower connection includes a single joint, where the single joint includes an insertable and pinnable male joint end and a female joint end.
FIG. 11C is a perspective view showing the joint ends of FIG. 11B engaged.

FIG. 11A shows a lower connection 314. Lower connection 314 includes a pair of joints, with each of the joints being a joint 316 formed by a male joint end 318 and a female joint end 320. Lower connection 314 further includes member 22 that includes end member portion 322 engaged to first end frame portion 12, end member portion 324 engaged to second end frame portion 14, and intermediate member portion 326 engaged to and between end member portions 322, 324. Each of member portions 322, 324, 326 with their respective joint ends 318, 320 has a length substantially equal to or less than a length of gate 16 so as to minimize the size of the carton or storage box for barrier 10. Member portions 322, 324, and 326 are tubular.

Male joint end 318 includes on one end a second male member or tongue 328. Male joint end 318 includes on the other end first tongue 136 that is engaged to the inner ends of end member portions 322, 324. Second male member or tongue 328 has an edge with a semi-circular shape and includes an aperture 330. Male joint end 318 further includes a rectangular frame or border 331 surrounding second tongue 328.

Female joint end 320 is a female receiver that includes an opening 332 to receive second male member or tongue 328. Opening 332 is framed by a rectangular peripheral edge 334 that abuts frame 331 of male joint end 318 such that frame member 22 of lower connection 314 includes two seams.

Female joint end 320 includes a pair of apertures 336 that is aligned with aperture 330 of male joint end 318 when the rectangular edges 330, 334 abut each other. Pin 338 is engagable to and disengagable from the aligned apertures 330, 336 if in the form of a screw or permanently engaged if in the form of a rivet.

FIGS. 11B and 11C show a lower connection 340. Lower connection 340 includes a single joint, with such single joint being joint 316 having male joint end 318 and female joint end 320. Lower connection 340 further includes lower member 22 that includes end member portion 342 and end member portion 344.

End member portion 342 and its female joint end 320 may be about the same length as the combination of end member portion 344 and its male joint end 318 such that each of member portions 342, 344 with their respective joint ends 320, 318 has a length substantially equal to or less than a length of gate 16 so as to minimize the size of the carton or storage box for barrier 10. Member portions 342 and 344 are tubular.

Lower connections 314, 340 include substantially hidden mechanisms that are hidden from view to the naked eye such that member 22 may have one vertical seam (lower connection 340) or two vertical seams (lower connection 314). Second male tongue 328 is a hidden mechanism and the female receiver 332 is a hidden mechanism such that only the heads of pin 338 may be visible.

Lower connections 314 and 340 form flush and hidden joints 316 because the top, bottom and side surfaces of the lower member portions of the respective joint ends are drawn into a flush abutment with each other, which flush abutment hides the inner joint mechanism using a male member or tongue 328 on one joint end and a female receiver or hidden slot in the other joint end.

Figures 12A, 12B, 12C:
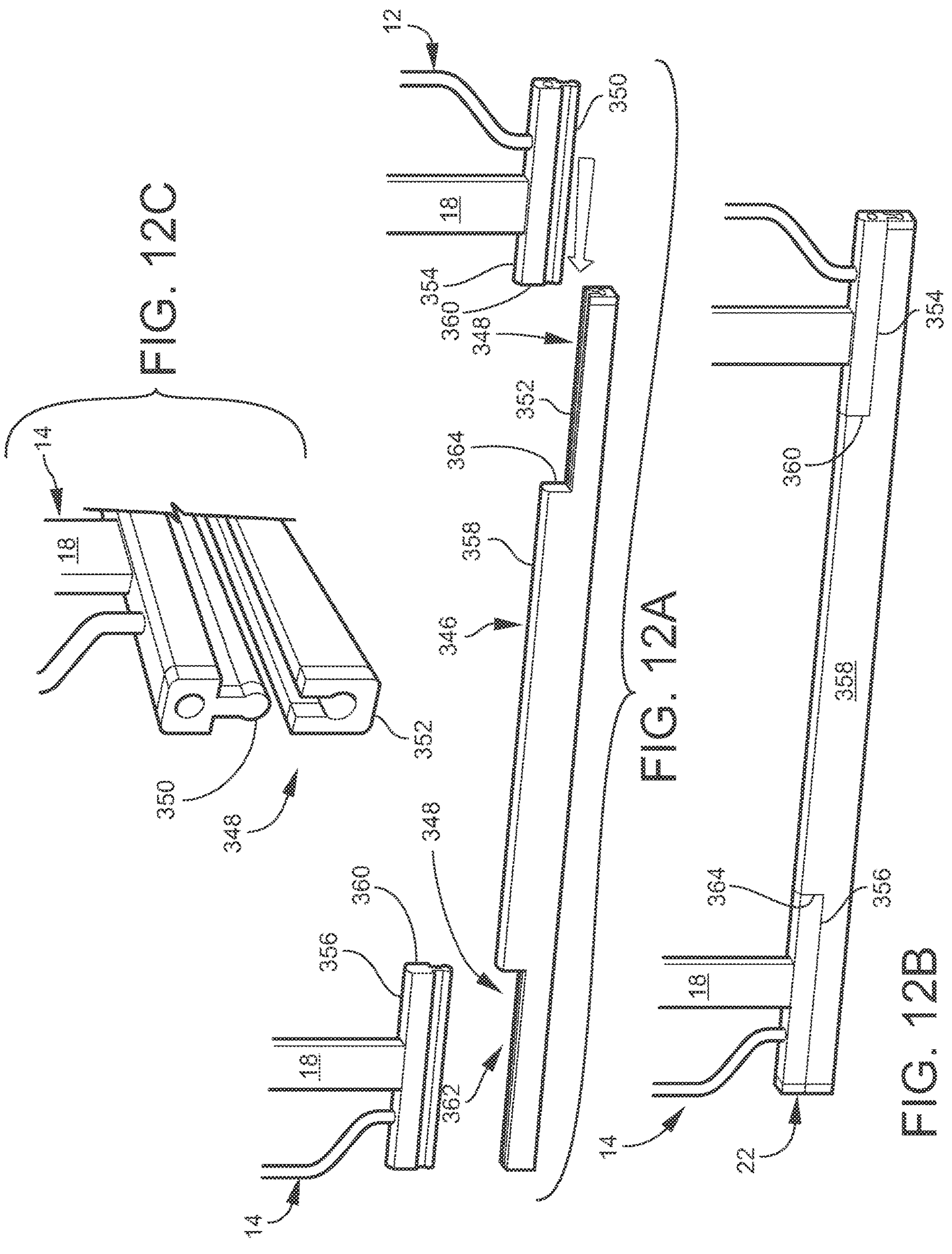
FIG. 12A is a perspective view of a lower connection for any one of the base structures of FIG. 1A and FIG. 19 where such lower connection includes a pair of joints, where each of the joints is a horizontally and axially sliding mortise and tenon joint.
FIG. 12B is a perspective view showing the joint ends of FIG. 12A engaged.
FIG. 12C is an end perspective view of the horizontally and axially sliding mortise and tenon joint of FIG. 12A.

FIGS. 12A, 12B and 12C show a lower connection 346. Lower connection 346 includes a pair of joints, with each of the joints being a joint 348 formed by a tenon joint end 350 and a mortise joint end 352. Lower connection 346 further includes member 22 that includes a first upper end member portion 354 engaged to first end frame portion 12, a second upper end member portion 356 engaged to second end frame portion 14, and an intermediate member portion 358 engaged to and between end member portions 354, 356. Member portions 354, 356, and 358 are tubular.

Tenon joint end 350 includes an axially or longitudinally extending neck and head. Mortise joint end 352 includes an axially or longitudinally extending receptor formed in a neck and head shape to receive the neck and head of tenon joint end 350.

Upper end frame member 354 includes a stop 360. Intermediate member 358 includes a pair of L-shaped cutouts 362 formed in part by vertical stop 364. When tenon joint end 350 is slid longitudinally into mortise joint end 352, such a longitudinal sliding is stopped when stops 360, 364 abut each other. The length of intermediate member portion 358 is about equal to or less than a height of gate unit 16 so as to minimize the size of the lateral dimension other dimension of the carton or storage box for barrier 10. One or more removable or permanent pins may engage lateral openings in the mortise and tenon joint 348.

Figure 13A:
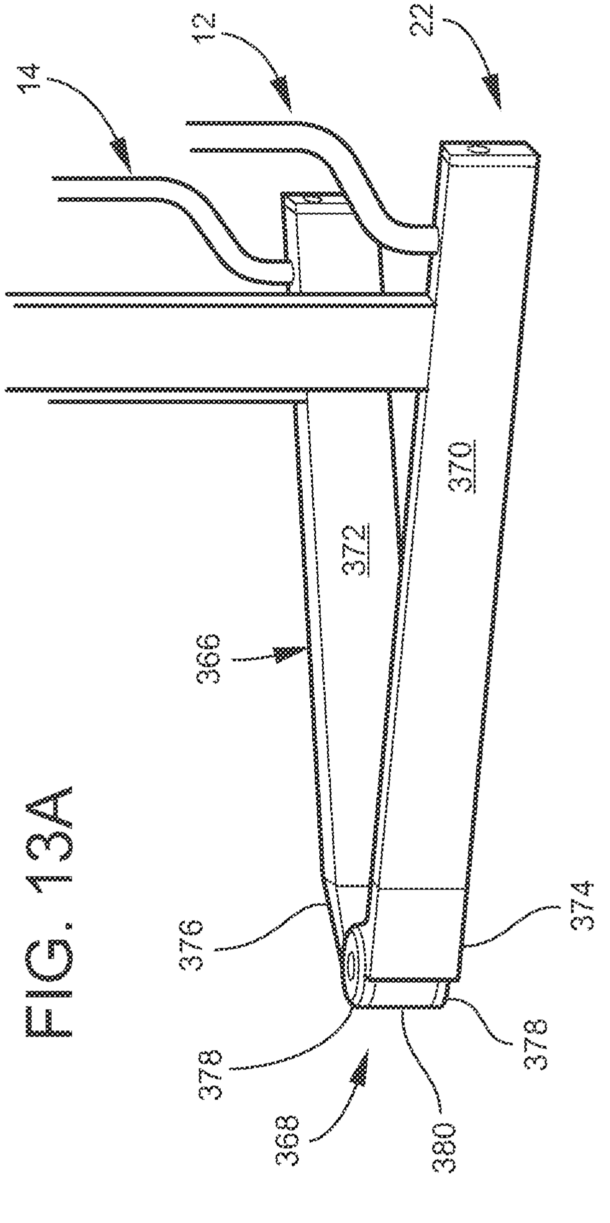
FIG. 13A is a perspective view of a lower connection for any one of the base structures of FIG. 1A and FIG. 19 where such lower connection includes a single joint, where the single joint is a hinged joint with a vertical axis, and where the hinged joint is in a folded position.
Figure 13B:
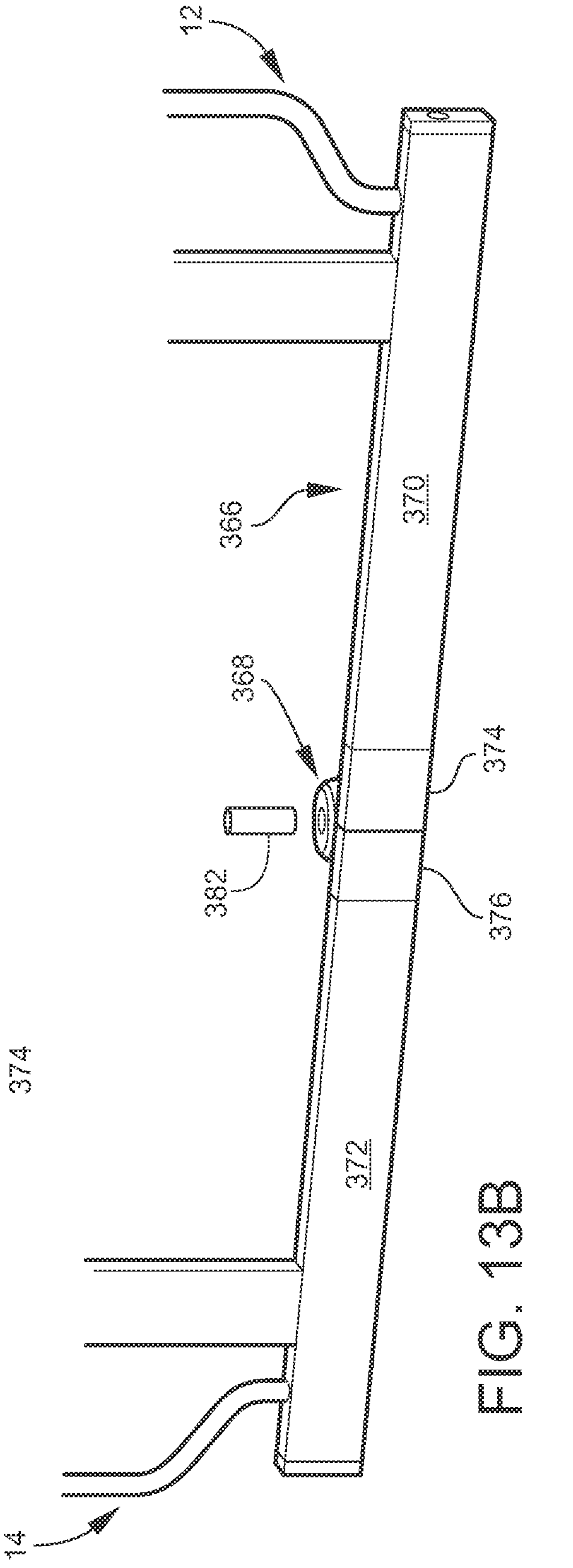
FIG. 13B is a perspective view showing the hinged joint of FIG. 13A in an expanded and operating position.

FIGS. 13A and 13B show a lower connection 366. Lower connection 366 includes a single joint, with the single joint being a hinged joint 368. Lower connection 366 further includes member 22 that includes a first end member portion 370 engaged to first end frame portion 12, a second end member portion 372 engaged to second end frame portion 14, and intermediate member portions 374, 376 engaged between end member portions 370, 372. Member portions 370, 372, 374 and 376 are tubular.

Intermediate member portions 374, 376 are engaged to their adjacent end member portions 370, 372 by tongue 136 extending from end member portions 374, 376 to their respective adjacent end member portions 370, 372.

Hinged joint 368 includes a first portion 378 integral and one-piece with intermediate member portion 374. Hinged joint 368 includes a second portion 380 integral and one-piece with intermediate portion 376. These first and second portions 378, 380 rotate relative to each other and are engaged to each other by pin 382. Hinged joint 368 includes an internal releasable snapping lock mechanism that snaps into a lock position when end members 370, 372 are aligned with each other in a straight line and that may be snappable out of such lock position back to the storable face to face position.

End member portion 370 and its joint end 374 may be about the same length as the combination of end member portion 372 and its joint end 376 such that each of member portions 370, 372 with their respective joint ends 374, 376 (and including a half-length each of hinged connection 368) has a length substantially equal to or less than a length of gate 16 so as to minimize the size of the carton or storage box for barrier 10. Member portions 370, 372, 374, and 376 are tubular.

Swinging joint 368 permits the first and second end frames 12, 14 to be swung face to face with each other to confront each other, such that barrier 10 and barrier 452 may be shipped in such a face to face position or such that barrier 10 and barrier 452 may be stored in such a face to face position, such as after gate 16 has been removed from engagement between the end frames 12, 14.

As to the embodiment shown in FIGS. 13A and 13B having lower connection 366, swinging joint 368 includes an axis that is generally parallel to the axis on which gate 16 swings. The barrier, such as barrier 10, that employs connection 366 is a two unit barrier, having two end frame portions 12, 14 as one unit and the gate unit 16 as a second unit.

FIGS. 14A and 14B show a lower connection 384. Lower connection 384 includes a pair of joints, with each of the joints being the hinged joint 368 formed by intermediate members 374, 376, and pin 382. Lower connection 384 further includes member 22 that includes a first end member portion 386 engaged to first end frame portion 12, a second end member portion 388 engaged to second end frame portion 14, and an intermediate member portion 390 engaged to and between hinged joints 368. Member portions 384, 386, 388, 374, 376 are tubular. The barrier, such as barrier 10, that employs connection 384 is a two unit barrier, having two end frame portions 12, 14 as one unit and the gate unit 16 as a second unit.

Each of the combinations of end member portion 386 and its joint end 374, end member portion 388 and its joint end 374, and intermediate member portion 390 and its joint ends 376 has a length substantially equal to or less than a length of gate 16 so as to minimize the size of the carton or storage box for barrier 10. Member portions 386, 388, 390, 374, and 376 are tubular.

Intermediate member portion 390 may include female receptors on one or both ends to receive a tongue 136 that extends from intermediate member portion 376. Each of intermediate member portions 374, 376 may include tongue 136 in the embodiments shown in FIGS. 13A, 13B, 14A and 14B.

As to the embodiment of FIGS. 14A, 14B having lower connection 384, swinging joint 368 permits the first and second end frames 12, 14 to be swung to be end to end with each other to confront each other in a planar orientation, such that barrier 10 and barrier 452 may be shipped in such an end to end position or such that barrier 10 and barrier 452 may be stored in such an end to end position, such as after gate 16 has been removed from engagement between the end frames 12, 14. In such end to end position, the length of intermediate portion 390 is less than or about equal to the length of the gate unit 16.

As to the embodiment of FIGS. 14A, 14B having lower connection 384, swinging joint 368 includes an axis that is generally parallel to the axis on which gate 16 swings.

Figures 15A, 15B:
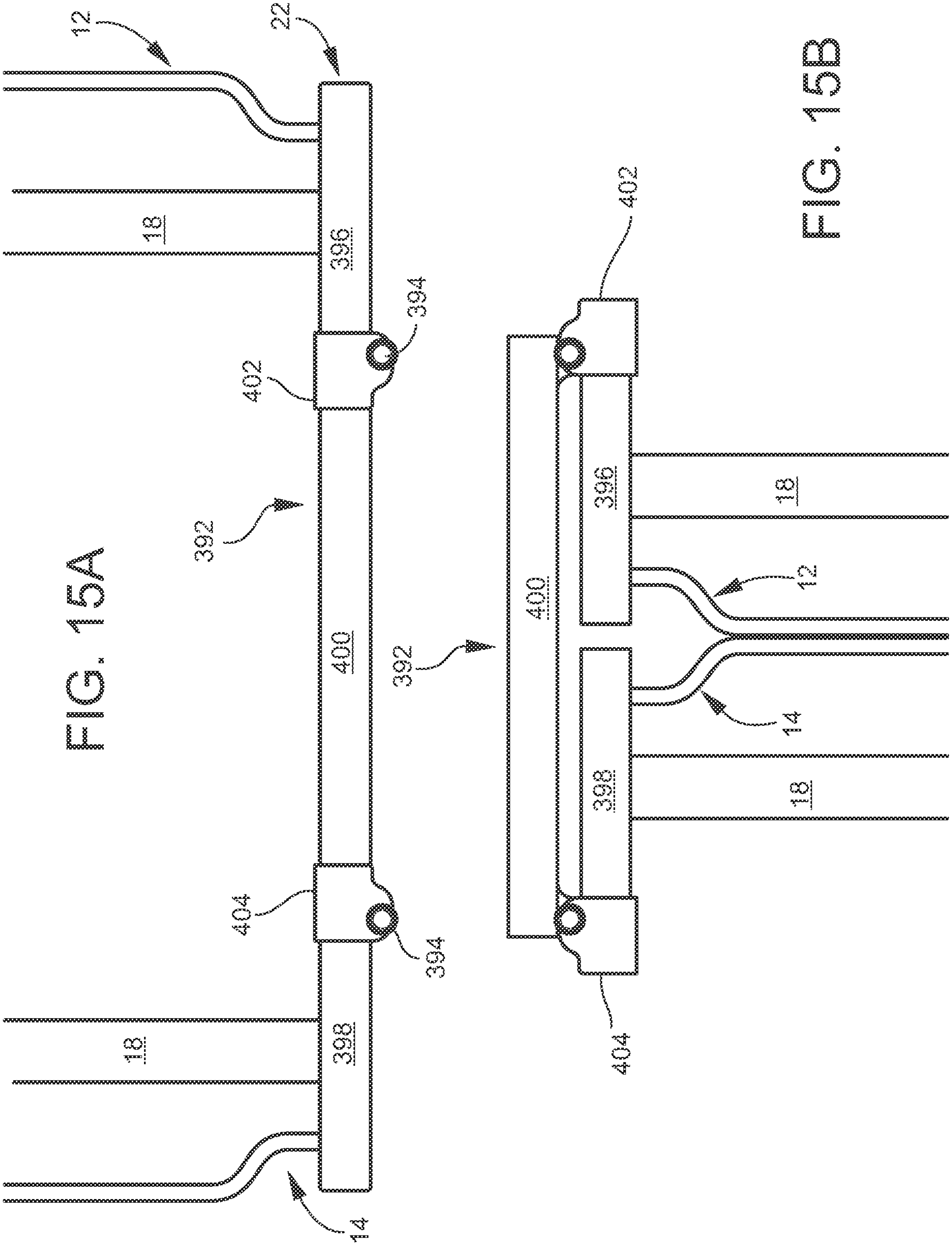
FIG. 15A is a perspective view of a lower connection for any one of the base structures of FIG. 1A and FIG. 19 where such lower connection includes a pair of joints, where each of the joints is a hinged joint with a horizontal axis, and where each of the hinged joints is in an expanded and operating position.
FIG. 15B is a perspective and upside down view showing each of the hinged joints of FIG. 15A in a folded position.

FIGS. 15A and 15B show a lower connection 392. Lower connection 392 includes a pair of joints, with each of the joints being a hinged joint 394. Lower connection 392 further includes member 22 that includes a first end member portion 396 engaged to first end frame portion 12, a second end member portion 398 engaged to second end frame portion 14, and an intermediate member portion 400 engaged to and between hinged joints 394. Member portions 396, 398, and 400 are tubular. The barrier, such as barrier 10, that employs connection 392 is a two unit barrier, having two end frame portions 12, 14 as one unit and the gate unit 16 as a second unit.

End member 396 includes a joint end 402 rigidly fixed thereto that is a channel piece. End member 398 includes a joint end 404 rigidly fixed thereto that is a channel piece. Through hinged joint 394, joint end 402 is pivotally engaged to one end of intermediate member portion 400. Through hinged joint 394, joint end 404 is pivotally engaged to the other end of intermediate member portion 400.

Hinged joint 394 includes a horizontally extending axis such that the bottom surfaces of end member portions 396, 398 confront the bottom surface of intermediate portion 400 when the barrier 10 having lower connection 392 is in the stored condition.

Each of end member portion 396 and its joint end 402 as a whole, end member portion 398 and its joint end 404 as a whole, and intermediate member portion 400 has a length substantially equal to or less than a length of gate 16 so as to minimize the size of the carton or storage box for barrier 10. When in the folded position shown in FIG. 15B, the length from the outer end of joint end 402 to the outer end of joint end 404 is about equal to or less than the width of the gate 16.

When end frames 12 and 14 are swung from the stored position shown in FIG. 15B to the open and operating position shown in FIG. 15A, the top plates of joint ends 402, 404 work as stops against the top plate of intermediate portion 400 to prevent a further swinging of end frames 12, 14 and their respective end member portions 396, 398. When top plates of joint ends 402, 404 stop against the top plate of intermediate portion 400, end frame member portion 396, end frame member portion 398, and intermediate portion 400 are aligned in a straight line.

In the stored position shown in FIG. 15B, the outer ends of end member portions 396, 398 confront each other and the end member portions 396, 398 confront the intermediate member portion 400.

As to the embodiment shown in FIGS. 15A and 15B having lower connection 392, swinging joint 394 has an axis that is disposed generally at a right angle to a plane defined by gate 16.

Figure 16A:
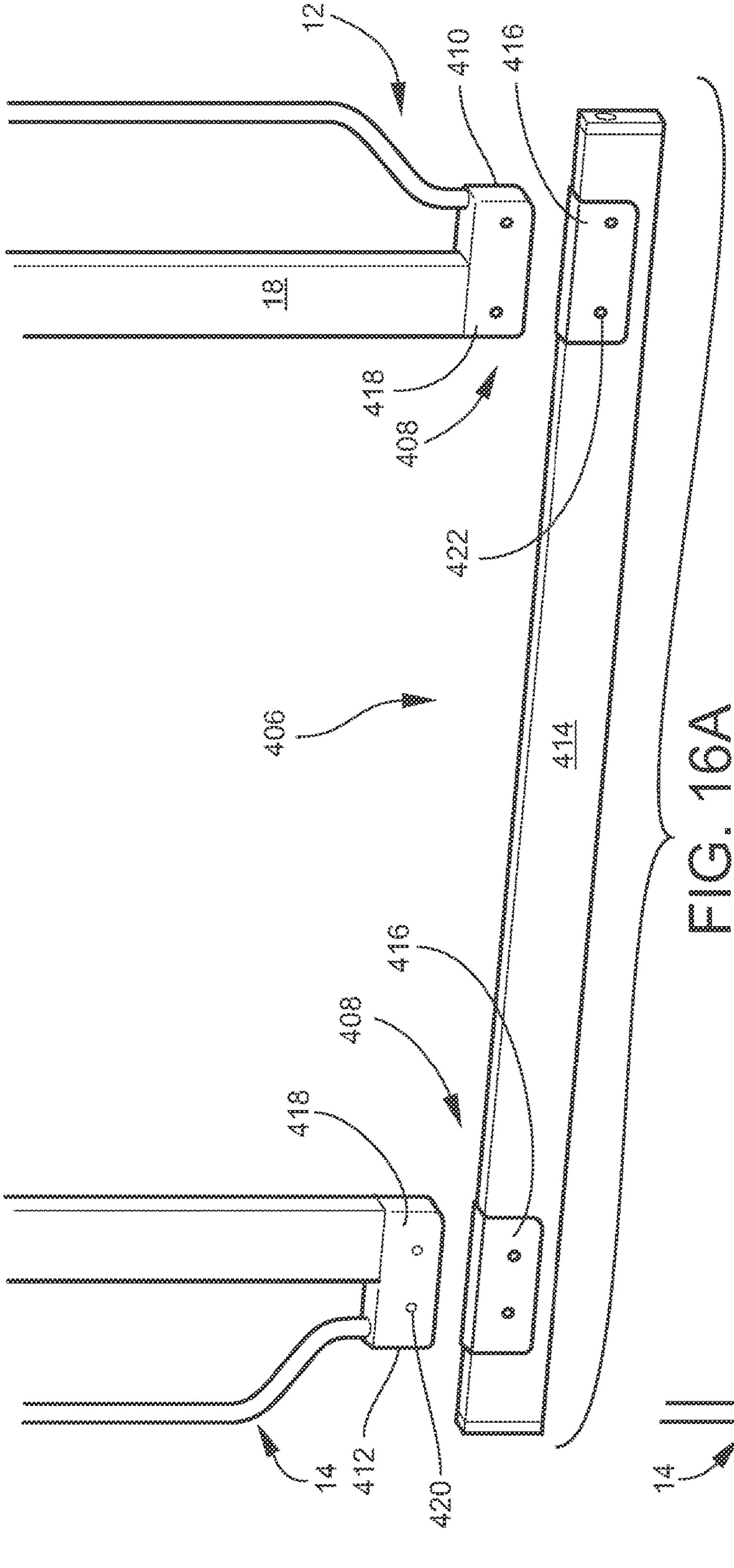
FIG. 16A is a perspective view of a lower connection for any one of the base structures of FIG. 1A and FIG. 19 where such lower connection includes a pair of joints, where each of the joints includes an inverted U-shaped channel joint end and a joint end having a cavity, and where the lower connection is integral and one-piece.
Figure 16B:
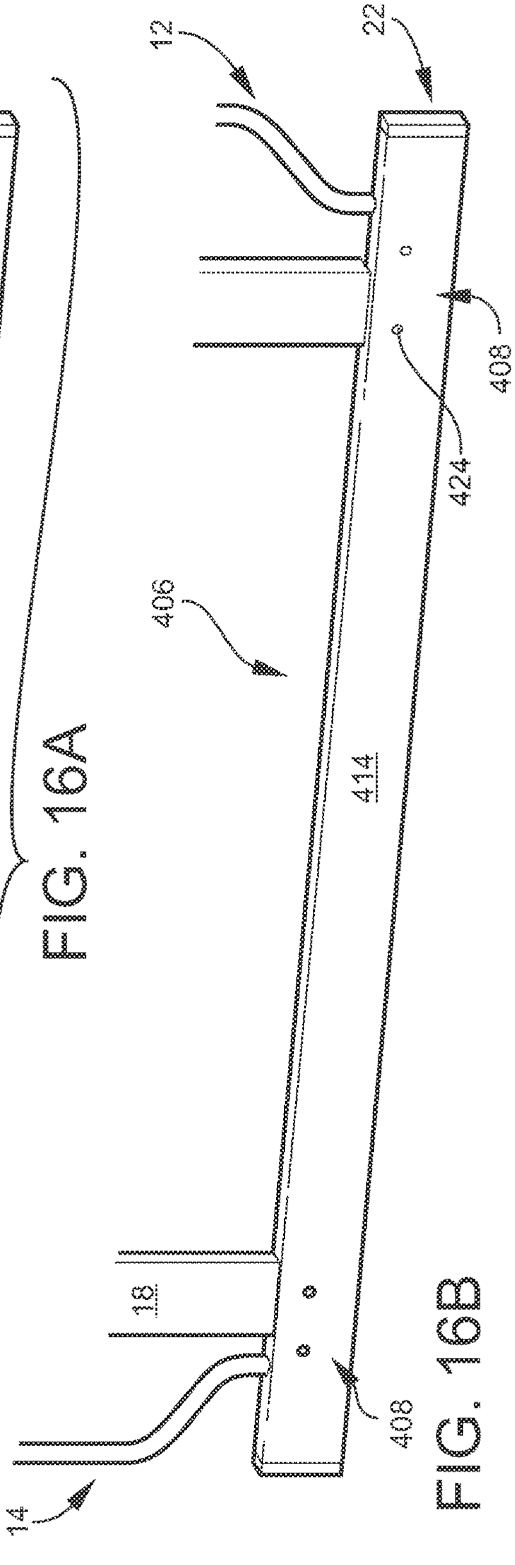
FIG. 16B is a perspective view showing the joint ends of FIG. 16A engaged.

FIGS. 16A and 16B show a lower connection 406. Lower connection 406 includes a pair of joints, with each of the joints being a joint 408. Lower connection 406 further includes member 22 that includes a first upper end member portion 410 engaged to first end frame portion 12, a second upper end member portion 412 engaged to second end frame portion 14, and an intermediate member portion 414 engaged to and between end member portions 410, 412. Intermediate member portion 414 is tubular.

Each of the outer end portions of intermediate member portion 414 includes a pair of opposing cavities 416. Each of upper end member portions 410, 412 is a channel piece formed by opposing rectangular plate sections 418 shaped to match cavities 416. Two opposing cavities 416 receive two opposing respective plate sections 418 to form joint 408.

Each plate section 418 includes two horizontally aligned apertures 420. Each of the distal end portions of intermediate member portion 414 includes two horizontally aligned apertures 422. Apertures 420 are aligned laterally with apertures 422 when plate sections 418 engage cavities 416. Pins 424 are engagable in and disengagable from laterally aligned apertures 420, 422 or may be permanently secured therein upon assembly of the barrier.

The depth of cavity 416 is such that the outer face of plate section 418 is flush with the outer face of intermediate member portion 414 when the plate sections 418 are engaged in their respective cavities 416.

Lower connection 406 forms flush and hidden joints 408 because the top, bottom and side surfaces of the lower member portions of the respective joint ends are drawn into a flush abutment with each other, which flush abutment hides any seam between the joint ends.

It should be noted that pins and pin holes are readily made into flush and hidden mechanisms because pin heads may be flush with the annular head of the pin hole, wherever pins and pin holes or pin apertures are called out herein as to any of the embodiments and lower connections herein.

The length of intermediate member portion 414 is about equal to or less than the height of gate unit 16 to minimize the size of a box or carton in which the end member portions 12, 14 or units 12, 14 and gate 16 or gate unit 16 are shipped.

Figure 17A:
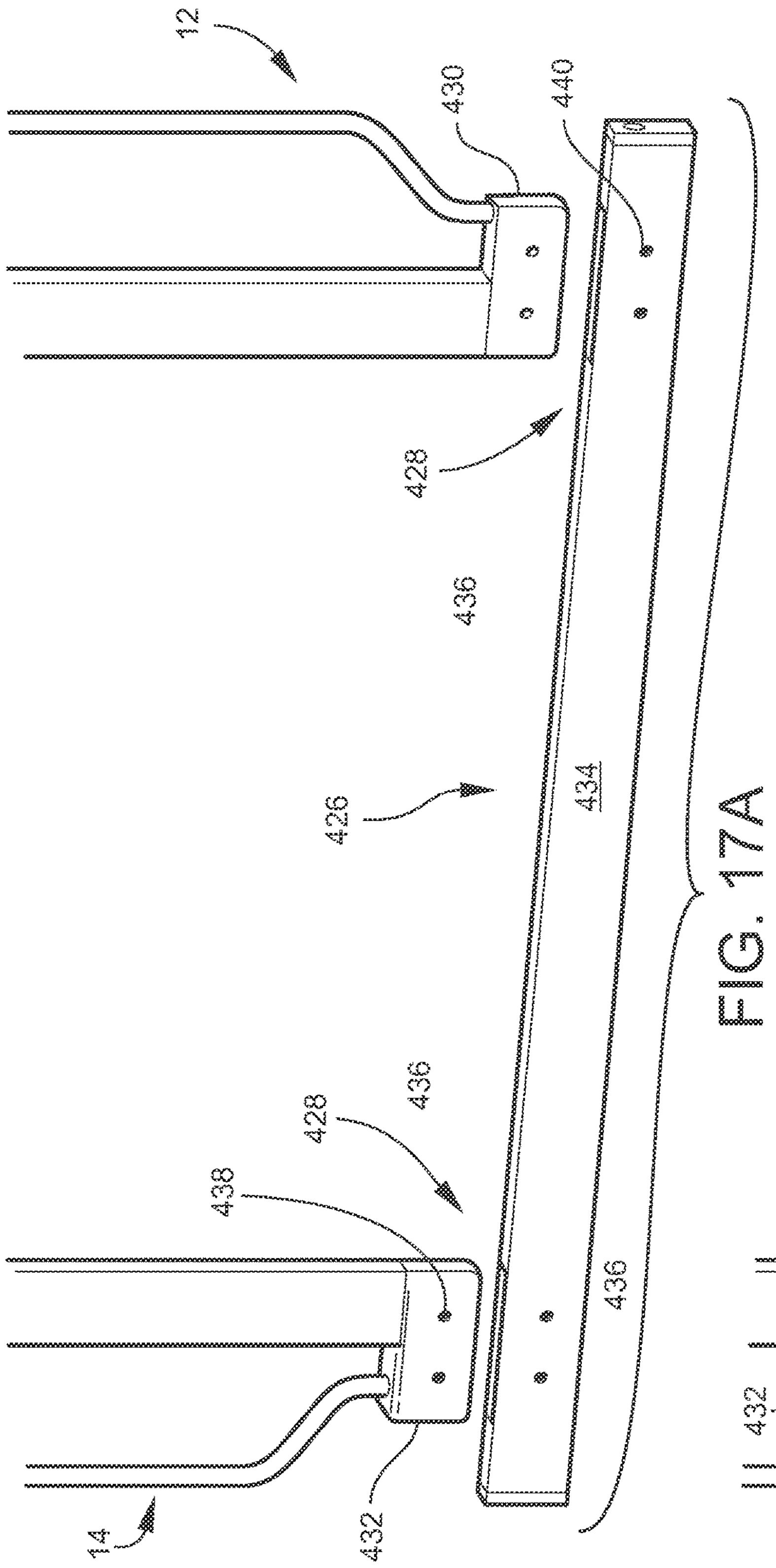
FIG. 17A is a perspective view of a lower connection for any one of the base structures of FIG. 1A and FIG. 19 where such lower connection includes a pair of joints, where each of the joints includes an insertable joint end and a slotted joint end, and where the lower connection is integral and one-piece.
Figure 17B:
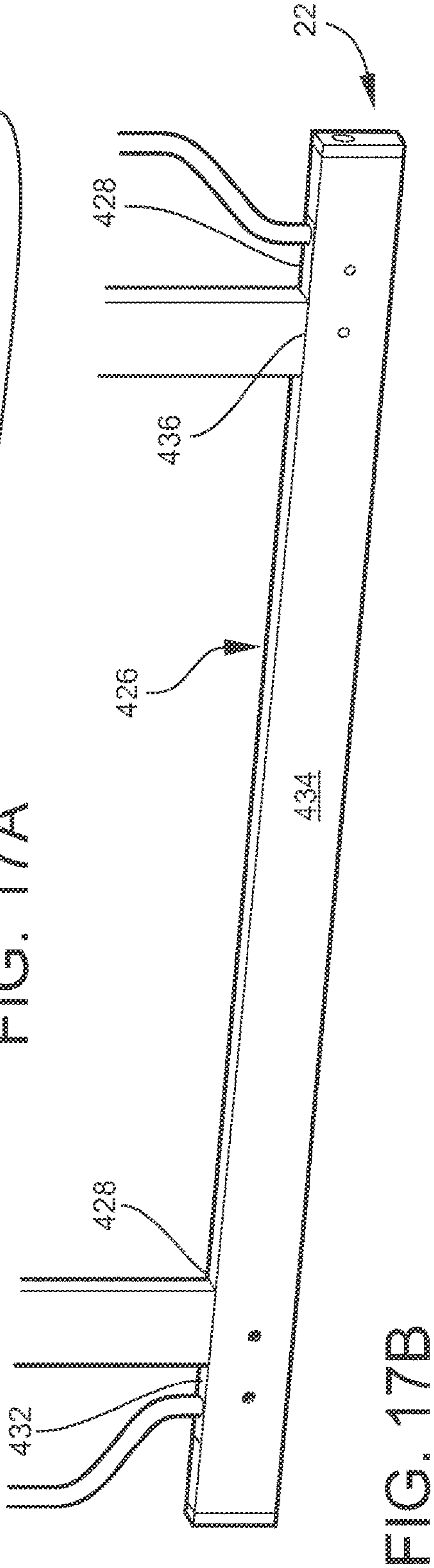
FIG. 17B is a perspective view showing the joint ends of FIG. 17A engaged.

FIGS. 17A and 17B show a lower connection 426. Lower connection 426 includes a pair of joints, with each of the joints being a joint 428. Lower connection 426 further includes member 22 that includes a first upper end member portion 430 engaged to first end frame portion 12, a second upper end member portion 432 engaged to second end frame portion 14, and an intermediate member portion 434 engaged to and between end member portions 430, 432. End member portion 430 and end member portion 432 may or may not be tubular, and intermediate member portion 434 is tubular.

Each of the outer end portions or joint ends of intermediate member portion 434 includes a four sided or box shaped slot 436. Slot 436 is formed by removing a portion of the top of intermediate portion 434, and securing two axially spaced apart vertical plates or strips at each of the ends of the slot 436. Slot 436 is also formed by portions of the inner faces of the front and back sidewalls of intermediate member portion 434. A floor of slot 436 can be formed by securing a horizontally and axially running plate or strip at a position above the bottom of intermediate member portion 434. Each of upper end member portions 430, 432 is box shaped or is a parallelepiped piece shaped to fit into box slot 436.

Each of the upper end members 430, 432 includes two horizontally aligned apertures 438. Each of the outer end portions or joint ends of intermediate member portion 434 includes two horizontally aligned apertures 440. Apertures 440 are aligned laterally with apertures 438 when inserts or end members or joint ends 430, 432 engage slots 436. Pins 442 are engagable in and disengagable from laterally aligned apertures 438, 440 or may be permanently engaged therein.

If desired the depth or vertical height of inserts or end member portions or joint ends 430, 432 may be about the same as the height or depth of intermediate member portion 434 such that the top of box inserts 430, 432 are flush with the top of intermediate member portion 434 when joint 428 is formed.

Lower connection 426 forms flush and hidden joints 408 because the top surfaces of the lower member portions of the respective joint ends are drawn into a flush abutment with each other, which flush abutment hides any seam between the joint ends.

The length of intermediate lower member portion 434 may be about equal to or less than the height of gate unit 16 so as to minimize the dimensions or size of the box or carton in which the end member portion units 12, 14 and gate unit 16 are shipped.

Figure 18A:
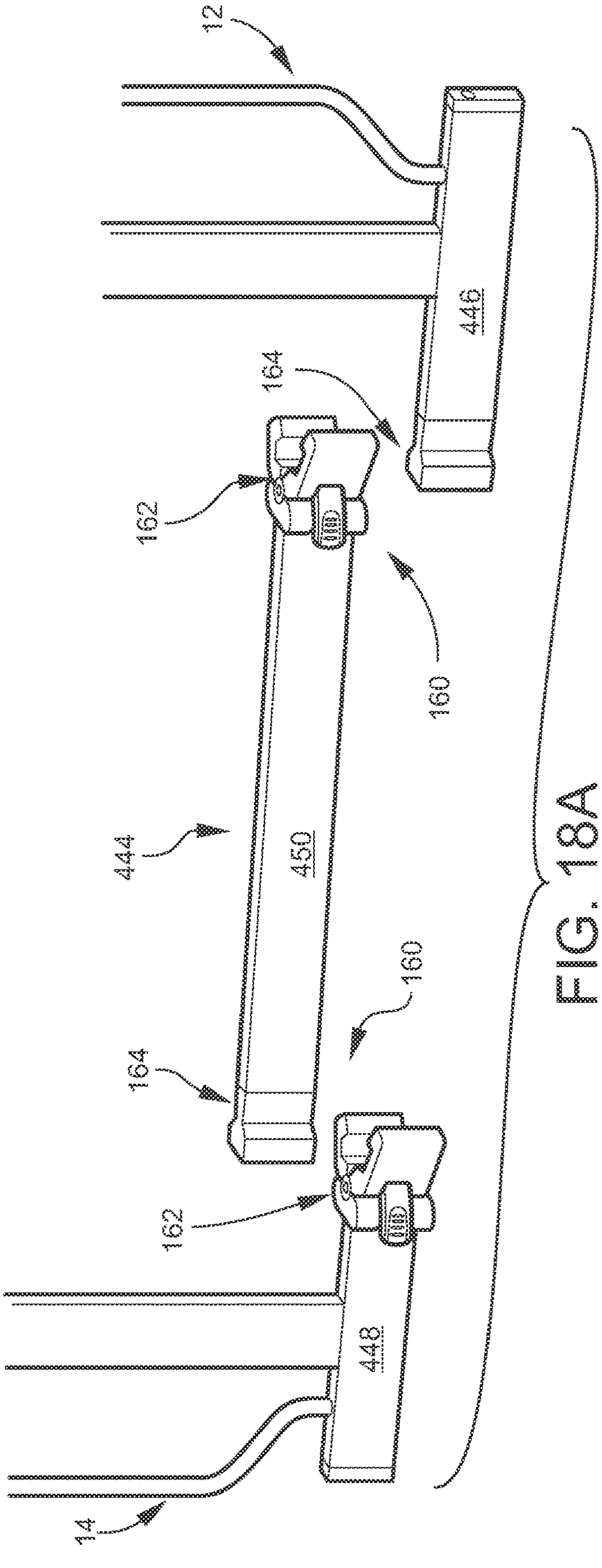
FIG. 18A is a perspective view of a lower connection for any one of the base structures of FIG. 1A and FIG. 19 where such lower connection includes a pair of joints, where each of the joints includes an over-center clamping mortise and tenon joint.
Figure 18B:
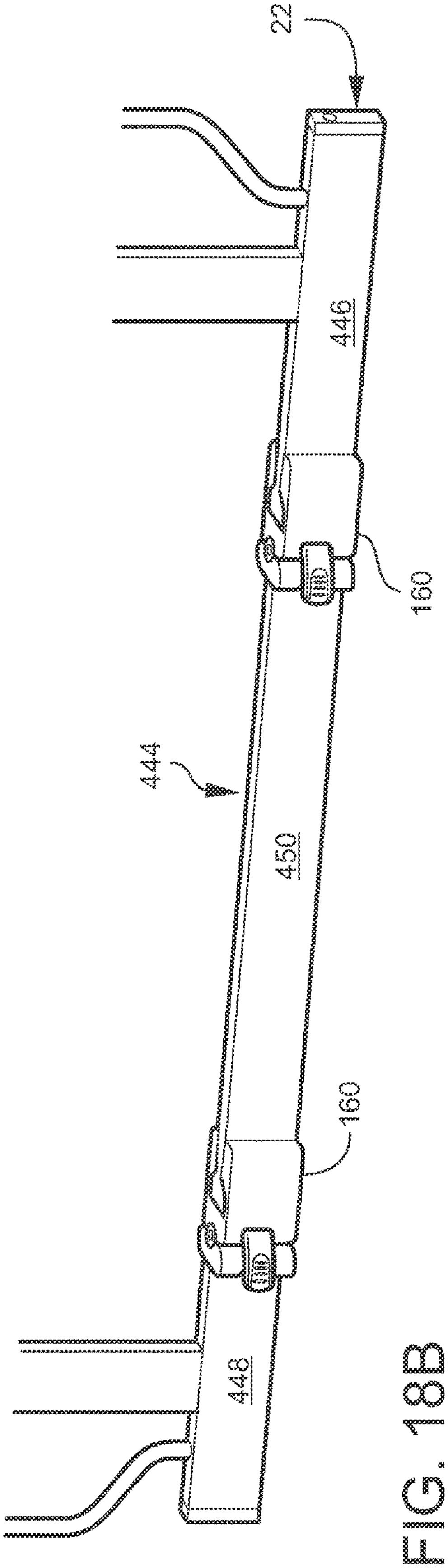
FIG. 18B is a perspective view showing the joint ends of the joints of FIG. 18A engaged.

FIGS. 18A and 18B show a lower connection 444. Lower connection 444 includes a pair of joints, with each of the joints being joint 160 shown in FIGS. 4A and 4B with clamping joint end 162 and clamped joint end 164. Joint end 162 may also be referred to as a mortise joint end 162 when the joint end 162 is closed. Joint end 164 may also be referred to as a tenon joint end 164 when the mortise joint end 162 is closed.

Lower connection 444 further includes member 22 that includes end member portion 446 engaged to first end frame portion 12, end member portion 448 engaged to second end frame portion 14, and intermediate member portion 450 engaged to and between end member portions 446, 448. Each of member portions 446, 448, 450 with their respective joint ends 162, 164 has a length substantially equal to or less than a length of gate 16 so as to minimize the size of the carton or storage box for barrier 10. Member portions 446, 448, 450 are tubular.

Intermediate member portion 450 may include one joint end 162 and one joint end 164. However, if desired, intermediate member portion may include two joint ends 162 or two joint ends 164.

End member portion 446 includes joint end 164. However, if desired, end member portion 448 may include joint end 162.

End member portion 448 includes joint end 162. However, if desired, end member portion 448 may include joint end 164.

It should be noted that joint ends of any of the embodiments herein may be mixed and matched as described above with the embodiment of FIGS. 18A and 18B. In other words, if a first joint end is a tenon joint end and a second joint end is a mortise joint end, the first joint end may be replaced with a mortise joint end and the second joint end may be replaced with a tenon joint end. If a first joint end is a male joint end and a second joint end is a female joint end, the first joint end may be replaced with a female joint end and the second joint end may be replaced with a male joint end. Such does not apply merely to mortise and tenon joint ends and female and male joint ends, but to any of the embodiments described herein, including the embodiments of FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B 20A, 20C, 21A, 21C, 22, 24, 25, 27, 28A, 28B, 29A, and 29B.

Further, a joint of a first embodiment and a joint of a second embodiment may be used in the same lower connection. The joints of a lower connection need not be identical.

Figure 19:
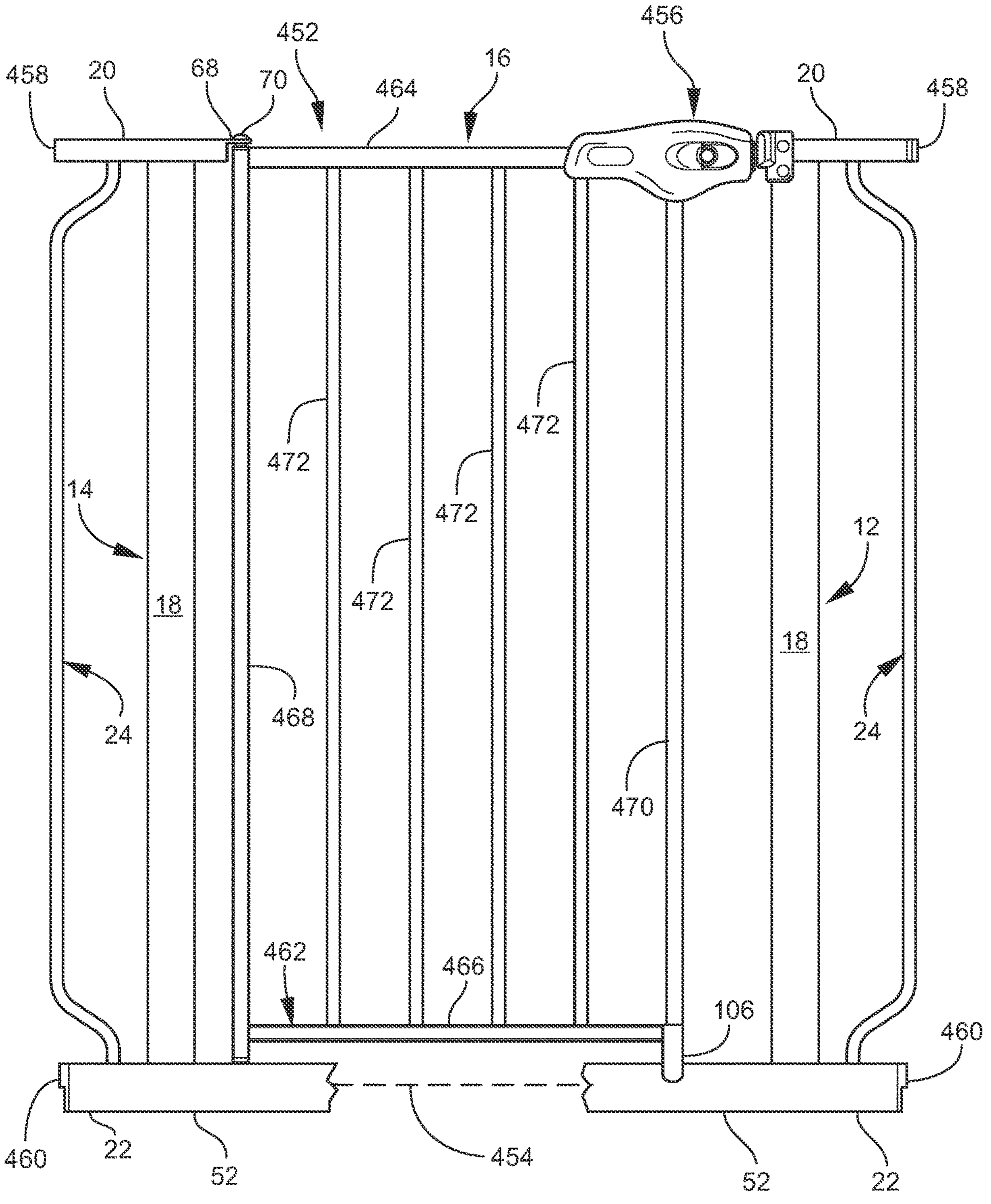
FIG. 19 is a front elevation view of a base structure similar to the base structure of FIG. 1A and shows the right end frame, left end frame, and gate having been assembled, where a lower connection between right and left end frames has been omitted but may be furnished by any one of the lower connections shown in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B 20A, 20C, 21A, 21C, 22, 24, 25, 27, 28A, 28B, 29A, and 29B, and where, after the right and left end frames are slightly modified, the omitted lower connection may be furnished with any one of the lower connections shown in FIGS. 12A, 12B, 12C, 16A, 16B, 17A and 17B.
Figure 20A:
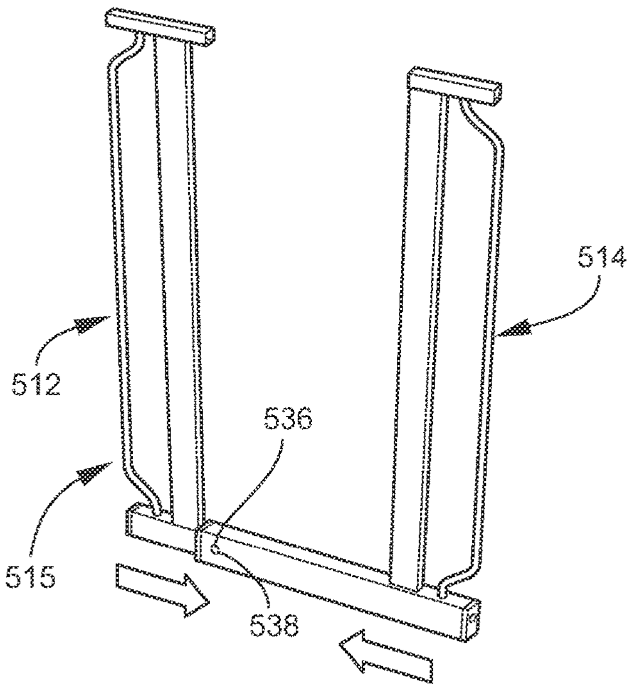
FIG. 20A is a front perspective view of a one unit telescoping frame, where first and second end frame portions telescope or retract together for shipping or storage and telescope apart or expand for engagement to another unit, such as the gate of FIG. 20B.
Figure 20B:
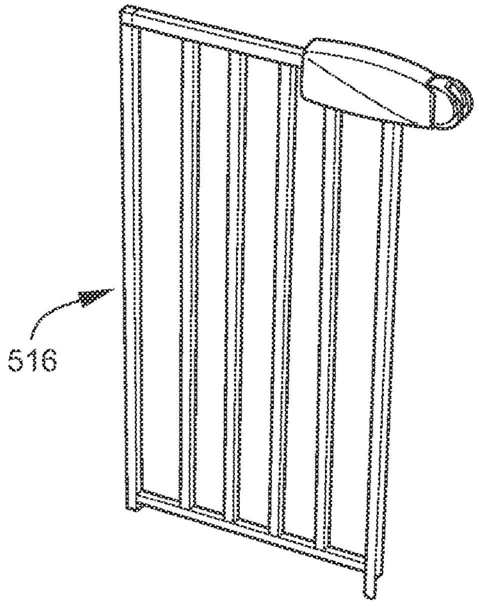
FIG. 20B is a front perspective view of a one unit gate for engagement to the one unit telescoping frame of FIG. 20A when such frame has been expanded.
Figure 20C:
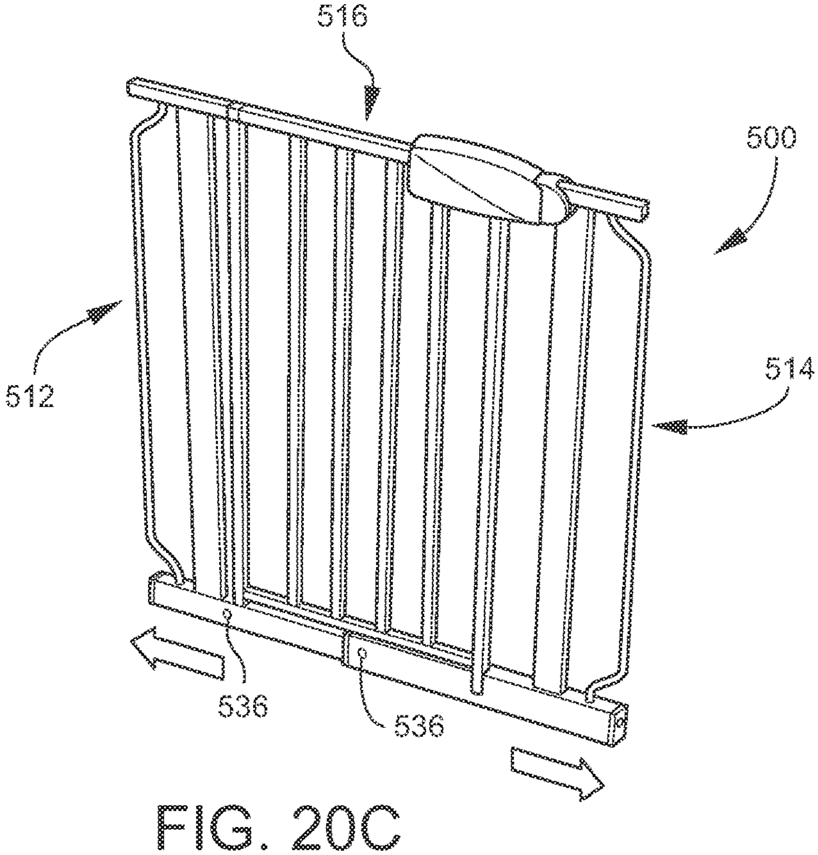
FIG. 20C is a front perspective view of the frame unit of FIG. 20A engaged to the gate unit of FIG. 20B.
Figure 21A:
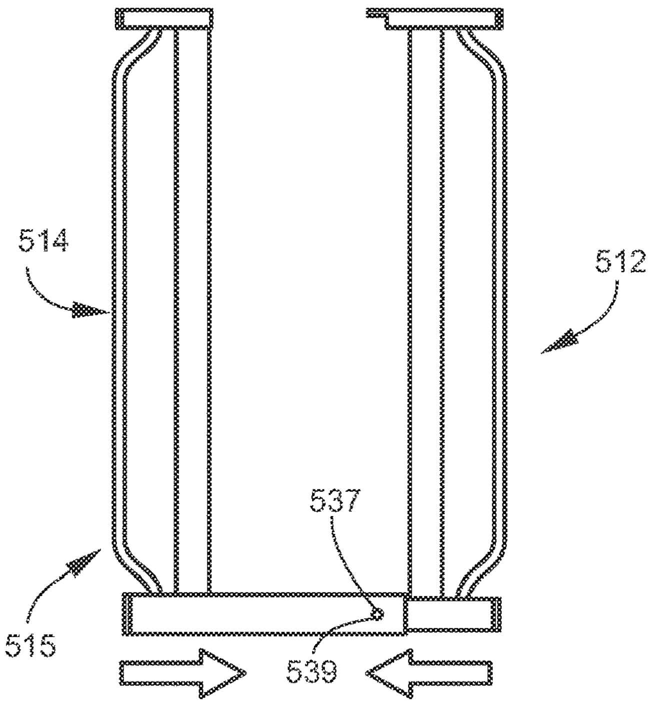
FIG. 21A is an elevation rear view of the one unit telescoping frame of FIG. 20A.
Figure 21B:
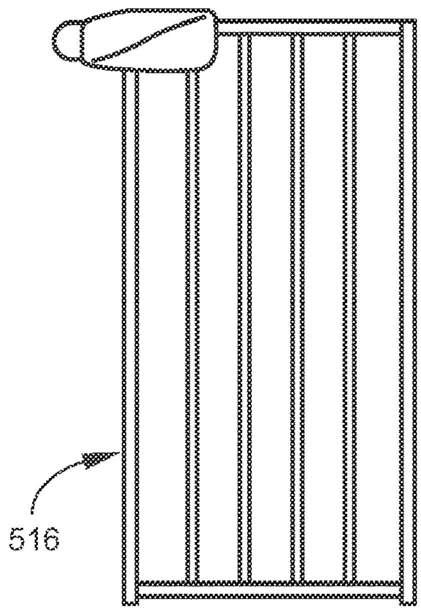
FIG. 21B is an elevation rear view of the one unit gate of FIG. 20B.
Figure 21C:
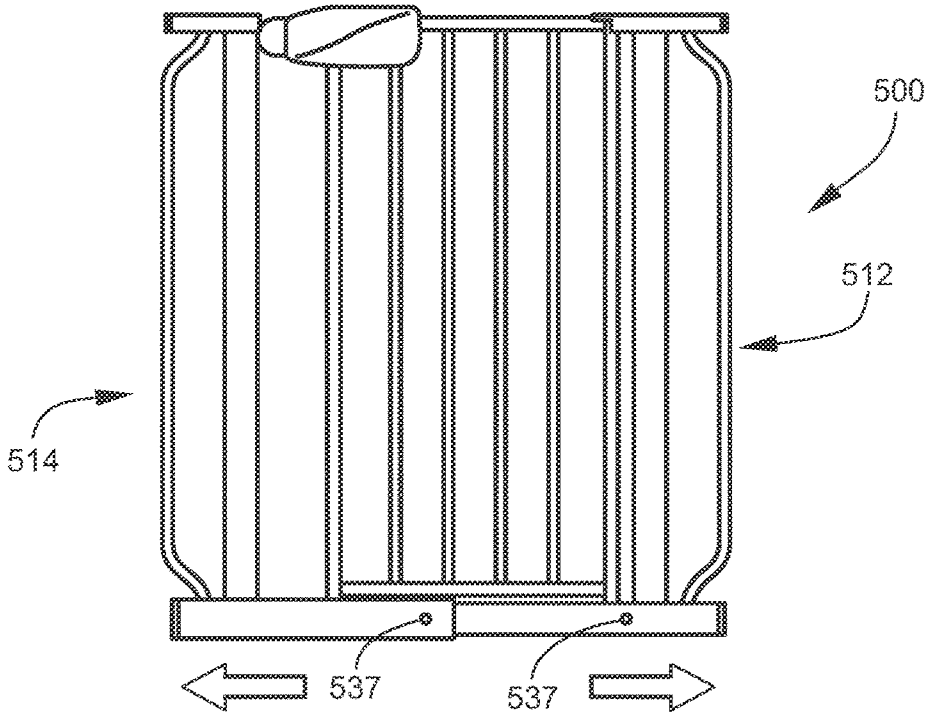
FIG. 21C is an elevation rear view of the frame unit of FIG. 21A engaged to the gate unit of FIG. 21B.

FIG. 19 shows a barrier 452. Barrier 452 is similar to barrier 10 shown in FIGS. 1A and 1B. Barrier 452 is a base assembly gate or base barrier and is indicated in general by the reference numeral 452. Barrier 454 generally includes a first end frame 12, a second end frame 14, and a gate 16 engagable between the end frames 12, 14.

FIG. 19 include a phantom line indicated by reference number 454. Phantom line 454 indicates a break between inner end portions of lower member 22. Phantom line 454 generally represents where a lower connection can be made between portions of lower member 22, and such lower connections are shown in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B 20A, 20C, 21A, 21C, 22, 24, 25, 27, 28A, 28B, 29A, and 29B. Such lower connections are also shown in FIGS. 12A, 12B, 12C, 16A, 16B, 17A and 17B where right and left end frames 12, 14 are slightly modified.

First end frame 12 of FIGS. 1A, 1B and 19 is a first one-piece unit. This first one-piece unit includes a portion of the lower connection.

Second end frame 14 of FIGS. 1A, 1B and 19 is a second one-piece unit. This second one-piece unit includes a portion of the lower connection.

Gate 16 of FIGS. 1A, 1B and 19 is a third one-piece unit. This third one-piece unit does not include the lower connection or a portion of the lower connection. The lower connection or lower member 22 is the piece that extends between the first and second end frames 12, 14.

The lower connection is generally lower member 22 after portions of the lower connection have been connected to each other. This lower connection includes joint ends shown and described in FIGS. 2A, 2B, 3A, 3B, 4A, 4B, 5A, 5B, 6A, 6B, 7A, 7B, 7C, 8A, 8B, 8C, 9A, 9B, 9C, 10A, 10B, 10C, 11A, 11B, 11C, 13A, 13B, 14A, 14B, 15A, 15B, 18A, 18B 20A, 20C, 21A, 21C, 22, 24, 25, 27, 28A, 28B, 29A, and 29B.

As shown in FIG. 19, first end frame 12 includes a gate confronting standard 18, an upper member 20, a portion of lower member 22, and an end member 24. Standard or upright member 18 confronts the gate 16, is elongate in the height direction, and extends between the upper and lower members 20, 22 with which standard 18 is integral and one-piece. Such an integral and one-piece connection is formed, for example, by welding. Standard 18 is tubular, may be formed of a metal such as steel or aluminum, and is generally rectangular in section. Standard 18 includes an axis extending in the height direction, gate confronting portion 52 of lower member 22 includes an axis extending inwardly from standard 18 in the length direction, and such two axes are oblique relative to each other. In other words, such two axes are slightly greater than ninety degrees, with a range of such two axes being between 90.5 and 100 degrees, more preferably between 90.5 and 95 degrees. An upper end portion of standard 18 and/or an inner end portion of upper member 20 can mount a receiver for a catch portion of a latch 456 of the gate 16. As to latch 456, U.S. patent application Ser. No. 14/181,660 filed Feb. 15, 2014 and entitled Squeeze And Slide To Open Gate Latch is hereby incorporated by reference in its entirety.

As shown in FIG. 19, second end frame 14 includes a gate confronting standard 18, an upper member 20, a portion of lower member 22, and an end member 24. Standard or upright member 18 of second end frame 14 confronts the gate 16, is elongate in the height direction, and extends between the upper and lower members 20, 22 with which standard 18 is integral and one-piece.

A mechanism for fixing barrier 452 between door jambs is engaged to ends or locations 458 of upper members 20 and to ends or locations 460 of lower member 22. Such a mechanism includes pressurizing turnable arms 38, threaded shaft 40, hand wheels 42, and disk 44 that are shown in and described with respect to FIGS. 1A and 1B.

Lower member 22 of barrier 452 of FIG. 19 is elongate in the length direction, runs generally parallel to the upper member 20, and extends inwardly and outwardly relative to a lower end portion of standard 18. Lower member 22 is tubular, may be formed of a metal such as steel or aluminum, and is generally rectangular in section. The dimensions of the rectangular section of lower member 22 may be identical with the dimensions of the rectangular section of standard 18. In other words, the height and width of the rectangular section of lower member 22 may be identical to the length and width of the rectangular section of standard 18. Lower member 22 includes an outer end portion or end 460 having an opening, where such opening extends inwardly along an upper edge of upper member 20 and extends in the length direction. This opening slidingly receives turnable arm 38 shown in FIG. 1A. Lower member 22 includes gate confronting inwardly extending portion 52.

First end frame 12 as a whole, including standard 18, upper member 20, lower member 22, and end member 24 that includes a C-shaped section, are integral and one-piece with each other and are set in a common plane.

Second end frame 14 is identical to first end frame 12 with the following exceptions:

1) A first exception is that second end frame 14 includes, and first end frame 12 does not include, an inwardly extending elongate relatively narrow plate mount 68 for pivotally or swingingly mounting the gate 16 on a top pin 70.

2) A second exception is that second end frame 14 includes, and first end frame 12 does not include, an opening extending downwardly from an upper face of lower member 22 of second end frame 14. This opening in lower member 22 receives a bottom pin rigidly affixed to gate 16. This opening and bottom pin are coaxial with top pin 70 when the barrier 10 is assembled.

3) A third exception is that there is substantially a right angle between the axis of standard 18 and the axis of gate confronting portion 52 of second end frame 14. While an angle of slightly more than ninety degrees can be provided here, such is not required. The angle of slightly more than ninety degrees, as found between the standard 18 and gate confronting portion 52 of the first end frame 12, contributes to the resilient structure for pressurizing the barrier 10 as a whole.

Gate 16 of barrier 452 includes a frame 462. Unlike barrier 10, gate 16 of barrier 452 does not include a pet door. Frame 462 is preferably formed of a metal such as steel or aluminum. Frame 462 includes an upper member 464, lower member 466, end member 468 and end member 470. Upper members 464, 466 are engaged to and between the end members 468, 470. Members 464, 466, 468, 470 are tubular and square in section. End member 468 defines the axis on which gate 16 swings. End member 468 depends slightly below and beyond lower member 466 such that lower member 466 and gate 16 as a whole is spaced slightly above the lower members 22 of end frames 12, 14. The bottom pivot pin of end member 468 depends from the lower end of end member 468. Gate 16 rides on the lower end of end member 468. Frame 462 further includes four vertical support members 472 running to and between upper support member 464 and lower support member 466.

Frame 462 further includes a stop 106 that prevents the gate 16 from swinging through the barrier 452. Instead, gate 16, because of the stop 106, swings only out of one face of the barrier 452. Stop 106 confronts and makes contact with the outer side of gate confronting portion 52 of end frame 12 when the gate 16 is closed.

U.S. Pat. No. 7,975,431 B2 issued Jul. 12, 2011 and entitled Multiple Piece Gated Pressurized Barrier is hereby incorporated by reference in its entirety herein.

As shown in FIGS. 20C, 21C, 24 and 27, a base assembly gate or base barrier is indicated in general by the reference numeral 500. Barrier 500 generally includes a first end frame portion 512, a second end frame portion 514, and a gate 516 engagable between the end frames portions 512, 514. First and second end frame portions 512 and 514 make up a single frame unit 515. Disassembly of the single frame unit 515 destroys the integrity of the unit. First end frame portion 512 includes a gate confronting standard 518, an upper member 520, a lower member 522, and an end member 524. Second end frame portion 514 includes a gate confronting standard 526, an upper member 528, a lower member 530, and an end member 532. As to barrier 500, first and second end frame portions 512, 514, gate 516, standard 518, upper member 520, end member 524, standard 526, upper member 528, end member 532, and latch 534, barrier 10 shown in FIGS. 1A and 1B is hereby incorporated by reference.

FIGS. 20C, 21C, 24 and 27 show the two-unit barrier 500 in an assembled form. The two-unit barrier 500 includes the first end frame portion 512, the second end frame portion 514 and the gate unit 516. The first end frame portion 512 includes the first lower member portion 522. The second end frame portion includes the second lower member portion 530.

The gate unit 516 is swingably engaged to one of the first and second end frame portions 512, 514. The gate unit includes a latch 534 that is latchable to the other of the first and second end frame portions 512, 514.

The first and second end frame portions 512, 514 are engaged to each other such that the first and second end frame portions 512, 514 are a single unit. The first and second end frame portions 512, 514 are expandable and retractable relative to each other. The first and second end frame portions 512, 514 are retractable toward each other such that the first and second end frame portions 512, 514 confront each other in a retracted position where the gate unit 516 is not engagable between the first and second end frame portions 512, 514. In the retracted position, the horizontal distance between gate standards 518, 526 is less than the width of the gate or gate unit 16. The first and second end frame portions 512, 514 are fixable at an expanded position where the gate unit 516 is engagable to and between the first and second end frame portions 512, 514 such that the two-unit barrier 500 is assembled.

When the two-unit barrier 500 is assembled, the gate unit 516 confronts each of a) the first end frame portion 512, b) the second end frame portions 514, c) the first lower member portion 522 of the first end frame portion 512, and d) the second lower member portion 530 of the second end frame portion 514.

The lower member portions 522, 530 of the first and second end frame portions 512, 514 are engaged to each other such that disengagement of the first and second end frame portions 512, 514 from each other destroys an integrity of an engagement between the first and second end frame portions 512, 514, namely, the engagement between the lower member portions 522, 530 of the first and second end frame portions 512, 514. To provide for such a feature, the distal end of the male lower member portion 522 may include an outwardly extending lip 544 extending outwardly from one or more of the four outer faces of the male lower member portion 522. This outwardly extending lip 544 may hit or engage an inwardly extending lip 546 of the female lower member portion 530, which lip 546 may extend inwardly from one or more of the four inner side faces of the female lower member portion 530. In the expanded position, lips 544, 546 hit or engage each other. In the retracted position, lip 546 of the female lower member portion 530 is adjacent to or confronts standard 518 of the first end frame portion 512 and lip 544 of the male lower member portion 522 is adjacent to or confronts the standard 526 of the second end frame portion 514. To separate first end frame portion 512 from second end frame portion 514 such that the end frame portions 512, 514 are separate pieces, the lips 544, 546 would be destroyed or separated from their respective lower member portions 522, 530.

The lower member portions 522, 530 are engaged to each other with a telescoping arrangement. The first lower member portion 522 includes a first dimension and the second lower member portion 530 includes a second dimension. The first dimension is slightly less or equal to the second dimension where the dimension may be a diameter, width, or height such that the first lower member portion fits inside of the second lower member portion. The first lower member portion 522 may include a first width and the second lower member portion 530 may include a second width, where the first width is less than the second width such that the first lower member portion 522 slides inside of the second lower member portion 530. The first lower member portion 522 may be a male member and the second lower member portion 530 may be a female member.

The single unit telescoping frame 515 shown in FIGS. 20A, 21A, 22 and 25 defines a plane in each of the expanded and retracted positions. The gate unit 516 in FIGS. 20B, 21B, 23 and 26 defines a plane. The two-unit barrier 500 shown in FIGS. 20C, 21C, 24, and 27 defines a plane when the gate unit 516 is closed.

Figure 22:
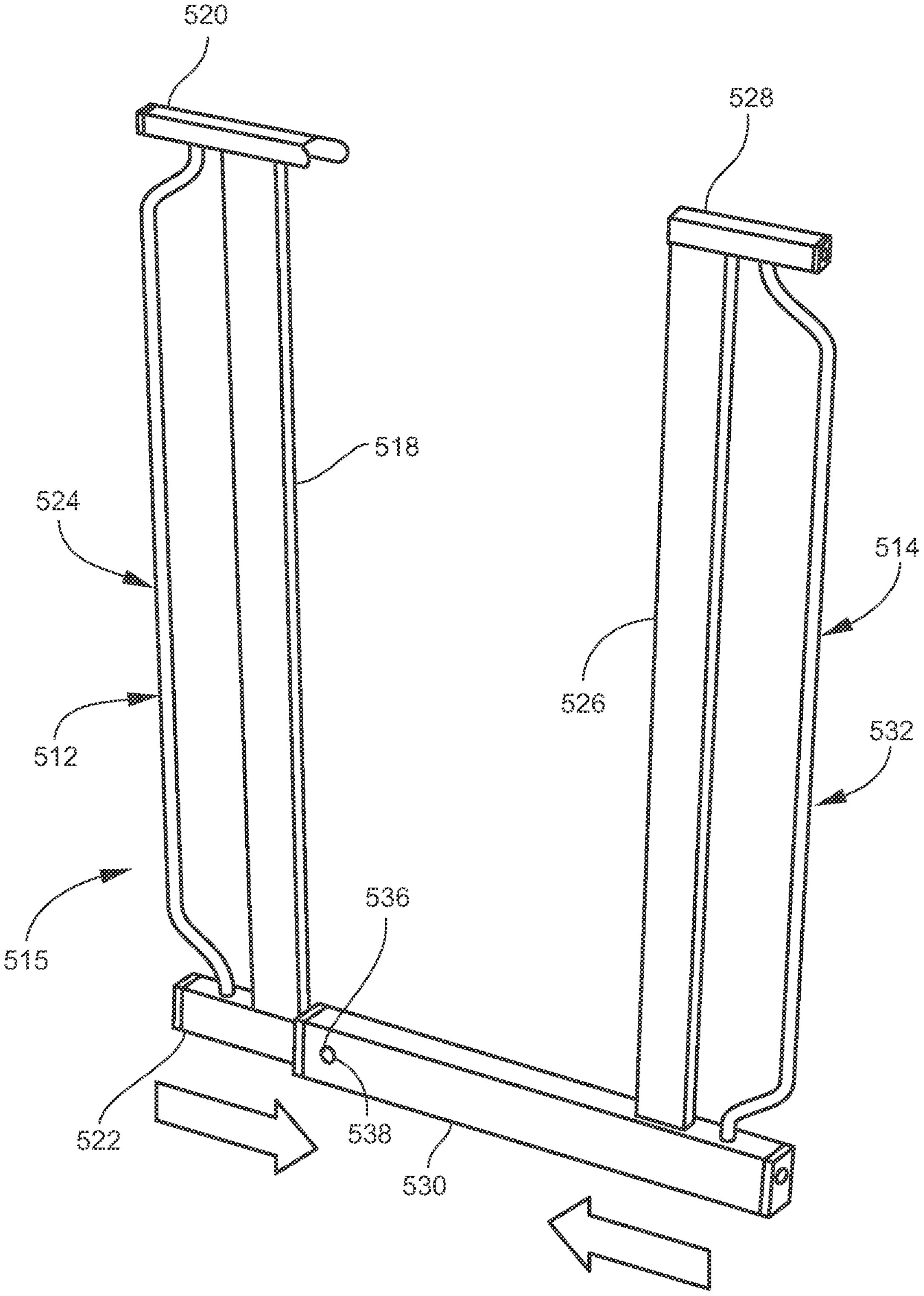
FIG. 22 is a detail perspective view of the one unit telescoping frame of FIG. 20A.
Figure 23:
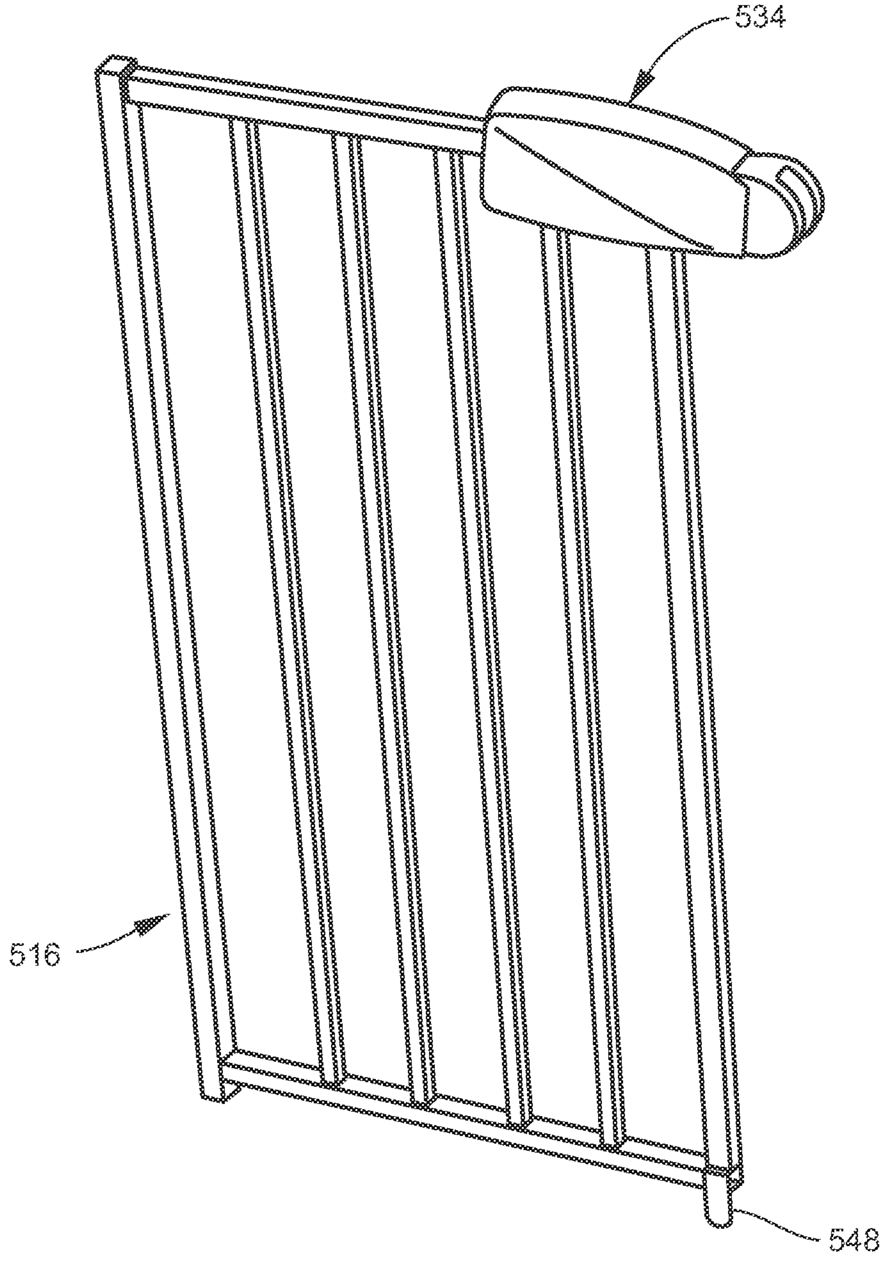
FIG. 23 is a detail perspective view of the one unit gate of FIG. 20B.
Figure 24:
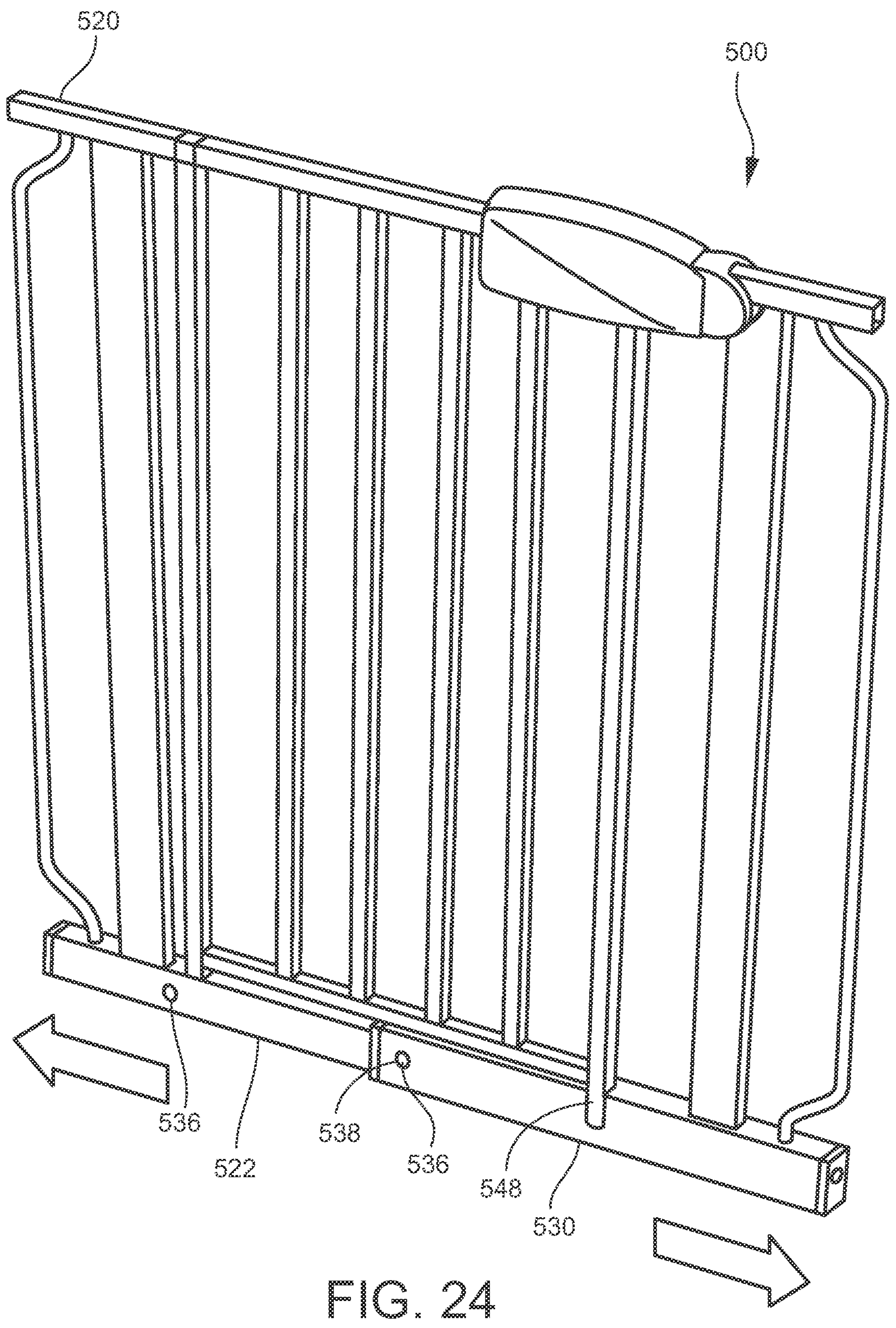
FIG. 24 is a detail perspective view of the assembled gate of FIG. 20C.
Figure 25:
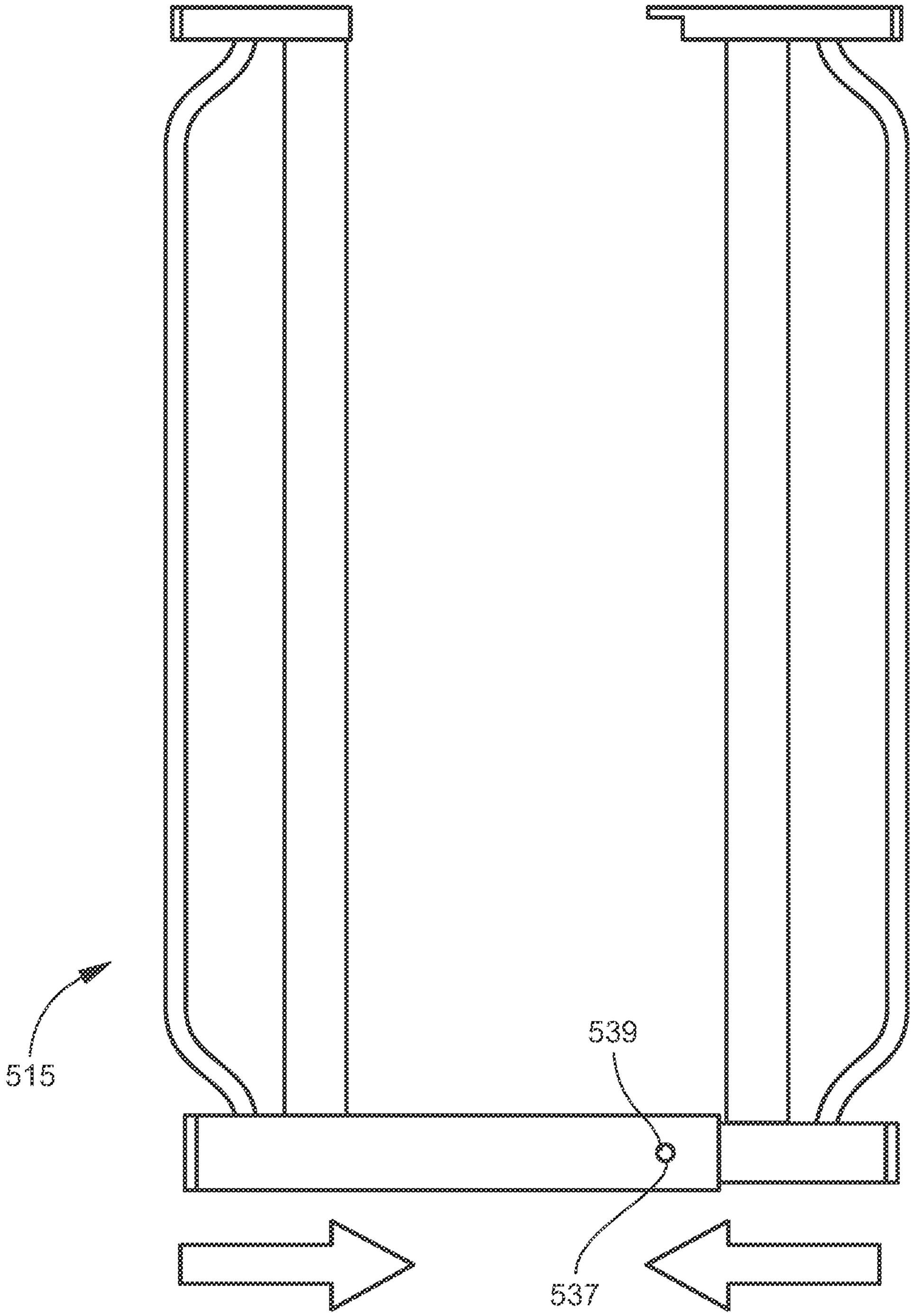
FIG. 25 is a detail elevation view of the one unit telescoping frame of FIG. 21A.
Figure 26:
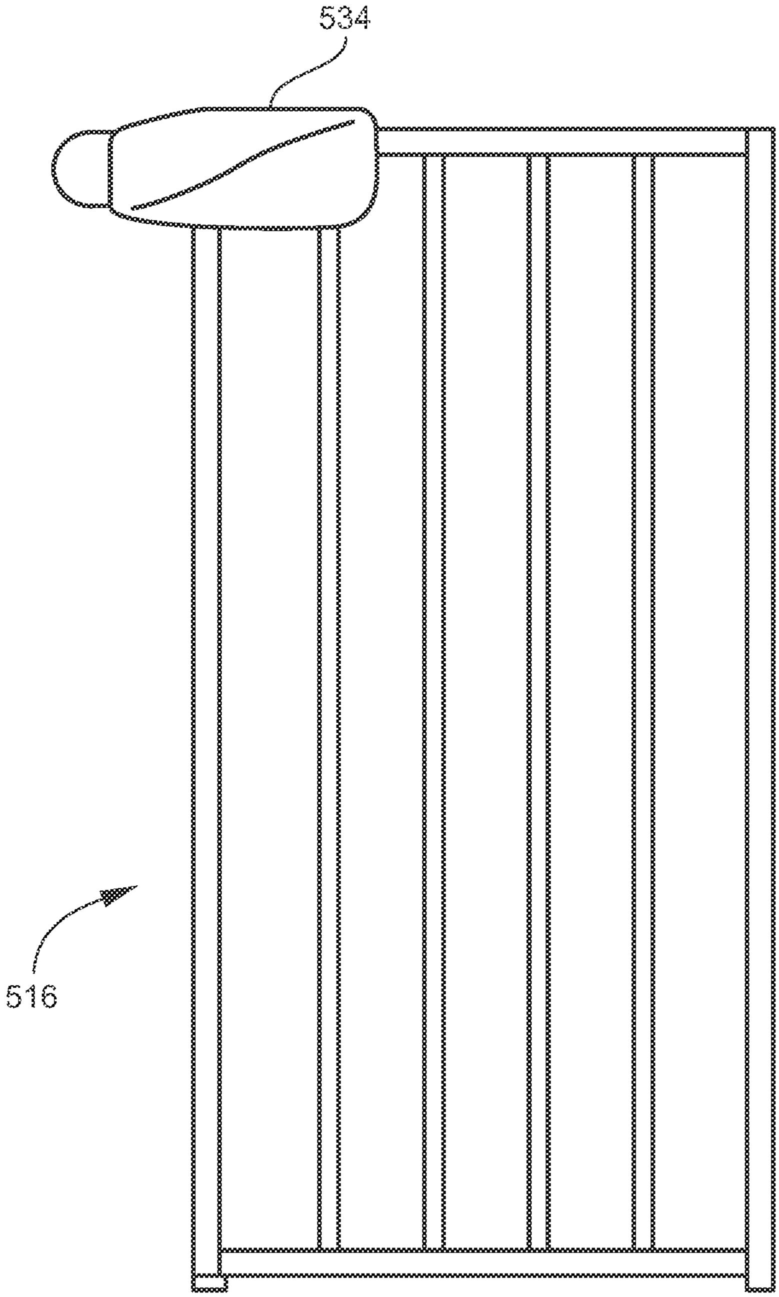
FIG. 26 is a detail elevation view of the one unit gate of FIG. 21B.
Figure 27:
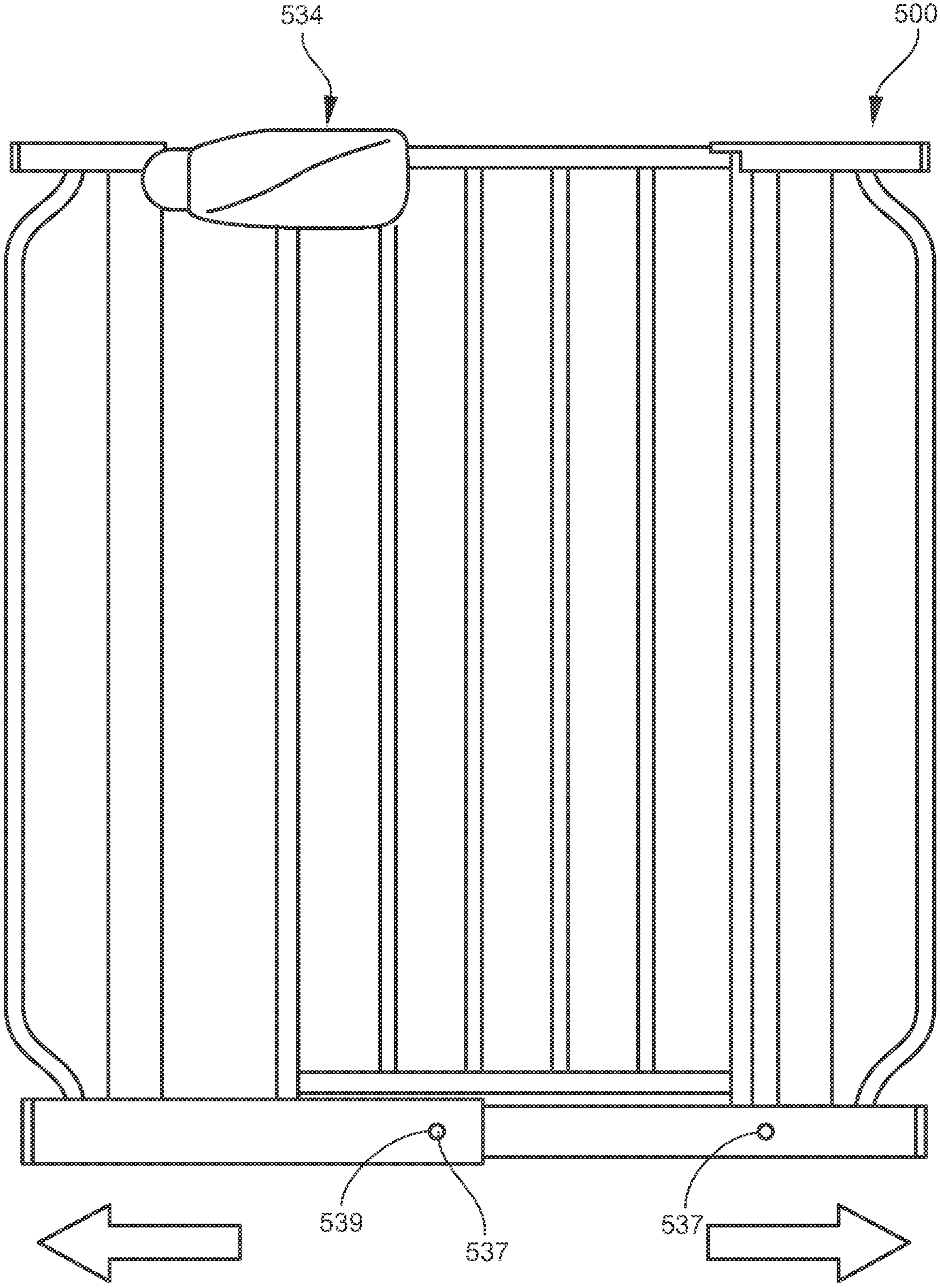
FIG. 27 is a detail elevation view of the assembled gate of FIG. 21C.

The telescoping arrangement between lower member portions 522 and 530 may include a set of four snaps or pins or snap pins or spring biased buttons 536, 537. Button 536 is shown in FIGS. 24, 27, 28A and 28B. Button 537 is shown in FIG. 22.

Two buttons 536 are engaged on one side face of lower member portion 522 and two buttons 537 are engaged on the other side face of lower member portion 522. Buttons 536 and 537 oppose each other such that there is a first button 536 opposing a first button 537 and such that there is a second button 536 opposing a second button 537. One set of opposing buttons 536, 537 is disposed on a distal end of lower member portion 522. The other set of opposing buttons 536, 537 is disposed on an intermediate portion of male lower member portion 522.

Buttons 536, 537 cooperate with a pair of openings 538, 539 formed in female lower member portion 530. One opening 538 is formed in one side face of lower member portion 530 and the other opening 539 is formed in the other side face of lower member portion 530. Openings 538, 539 oppose each other. Openings 538, 539 are formed in a distal end of lower member portion 530.

Figure 29A:
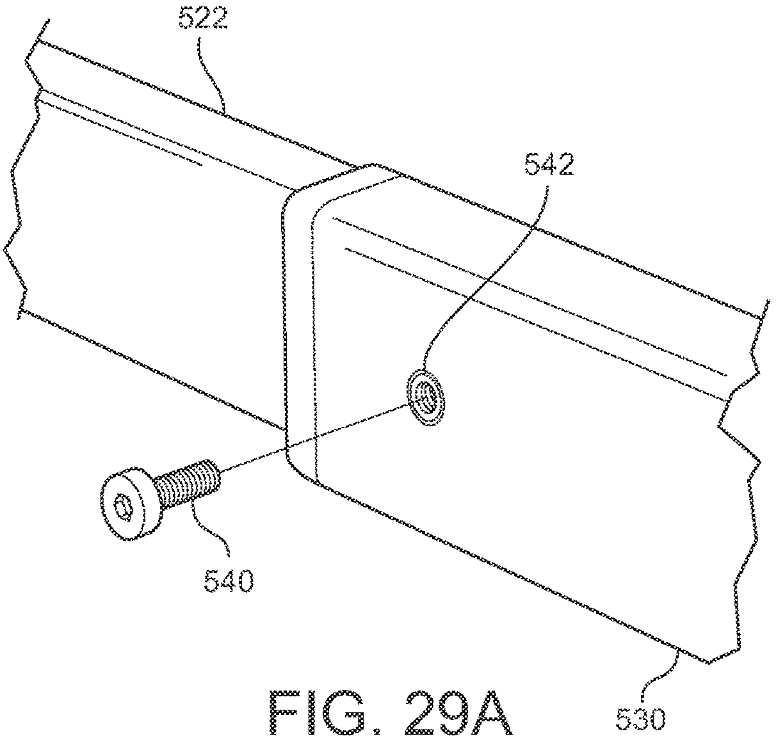
FIG. 29A is a detail perspective view of a second embodiment of a connection between the right unit portion of FIG. 20A and the left unit portion of FIG. 20A, where the connection is located between the telescoping portions of the one unit frame of FIG. 20A.
Figure 29B:
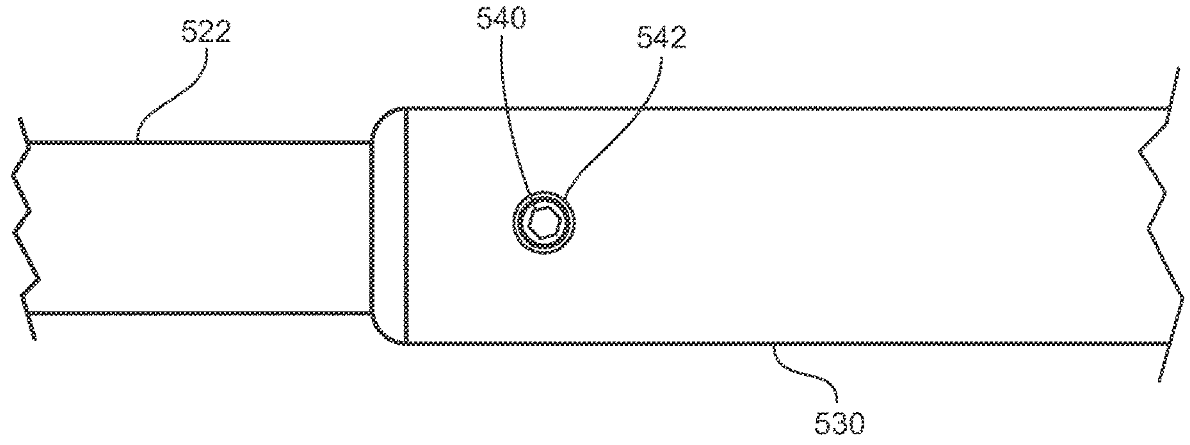
FIG. 29B is a detail elevation view of the second embodiment of FIG. 29A.

FIGS. 29A and 29B show an alternate embodiment to a fixing of the lower member portions 522, 530 relative to each other. In this embodiment, a bolt or pin 540 may engage a threaded or nonthreaded opening 542 in the distal end of female lower member portion 530. The bolt or pin 540 may then further engage a threaded or nonthreaded opening formed in the distal end of the male lower member portion 522. Or the distal end of the bolt or pin 540 may engage or bring pressure to bear on a side face portion of male lower member portion 522 to fix the lower member portions 522, 530 relative to each other.

Figure 28A:
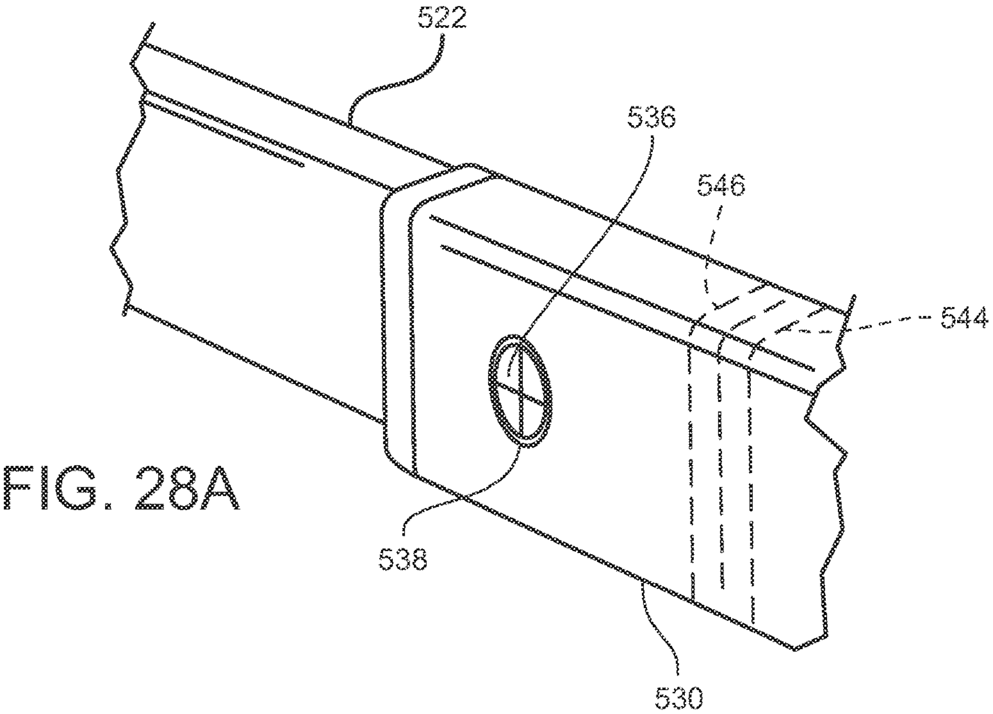
FIG. 28A is a detail perspective view of a first embodiment of a connection between the right unit portion of FIG. 20A and the left unit portion of FIG. 20A, where the connection is located between the telescoping portions of the one unit frame of FIG. 20A.
Figure 28B:
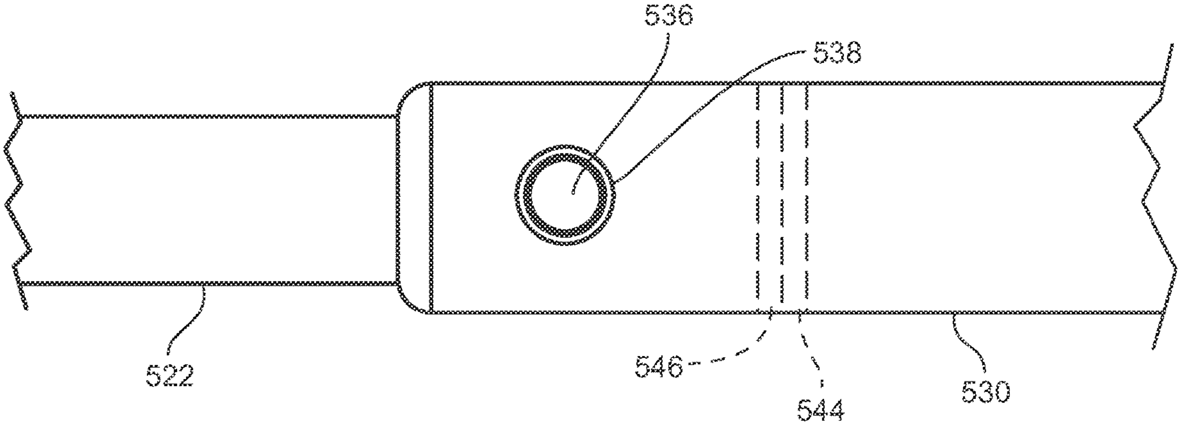
FIG. 28B is a detail elevation view of the first embodiment of FIG. 28A.

If desired, the first embodiment shown in FIGS. 28A and 28B and the second embodiment shown in FIGS. 29A and 29B may have a number of positions where the distal ends of the lower member portions 522, 530 are fixed to each other. Such plurality of positions, for gate units 516 of different sizes, where the end frame portions 512, 514 are fixed at different distances from each other, may be accomplished by providing for a number of openings 538 in the case of the first embodiment or may be accomplished by providing for a number of openings 542 on either or both of the distal ends of lower member portions 522, 530 in the case of the second embodiment. Also, it should be noted that the second embodiment may set the first and second lower member portions 522 and 530 at an infinite number of positions where the distal end of the pin 540 brings pressure upon the side face of the male lower member portion 522.

The male and female lower member portions 522, 530 overlap a sufficient length in the expanded position to provide lateral stability between the end frame portions 512, 514.

If desired, the inner vertical edge of standard 518 of end frame portion 512 may serve as a stop in the retracted position for the distal end of female lower member portion 530 of end frame portion 514 whereupon the intermediate buttons 536, 537 may be eliminated.

When buttons 536 and 537 are employed, barrier 500 is fixed in each of the retracted position (such as during shipping) and the expanded position (such as during use).

Gate unit 516 is fixed in frame unit 515 when the frame unit 515 is in the expanded position. The swinging end of gate unit 516 may engage upper member portion 520 and lower member portion 522 of first end frame portion 512 through an upper pin arrangement and a lower pin arrangement. The latching end of gate unit 516 may engage a) one or more of standard 526 and upper member portion 528 with latch 534 and b) lower member portion 530 with a stop 548.

Two unit barriers are shown in FIGS. 13A, 13B, 14A, 14B, 15A, 15B, 20C, 21C, 24, and 27.

Three unit barriers are shown in FIGS. 3A, 3B, 4A, 4B, 5A, 5B, 7B, 7C, 8B, 8C, 9B, 9C, 10B, 10C, 11B, 11C, 12A, 12B, 16A, 16B, 17A, and 17B.

Four unit barriers are shown in FIGS. 2A, 2B, 6A, 6B, 7A, 8A, 9A, 10A, 11A, 18A, and 18B.

The present disclosure includes at least the following 14 inventions:

Invention 1. A three unit barrier that includes: a) a first end frame as a first unit, the first end frame having a first lower member portion; b) a second end frame as a second unit, the second end frame having a second lower member portion; c) a gate as a third unit, the gate swingably engaged to one of the first and second end units, the gate having a latch that is latchable to the other of the first and second units, the gate confronting the first and second end frames, the gate further confronting the first lower member portion of the first end frame and the second lower member portion of the second end frame; d) the first lower member portion of the first end frame and the second lower member portion of the second end frame being one of a) directly engagable to each other and b) indirectly engagable to each other; e) the first lower member portion of the first end frame having one of a first mortise joint end and first tenon joint end; and f) the second lower member portion of the second end frame having one of a second mortise joint end and second tenon joint end.

Invention 2. The three unit barrier of invention 1, and further including a lower member extension engaged between the first lower member portion of the first end frame and the second lower member portion of the second end frame, the lower member extension having at least one of a third mortise joint end and third tenon joint end.

Invention 3. The three unit barrier of invention 1, wherein the tenon joint end comprises a neck and a head, the head having a greater width than the neck.

Invention 4. The three unit barrier of invention 1, wherein one of the first and second mortise joint ends is slideably engaged with one of the first and second tenon joint ends along an axis parallel to an axis on which the gate swings.

Invention 5. The three unit barrier of invention 1, wherein one of the first and second mortise joint ends is slideably engaged with one of the first and second tenon joint ends along an axis disposed generally parallel to a plane defined by the gate.

Invention 6. A three unit barrier, including: a) a first end frame as a first unit, the first end frame having a first lower member portion; b) a second end frame as a second unit, the second end frame having a second lower member portion; c) a gate as a third unit, the gate swingably engaged to one of the first and second end units, the gate having a latch that is latchable to the other of the first and second units, the gate confronting the first and second end frames, the gate further confronting the first lower member portion of the first end frame and the second lower member portion of the second end frame; d) the first lower member portion of the first end frame and the second lower member portion of the second end frame being one of a) directly engagable to each other and b) indirectly engagable to each other; e) the first lower member portion of the first end frame having one of a first clamp joint end and first clamped joint end; and f) the second lower member portion of the second end frame having one of a second clamp joint end and second clamped joint end.

Invention 7. The three unit barrier of invention 6, and further including a lower member extension engaged between the first lower member portion of the first end frame and the second lower member portion of the second end frame, the lower member extension having at least one of a third clamp joint end and third clamped joint end.

Invention 8. A three unit barrier, including: a) a first end frame as a first unit, the first end frame having a first lower member portion; b) a second end frame as a second unit, the second end frame having a second lower member portion; c) a gate as a third unit, the gate swingably engaged to one of the first and second end units, the gate having a latch that is latchable to the other of the first and second units, the gate confronting the first and second end frames, the gate further confronting the first lower member portion of the first end frame and the second lower member portion of the second end frame; d) the first lower member portion of the first end frame and the second lower member portion of the second end frame being one of a) directly engagable to each other and b) indirectly engagable to each other; e) the first lower member portion of the first end frame having one of a first sleeve joint end and first male joint end; and f) the second lower member portion of the second end frame having one of a second sleeve joint end and second male joint end.

Invention 9. The three unit barrier of invention 8, and further including a lower member extension engaged between the first lower member portion of the first end frame and the second lower member portion of the second end frame, the lower member extension having at least one of a third sleeve joint end and third male joint end.

Invention 10. The three unit barrier of invention 8, wherein the first sleeve joint end extends for 360 degrees about a respective male joint end.

Invention 11. A three unit barrier, including: a) a first end frame as a first unit, the first end frame having a first lower member portion; b) a second end frame as a second unit, the second end frame having a second lower member portion; c) a gate as a third unit, the gate swingably engaged to one of the first and second end units, the gate having a latch that is latchable to the other of the first and second units, the gate confronting the first and second end frames, the gate further confronting the first lower member portion of the first end frame and the second lower member portion of the second end frame; d) the first lower member portion of the first end frame and the second lower member portion of the second end frame being one of a) directly engagable to each other and b) indirectly engagable to each other; e) the first lower member portion of the first end frame having one of a first flush and hidden female joint end and first flush and hidden male joint end; and f) the second lower member portion of the second end frame having one of a second flush and hidden female joint end and second flush and hidden male joint end; g) wherein one of the first and second flush and hidden female joint end engages one of the first and second flush and hidden male joint ends to form a flush and hidden joint that draws top, bottom and side surfaces of the first and second lower members into a flush abutment with each other and that hides an inner joint mechanism from sight.

Invention 12. The three unit barrier of invention 11, and further including a lower member extension engaged between the first lower member portion of the first end frame and the second lower member portion of the second end frame, the lower member extension having at least one of a flush and hidden female joint end and third flush and hidden male joint end.

Invention 13. A three unit barrier, including: a) a first end frame as a first unit, the first end frame having a first lower member portion; b) a second end frame as a second unit, the second end frame having a second lower member portion; c) a gate as a third unit, the gate swingably engaged to one of the first and second end units, the gate having a latch that is latchable to the other of the first and second units, the gate confronting the first and second end frames, the gate further confronting the first lower member portion of the first end frame and the second lower member portion of the second end frame; d) the first lower member portion of the first end frame and the second lower member portion of the second end frame being one of i) directly engagable to each other and ii) indirectly engagable to each other; e) the first lower member portion of the first end frame having one of a first opposing cavity joint end and first opposing plates joint end; and f) the second lower member portion of the second end frame having one of a second opposing cavity joint end and second opposing plates joint end.

Invention 14. A three unit barrier, including: a) a first end frame as a first unit, the first end frame having a first lower member portion; b) a second end frame as a second unit, the second end frame having a second lower member portion; c) a gate as a third unit, the gate swingably engaged to one of the first and second end units, the gate having a latch that is latchable to the other of the first and second units, the gate confronting the first and second end frames, the gate further confronting the first lower member portion of the first end frame and the second lower member portion of the second end frame; d) the first lower member portion of the first end frame and the second lower member portion of the second end frame being one of a) directly engagable to each other and b) indirectly engagable to each other; e) the first lower member portion of the first end frame having one of a first box shaped slot joint end and first box shaped insert joint end; and f) the second lower member portion of the second end frame having one of a second box shaped slot joint end and second box shaped insert joint end.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A barrier having a plurality of units, the barrier comprising:

a) a first end frame as a first unit, the first end frame comprising:

i) a first upper member portion, the first upper member portion being tubular and having inner and outer end sections, the first upper member portion having a first pressurizing mechanism engaged to said outer end section;

ii) a first lower member portion, the first lower member portion being tubular and having inner and outer end sections, the first lower member portion having a first axis, the first lower member portion having a second pressurizing mechanism engaged to said outer end section, wherein the first lower member portion further includes an integral lower member extension that includes a first joint end extending inwardly along the first axis of the first lower member portion; and iii) a first standard extending between the inner end section of the first upper member portion and the inner end section of the first lower member portion, the first standard being tubular;

b) a second end frame as a second unit, the second end frame comprising:

i) a second upper member portion, the second upper member portion being tubular and having inner and outer end sections, the second upper member portion having a third pressurizing mechanism engaged to said outer end section;

ii) a second lower member portion, the second lower member portion being tubular and having inner and outer end sections, the second lower member portion having a first axis, the second lower member portion having a fourth pressurizing mechanism engaged to said outer end section, wherein the second lower member portion further includes a second joint end extending inwardly along the first axis of the second lower member portion; and iii) a second standard extending between the inner end section of the second upper member portion and the inner end section of the second lower member portion, the second standard being tubular, wherein the second standard has a second axis that is disposed at an angle to the first axis of the second lower member portion and the first standard has a second axis that is disposed at an angle to the first axis of the first lower member portion such that the barrier is pressurizable for engagement;

c) a gate as a third unit, the gate swingably engaged to one of the first and second end units, the gate being latchable to the other of the first and second units, the gate confronting the first and second end frames, the gate comprising a frame that comprises:

i) an upper member;

ii) a lower member;

iii) a first end member confronting the first end frame;

iv) a second end member confronting the second end frame; and v) a set of support members extending between the upper and lower members;

d) the lower member extension that is integral with the first lower member portion of the first end frame being tubular, the lower member extension extending from the first lower member portion of the first end frame to the second lower member portion of the second end frame;

e) the first joint end of the lower member extension having one of a first sleeve and first male piece, the second joint end of the second lower member portion of the second end frame having the other of a first sleeve and a first male piece, the first sleeve and first male piece being engagable to each other;

f) a preliminary engagement between the first joint end and second joint end, wherein:

i) said first male piece extends into said first sleeve in the preliminary engagement, ii) said first sleeve extends for 360 degrees about said first male piece in the preliminary engagement, and iii) said first sleeve and said first male piece must slide relative to each other from the preliminary engagement to a pinned engagement between the first male piece and the first sleeve where the first male piece is in said first sleeve and where the first sleeve extends for 360 degrees about the first male piece; and g) the first sleeve being adjacent to the first standard.

2. The barrier of claim 1, wherein said pinned engagement comprises at least one pin such that said first sleeve and said first male piece at said pinned engagement are coupled by at least one pin to each other.

3. The barrier of claim 1, wherein said pinned engagement comprises at least one screw such that said first sleeve and said first male piece at said pinned engagement are coupled by at least one screw to each other.

4. The barrier of claim 1, wherein said pinned engagement comprises at least one rivet such that said first sleeve and said first male piece at said pinned engagement are coupled by at least one rivet to each other.

5. The barrier of claim 1, wherein the first sleeve of the pinned engagement is rectangular in section, and wherein said first male piece of the first pinned engagement is rectangular in section.

6. A barrier having a plurality of units, the barrier comprising:

a) a first end frame as a first unit, the first end frame comprising:

i) a first upper member portion, the first upper member portion being tubular and having inner and outer end sections, the first upper member portion having a first pressurizing mechanism engaged to said outer end section;

ii) a first lower member portion, the first lower member portion being tubular and having inner and outer end sections, the first lower member portion having a first axis, the first lower member portion having a second pressurizing mechanism engaged to said outer end section, wherein the first lower member portion further includes an integral lower member extension that includes a first joint end extending inwardly along the first axis of the first lower member portion; and iii) a first standard extending between the inner end section of the first upper member portion and the inner end section of the first lower member portion, the first standard being tubular;

b) a second end frame as a second unit, the second end frame comprising:

i) a second upper member portion, the second upper member portion being tubular and having inner and outer end sections, the second upper member portion having a third pressurizing mechanism engaged to said outer end section;

ii) a second lower member portion, the second lower member portion being tubular and having inner and outer end sections, the second lower member portion having a first axis, the second lower member portion having a fourth pressurizing mechanism engaged to said outer end section, wherein the second lower member portion further includes a second joint end extending inwardly along the first axis of the second lower member portion; and iii) a second standard extending between the inner end section of the second upper member portion and the inner end section of the second lower member portion, the second standard being tubular, wherein the second standard has a second axis that is disposed at an angle to the first axis of the second lower member portion and the first standard has a second axis that is disposed at an angle to the first axis of the first lower member portion such that the barrier is pressurizable for engagement;

c) a gate as a third unit, the gate swingably engaged to one of the first and second end units, the gate being latchable to the other of the first and second units, the gate confronting the first and second end frames, the gate comprising a frame that comprises:

i) an upper member;

ii) a lower member;

iii) a first end member confronting the first end frame;

iv) a second end member confronting the second end frame; and v) a set of support members extending between the upper and lower members;

d) the lower member extension that is integral with the first lower member portion of the first end frame being tubular, the lower member extension extending from the first lower member portion of the first end frame to the second lower member portion of the second end frame;

e) the first joint end of the lower member extension having one of a first sleeve and first male piece, the second joint end of the second lower member portion of the second end frame having the other of a first sleeve and a first male piece, the first sleeve and first male piece being engagable to each other;

f) a preliminary engagement between the first joint end and second joint end, wherein:

i) said first male piece extends into said first sleeve, ii) said first sleeve extends for 360 degrees about said first male piece, and iii) said first sleeve and said first male piece must slide relative to each other from the preliminary engagement to a pinned engagement between the first male piece and the first sleeve where the first male piece is in said first sleeve and where the first sleeve extends for 360 degrees about the first male piece; and g) the first male piece being adjacent to the first standard.

7. The barrier of claim 6, wherein said pinned engagement comprises at least one pin such that said first sleeve and said first male piece at said pinned engagement are coupled by at least one pin to each other.

8. The barrier of claim 6, wherein said pinned engagement comprises at least one screw such that said first sleeve and said first male piece at said pinned engagement are coupled by at least one screw to each other.

9. The barrier of claim 6, wherein said pinned engagement comprises at least one rivet such that said first sleeve and said first male piece at said pinned engagement are coupled by at least one rivet to each other.

10. The barrier of claim 6, wherein the first sleeve of the pinned engagement is rectangular in section, and wherein said first male piece of the first pinned engagement is rectangular in section.

11. A barrier having a plurality of units, the barrier comprising:

a) a first end frame as a first unit, the first end frame comprising:

i) a first upper member portion, the first upper member portion being tubular and having inner and outer end sections, the first upper member portion having a first pressurizing mechanism engaged to said outer end section;

ii) a first lower member portion, the first lower member portion being tubular and having inner and outer end sections, the first lower member portion having a first axis, the first lower member portion having a second pressurizing mechanism engaged to said outer end section, wherein the first lower member portion includes a first joint end extending inwardly along the first axis of the first lower member portion; and iii) a first standard extending between the inner end section of the first upper member portion and the inner end section of the first lower member portion, the first standard being tubular;

b) a second end frame as a second unit, the second end frame comprising:

i) a second upper member portion, the second upper member portion being tubular and having inner and outer end sections, the second upper member portion having a third pressurizing mechanism engaged to said outer end section;

ii) a second lower member portion, the second lower member portion being tubular and having inner and outer end sections, the second lower member portion having a first axis, the second lower member portion having a fourth pressurizing mechanism engaged to said outer end section, wherein the second lower member portion includes a second joint end extending inwardly along the first axis of the second lower member portion; and iii) a second standard extending between the inner end section of the second upper member portion and the inner end section of the second lower member portion, the second standard being tubular, wherein the second standard has a second axis that is disposed at an angle to the first axis of the second lower member portion and the first standard has a second axis that is disposed at an angle to the first axis of the first lower member portion such that the barrier is pressurizable for engagement;

c) a gate as a third unit, the gate swingably engaged to one of the first and second end units, the gate being latchable to the other of the first and second units, the gate confronting the first and second end frames, the gate comprising a frame that comprises:

i) an upper member;

ii) a lower member;

iii) a first end member confronting the first end frame;

iv) a second end member confronting the second end frame; and v) a set of support members extending between the upper and lower members;

d) the first lower member portion extending to the second lower member portion;

e) the first joint end of the first lower member portion having one of a first sleeve and first male piece, the second joint end of the second lower member portion having the other of a first sleeve and a first male piece, the first sleeve and first male piece being engagable to each other;

f) a preliminary engagement between the first joint end and second joint end, wherein:

i) said first male piece extends into said first sleeve in the preliminary engagement, ii) said first sleeve extends for 360 degrees about said first male piece in the preliminary engagement, and iii) said first sleeve and said first male piece must slide relative to each other from the preliminary engagement to a pinned engagement between the first male piece and the first sleeve where the first male piece is in said first sleeve and where the first sleeve extends for 360 degrees about the first male piece; and g) the first sleeve being adjacent to the first standard.

* * * * *